US012701573B2

(12) United States Patent
Bae et al.

(10) Patent No.: US 12,701,573 B2
(45) Date of Patent: Aug. 4, 2026

(54) METHOD, USER EQUIPMENT, PROCESSING DEVICE, AND STORAGE MEDIUM FOR TRANSMITTING HARQ-ACK INFORMATION, AND METHOD AND BASE STATION FOR RECEIVING HARQ-ACK INFORMATION

(71) Applicant: LG Electronics Inc., Seoul (KR)

(72) Inventors: Duckhyun Bae, Seoul (KR); Suckchel Yang, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 305 days.

(21) Appl. No.: 18/559,232

(22) PCT Filed: May 10, 2022

(86) PCT No.: PCT/KR2022/006644
§ 371 (c)(1),
(2) Date: Nov. 6, 2023

(87) PCT Pub. No.: WO2022/240132
PCT Pub. Date: Nov. 17, 2022

(65) Prior Publication Data
US 2024/0236986 A1 Jul. 11, 2024

(30) Foreign Application Priority Data

May 10, 2021 (KR) ........................ 10-2021-0060318
Aug. 6, 2021 (KR) ........................ 10-2021-0104048
(Continued)

(51) Int. Cl.
*H04W 72/1273* (2023.01)
*H04L 1/1812* (2023.01)
(Continued)

(52) U.S. Cl.
CPC ....... *H04W 72/1273* (2013.01); *H04L 1/1812* (2013.01); *H04W 72/0446* (2013.01); *H04W 72/11* (2023.01); *H04W 72/21* (2023.01)

(58) Field of Classification Search
CPC ..... H04W 24/10; H04W 72/12; H04W 72/23; H04W 74/0833; H04B 17/328; H04L 5/0044
See application file for complete search history.

(56) References Cited

U.S. PATENT DOCUMENTS

2022/0182899 A1* 6/2022 Li ......................... H04W 36/08
2024/0039660 A1* 2/2024 Zeng ..................... H04L 1/1861
2024/0080774 A1* 3/2024 Wang ................. H04W 52/146

FOREIGN PATENT DOCUMENTS

KR  10-2019- 0130571     11/2019
KR  10-2020- 0014249      2/2020
(Continued)

OTHER PUBLICATIONS

China Telecom, "Discussion on UE feedback enhancements for HARQ-ACK," R1-2102867, 3GPP TSG RAN WG1 #104b, e-Meeting, Apr. 12-20, 2021, 10 pages.
(Continued)

*Primary Examiner* — Iqbal Zaidi
(74) *Attorney, Agent, or Firm* — Fish & Richardson P.C.

(57) ABSTRACT

Based on a first cell slot N scheduled for a HARQ-ACK transmission for PDSCH reception and a pre-determined rule for a PUCCH cell change, a UE may determine a PUCCH cell from among a plurality of cells including the first cell and a second cell different from the first cell; determine a PUCCH cell slot associated with the first cell slot N, from among slots on the PUCCH cell associated with the first cell slot N; and determine a target slot for which the HARQ-ACK transmission is to be delayed, on the basis of the HARQ-ACK transmission overlapping with a downlink
(Continued)

symbol on the PUCCH cell slot on the PUCCH cell associated with the first cell slot N.

20 Claims, 15 Drawing Sheets

(30)          Foreign Application Priority Data

|  |  |  |  |
|---|---|---|---|
| Oct. 1, 2021 | (KR) | ......................... | 10-2021-0131156 |
| Jan. 10, 2022 | (KR) | ......................... | 10-2022-0003642 |

(51)  Int. Cl.

| | |
|---|---|
| *H04W 72/0446* | (2023.01) |
| *H04W 72/11* | (2023.01) |
| *H04W 72/21* | (2023.01) |

(56)          References Cited

FOREIGN PATENT DOCUMENTS

| | | |
|---|---|---|
| WO | WO 2021/006715 | 1/2021 |
| WO | WO 2021/010705 | 1/2021 |

OTHER PUBLICATIONS

Extended European Search Report in European Appln. No. 22807780. 6, mailed on Sep. 13, 2024, 7 pages.

Moderator (Nokia), "Moderator summary #2 on HARQ-ACK feedback enhancements for NR Rel-17 URLLC/IIoT," 3GPP TSG-RAN WG1 Meeting #104-e, R1-2101818, e-Meeting, Jan. 25-Feb. 5, 2021, 175 pages.

Office Action in Japanese Appln. No. 2023-569674, mailed on Nov. 5, 2024, 9 pages (with English translation).

ZTE, "Discussion on HARQ-ACK enhancements for eURLLC," R1-2102493, 3GPP TSG RAN WG1 Meeting #104b-e, e-Meeting, Apr. 12-20, 2021, 21 pages.

International Search Report and Written Opinion in Appln. No. PCT/KR2022/006644, mailed on Aug. 24, 2022, 9 pages (with English translation).

Moderator (Nokia), "Moderator summary #1 on HARQ-ACK feedback enhancements for NR Rel-17 URLLC/IIoT (AI 8.3.1.1)," 3GPP TSG-RAN WG1 Meeting #103-e, R1-2009566, e-Meeting, Oct. 26-Nov. 13, 2020, 89 pages.

* cited by examiner

FIG. 1

Determine PUCCH resource(s) B overlapping with earliest PUCCH resource A.    S1001

Determine single PUCCH resource for multiplexing UCI associated with PUCCH resources A and B.    S1003

Case 1

Case 2

Case 3

Slot

▦ PUCCH resource A     ▨ PUCCH resource(s) B

▢ UCI multiplexing     ▦ MUX PUCCH resource

FIG. 13

PDCCH #1

PDCCH #2

PDSCH

Satisfying T2 ?

Satisfying T1 ?

UL CH #1

UL CH #2

UL CH #3

UL CH #4

Slot

FIG. 14

Receive scheduling information regarding PDSCH reception and scheduling information regarding PUCCH transmission therefor. — S1601

Determine PUCCH cell and PUCCH slot for PUCCH transmission related to PDSCH reception. — S1603

Perform PUCCH transmission including HARQ-ACK for PDSCH reception in determined PUCCH slot on determined PUCCH cell. — S1605

METHOD, USER EQUIPMENT, PROCESSING DEVICE, AND STORAGE MEDIUM FOR TRANSMITTING HARQ-ACK INFORMATION, AND METHOD AND BASE STATION FOR RECEIVING HARQ-ACK INFORMATION

CROSS-REFERENCE TO RELATED APPLICATIONS

This application is a National Stage application under 35 U.S.C. § 371 of International Application No. PCT/KR2022/006644, filed on May 10, 2022, which claims the benefit of Korean Application Nos. 10-2022-0003642, filed on Jan. 10, 2022, 10-2021-0131156, filed on Oct. 1, 2021, 10-2021-0104048, filed on Aug. 6, 2021, and 10-2021-0060318, filed on May 10, 2021. The disclosures of the prior applications are incorporated by reference in their entirety.

TECHNICAL FIELD

The present disclosure relates to a wireless communication system.

BACKGROUND

A variety of technologies, such as machine-to-machine (M2M) communication, machine type communication (MTC), and a variety of devices demanding high data throughput, such as smartphones and tablet personal computers (PCs), have emerged and spread. Accordingly, the volume of data throughput demanded to be processed in a cellular network has rapidly increased. In order to satisfy such rapidly increasing data throughput, carrier aggregation technology or cognitive radio technology for efficiently employing more frequency bands and multiple input multiple output (MIMO) technology or multi-base station (BS) cooperation technology for raising data capacity transmitted on limited frequency resources have been developed.

As more and more communication devices have required greater communication capacity, there has been a need for enhanced mobile broadband (eMBB) communication relative to legacy radio access technology (RAT). In addition, massive machine type communication (mMTC) for providing various services at anytime and anywhere by connecting a plurality of devices and objects to each other is one main issue to be considered in next-generation communication.

Communication system design considering services/user equipment (UEs) sensitive to reliability and latency is also under discussion. The introduction of next-generation RAT is being discussed in consideration of eMBB communication, mMTC, ultra-reliable and low-latency communication (URLLC), and the like.

SUMMARY

As new radio communication technology has been introduced, the number of UEs to which a BS should provide services in a prescribed resource region is increasing and the volume of data and control information that the BS transmits/receives to/from the UEs to which the BS provides services is also increasing. Since the amount of resources available to the BS for communication with the UE(s) is limited, a new method for the BS to efficiently receive/transmit uplink/downlink data and/or uplink/downlink control information from/to the UE(s) using the limited radio resources is needed. In other words, due to increase in the density of nodes and/or the density of UEs, a method for efficiently using high-density nodes or high-density UEs for communication is needed.

A method to efficiently support various services with different requirements in a wireless communication system is also needed.

Overcoming delay or latency is an important challenge to applications, performance of which is sensitive to delay/latency.

Additionally, it is necessary to specify how a UE and a BS will operate when physical uplink control channel (PUCCH) cell switching and hybrid automatic repeat request (HARQ) deferral are configured.

The objects to be achieved with the present disclosure are not limited to what has been particularly described hereinabove and other objects not described herein will be more clearly understood by persons skilled in the art from the following detailed description.

In an aspect of the present disclosure, there is provided a method of transmitting, by a user equipment (UE), hybrid automatic repeat request-acknowledgement (HARQ-ACK) information in a wireless communication system. The method may include: performing physical downlink shared channel (PDSCH) reception; based on a first cell slot n on a first cell on which HARQ-ACK transmission for the PDSCH reception is scheduled and a predetermined rule for physical uplink control channel (PUCCH) cell switching, determining a PUCCH cell among a plurality of cells including the first cell and a second cell different from the first cell; determining a PUCCH cell slot related to the first cell slot n among slots on the PUCCH cell for the first cell slot n; and based on that the HARQ-ACK transmission overlaps with a downlink symbol in the PUCCH cell slot on the PUCCH cell for the first cell slot n, determining a target slot to which the HARQ-ACK transmission is deferred.

In another aspect of the present disclosure, there is provided a UE configured to transmit HARQ-ACK information in a wireless communication system. The UE may include: at least one transceiver; at least one processor; and at least one computer memory operably connected to the at least one processor and configured to store instructions that, when executed, cause the at least one processor to perform operations. The operations may include: PDSCH reception; based on a first cell slot n on a first cell on which HARQ-ACK transmission for the PDSCH reception is scheduled and a predetermined rule for PUCCH cell switching, determining a PUCCH cell among a plurality of cells including the first cell and a second cell different from the first cell; determining a PUCCH cell slot related to the first cell slot n among slots on the PUCCH cell for the first cell slot n; and based on that the HARQ-ACK transmission overlaps with a downlink symbol in the PUCCH cell slot on the PUCCH cell for the first cell slot n, determining a target slot to which the HARQ-ACK transmission is deferred.

In another aspect of the present disclosure, there is provided a processing device. The processing device may include: at least one processor; and at least one computer memory operably connected to the at least one processor and configured to store instructions that, when executed, cause the at least one processor to perform operations. The operations may include: PDSCH reception; based on a first cell slot n on a first cell on which HARQ-ACK transmission for the PDSCH reception is scheduled and a predetermined rule for PUCCH cell switching, determining a PUCCH cell among a plurality of cells including the first cell and a second cell different from the first cell; determining a PUCCH cell slot related to the first cell slot n among slots on the PUCCH cell for the first cell slot n; and based on that the HARQ-ACK transmission overlaps with a downlink symbol in the PUCCH cell slot on the PUCCH cell for the first cell slot n, determining a target slot to which the HARQ-ACK transmission is deferred.

In another aspect of the present disclosure, there is provided a computer-readable storage medium. The computer-readable storage medium may be configured to store at least one computer program including instructions that, when executed by at least one processor, cause the at least one processor to perform operations for a UE. The operations may include: PDSCH reception; based on a first cell slot n on a first cell on which HARQ-ACK transmission for the PDSCH reception is scheduled and a predetermined rule for PUCCH cell switching, determining a PUCCH cell among a plurality of cells including the first cell and a second cell different from the first cell; determining a PUCCH cell slot related to the first cell slot n among slots on the PUCCH cell for the first cell slot n; and based on that the HARQ-ACK transmission overlaps with a downlink symbol in the PUCCH cell slot on the PUCCH cell for the first cell slot n, determining a target slot to which the HARQ-ACK transmission is deferred.

In another aspect of the present disclosure, there is provided a computer program stored in a computer-readable storage medium. The computer program may include at least one program code including instructions that, when executed, cause at least one processor to perform operations. The operations may include: PDSCH reception; based on a first cell slot n on a first cell on which HARQ-ACK transmission for the PDSCH reception is scheduled and a predetermined rule for PUCCH cell switching, determining a PUCCH cell among a plurality of cells including the first cell and a second cell different from the first cell; determining a PUCCH cell slot related to the first cell slot n among slots on the PUCCH cell for the first cell slot n; and based on that the HARQ-ACK transmission overlaps with a downlink symbol in the PUCCH cell slot on the PUCCH cell for the first cell slot n, determining a target slot to which the HARQ-ACK transmission is deferred.

In another aspect of the present disclosure, the following may be included: performing PDSCH transmission; based on a first cell slot n on a first cell on which HARQ-ACK reception for the PDSCH transmission is scheduled and a predetermined rule for PUCCH cell switching, determining a PUCCH cell among a plurality of cells including the first cell and a second cell different from the first cell; determining a PUCCH cell slot related to the first cell slot n among slots on the PUCCH cell for the first cell slot n; and based on that the HARQ-ACK reception overlaps with a downlink symbol in the PUCCH cell slot on the PUCCH cell for the first cell slot n, determining a target slot to which the HARQ-ACK reception is deferred.

In a further aspect of the present disclosure, there is provided a base station (BS) configured to receive HARQ-ACK information in a wireless communication system. The BS may include: at least one transceiver; at least one processor; and at least one computer memory operably connected to the at least one processor and configured to store instructions that, when executed, cause the at least one processor to perform operations. The operations may include: performing PDSCH transmission; based on a first cell slot n on a first cell on which HARQ-ACK reception for the PDSCH transmission is scheduled and a predetermined rule for PUCCH cell switching, determining a PUCCH cell among a plurality of cells including the first cell and a second cell different from the first cell; determining a PUCCH cell slot related to the first cell slot n among slots on the PUCCH cell for the first cell slot n; and based on that the HARQ-ACK reception overlaps with a downlink symbol in the PUCCH cell slot on the PUCCH cell for the first cell slot n, determining a target slot to which the HARQ-ACK reception is deferred.

In each aspect of the present disclosure, the first cell slot n may be a slot in which HARQ-ACK transmission for the PDSCH is scheduled.

In each aspect of the present disclosure, the plurality of cells may be configured for PUCCH cell switching. Determining the PUCCH cell among the plurality of cells comprises determining the PUCCH cell for the first cell slot n among the plurality of cells based on the predetermined rule for the PUCCH cell switching.

In each aspect of the present disclosure, the target slot may be an earliest slot in which the HARQ-ACK reception is capable of being performed among PUCCH cell slots determined based on the predetermined rule and first cell slots on the first cell.

In each aspect of the present disclosure, based on that the HARQ-ACK transmission overlaps with no downlink symbol in the PUCCH cell slot on the PUCCH cell for the first cell slot n, the HARQ-ACK transmission/reception may be performed in the PUCCH cell slot on the PUCCH cell for the first cell slot n.

This may be an earliest slot capable of being performed. In each aspect of the present disclosure, determining the target slot may include: determining a PUCCH cell for a first cell slot n+k on the first cell based on the predetermined rule, where k is a positive integer; based on that the HARQ-ACK reception overlaps with a downlink symbol in a PUCCH cell slot related to the first cell slot n+k among slots on the PUCCH cell for the first cell slot n+k, determining a PUCCH cell for a first cell slot n+k+1 on the first cell; and determining whether the HARQ-ACK transmission/reception is capable of being performed in a PUCCH slot related to the first cell slot n+k+1 on the PUCCH cell for the first cell slot n+k+1.

In each aspect of the present disclosure, the PDSCH transmission may be semi-persistently scheduled PDSCH reception.

The foregoing solutions are merely a part of the examples of the present disclosure and various examples into which the technical features of the present disclosure are incorporated may be derived and understood by persons skilled in the art from the following detailed description.

According to some implementations of the present disclosure, a wireless communication signal may be efficiently transmitted/received. Accordingly, the total throughput of a wireless communication system may be raised.

According to some implementations of the present disclosure, various services with different requirements may be efficiently supported in a wireless communication system.

According to some implementations of the present disclosure, delay/latency generated during radio communication between communication devices may be reduced.

According to some implementations of the present disclosure, when a user equipment (UE) is capable of switching a cell to transmit a PUCCH whenever transmitting the PUCCH and deferring transmission of a hybrid automatic repeat request-acknowledgement (HARQ-ACK) for a semi-persistent scheduling (SPS) physical downlink shared channel (PDSCH) according to time division duplex (TDD) configurations, the UE may achieve lower latency for the HARQ operations by combining physical uplink control channel (PUCCH) cell switching and HARQ-ACK deferral.

The effects according to the present disclosure are not limited to what has been particularly described hereinabove and other effects not described herein will be more clearly understood by persons skilled in the art related to the present disclosure from the following detailed description.

BRIEF DESCRIPTION OF THE DRAWINGS

The accompanying drawings, which are included to provide a further understanding of the present disclosure, illustrate examples of implementations of the present disclosure and together with the detailed description serve to explain implementations of the present disclosure:

FIG. 1 illustrates an example of a communication system 1 to which implementations of the present disclosure are applied;

FIG. 13 illustrates UCI multiplexing considering a timeline condition;

FIG. 14 illustrates exemplary HARQ-ACK deferral;

DETAILED DESCRIPTION

Figure 2:
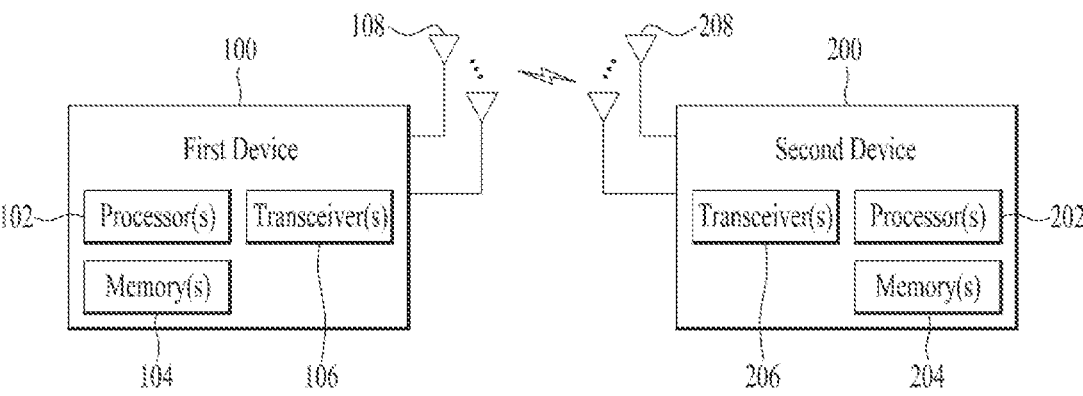
FIG. 2 is a block diagram illustrating examples of communication devices capable of performing a method according to the present disclosure.

Hereinafter, implementations according to the present disclosure will be described in detail with reference to the accompanying drawings. The detailed description, which will be given below with reference to the accompanying drawings, is intended to explain exemplary implementations of the present disclosure, rather than to show the only implementations that may be implemented according to the present disclosure. The following detailed description includes specific details in order to provide a thorough understanding of the present disclosure. However, it will be apparent to those skilled in the art that the present disclosure may be practiced without such specific details.

In some instances, known structures and devices may be omitted or may be shown in block diagram form, focusing on important features of the structures and devices, so as not to obscure the concept of the present disclosure. The same reference numbers will be used throughout the present disclosure to refer to the same or like parts.

A technique, a device, and a system described below may be applied to a variety of wireless multiple access systems. The multiple access systems may include, for example, a code division multiple access (CDMA) system, a frequency division multiple access (FDMA) system, a time division multiple access (TDMA) system, an orthogonal frequency division multiple access (OFDMA) system, a single-carrier frequency division multiple access (SC-FDMA) system, a multi-carrier frequency division multiple access (MC-FDMA) system, etc. CDMA may be implemented by radio technology such as universal terrestrial radio access (UTRA) or CDMA2000. TDMA may be implemented by radio technology such as global system for mobile communications (GSM), general packet radio service (GPRS), enhanced data rates for GSM evolution (EDGE) (i.e., GERAN), etc. OFDMA may be implemented by radio technology such as institute of electrical and electronics engineers (IEEE) 802.11 (Wi-Fi), IEEE 802.16 (WiMAX), IEEE 802.20, evolved-UTRA (E-UTRA), etc. UTRA is part of universal mobile telecommunications system (UMTS) and 3rd generation partnership project (3GPP) long-term evolution (LTE) is part of E-UMTS using E-UTRA. 3GPP LTE adopts OFDMA on downlink (DL) and adopts SC-FDMA on uplink (UL). LTE-advanced (LTE-A) is an evolved version of 3GPP LTE.

For convenience of description, description will be given under the assumption that the present disclosure is applied to LTE and/or new RAT (NR). However, the technical features of the present disclosure are not limited thereto. For example, although the following detailed description is given based on mobile communication systems corresponding to 3GPP LTE/NR systems, the mobile communication systems are applicable to other arbitrary mobile communication systems except for matters that are specific to the 3GPP LTE/NR system.

For terms and techniques that are not described in detail among terms and techniques used in the present disclosure, reference may be made to 3GPP based standard specifications, for example, 3GPP TS 36.211, 3GPP TS 36.212, 3GPP TS 36.213, 3GPP TS 36.321, 3GPP TS 36.300, 3GPP TS 36.331, 3GPP TS 37.213, 3GPP TS 38.211, 3GPP TS 38.212, 3GPP TS 38.213, 3GPP TS 38.214, 3GPP TS 38.300, 3GPP TS 38.321, 3GPP TS 38.331, etc.

In examples of the present disclosure described later, if a device "assumes" something, this may mean that a channel transmission entity transmits a channel in compliance with the corresponding "assumption". This also may mean that a channel reception entity receives or decodes the channel in the form of conforming to the "assumption" on the premise that the channel has been transmitted in compliance with the "assumption".

In the present disclosure, a user equipment (UE) may be fixed or mobile. Each of various devices that transmit and/or receive user data and/or control information by communicating with a base station (BS) may be the UE. The term UE may be referred to as terminal equipment, mobile station (MS), mobile terminal (MT), user terminal (UT), subscriber station (SS), wireless device, personal digital assistant (PDA), wireless modem, handheld device, etc. In the present disclosure, a BS refers to a fixed station that communicates with a UE and/or another BS and exchanges data and control information with a UE and another BS. The term BS may be referred to as advanced base station (ABS), Node-B (NB), evolved Node-B (eNB), base transceiver system (BTS), access point (AP), processing server (PS), etc. Particularly, a BS of a universal terrestrial radio access (UTRAN) is referred to as an NB, a BS of an evolved-UTRAN (E-UTRAN) is referred to as an eNB, and a BS of new radio access technology network is referred to as a gNB. Hereinbelow, for convenience of description, the NB, eNB, or gNB will be referred to as a BS regardless of the type or version of communication technology.

In the present disclosure, a node refers to a fixed point capable of transmitting/receiving a radio signal to/from a UE by communication with the UE. Various types of BSs may be used as nodes regardless of the names thereof. For example, a BS, NB, eNB, pico-cell eNB (PeNB), home eNB (HeNB), relay, repeater, etc. may be a node. Furthermore, a node may not be a BS. For example, a radio remote head (RRH) or a radio remote unit (RRU) may be a node. Generally, the RRH and RRU have power levels lower than that of the BS. Since the RRH or RRU (hereinafter, RRH/RRU) is connected to the BS through a dedicated line such as an optical cable in general, cooperative communication according to the RRH/RRU and the BS may be smoothly performed relative to cooperative communication according to BSs connected through a wireless link. At least one antenna is installed per node. An antenna may refer to a physical antenna port or refer to a virtual antenna or an antenna group. The node may also be called a point.

In the present disclosure, a cell refers to a specific geographical area in which one or more nodes provide communication services. Accordingly, in the present disclosure, communication with a specific cell may mean communication with a BS or a node providing communication services to the specific cell. A DL/UL signal of the specific cell refers to a DL/UL signal from/to the BS or the node providing communication services to the specific cell. A cell providing UL/DL communication services to a UE is especially called a serving cell. Furthermore, channel status/ quality of the specific cell refers to channel status/quality of a channel or a communication link generated between the BS or the node providing communication services to the specific cell and the UE. In 3GPP-based communication systems, the UE may measure a DL channel state from a specific node using cell-specific reference signal(s) (CRS(s)) transmitted on a CRS resource and/or channel state information reference signal(s) (CSI-RS(s)) transmitted on a CSI-RS resource, allocated to the specific node by antenna port(s) of the specific node.

A 3GPP-based communication system uses the concept of a cell in order to manage radio resources, and a cell related with the radio resources is distinguished from a cell of a geographic area.

The "cell" of the geographic area may be understood as coverage within which a node may provide services using a carrier, and the "cell" of the radio resources is associated with bandwidth (BW), which is a frequency range configured by the carrier. Since DL coverage, which is a range within which the node is capable of transmitting a valid signal, and UL coverage, which is a range within which the node is capable of receiving the valid signal from the UE, depend upon a carrier carrying the signal, coverage of the node may also be associated with coverage of the "cell" of radio resources used by the node. Accordingly, the term "cell" may be used to indicate service coverage by the node sometimes, radio resources at other times, or a range that a signal using the radio resources may reach with valid strength at other times.

In 3GPP communication standards, the concept of the cell is used in order to manage radio resources. The "cell" associated with the radio resources is defined by a combination of DL resources and UL resources, that is, a combination of a DL component carrier (CC) and a UL CC. The cell may be configured by the DL resources only or by the combination of the DL resources and the UL resources. If carrier aggregation is supported, linkage between a carrier frequency of the DL resources (or DL CC) and a carrier frequency of the UL resources (or UL CC) may be indicated by system information. For example, the combination of the DL resources and the UL resources may be indicated by system information block type 2 (SIB2) linkage. In this case, the carrier frequency may be equal to or different from a center frequency of each cell or CC. When carrier aggregation (CA) is configured, the UE has only one radio resource control (RRC) connection with a network. During RRC connection establishment/re-establishment/handover, one serving cell provides non-access stratum (NAS) mobility information. During RRC connection re-establishment/handover, one serving cell provides security input. This cell is referred to as a primary cell (Pcell). The Pcell refers to a cell operating on a primary frequency on which the UE performs an initial connection establishment procedure or initiates a connection re-establishment procedure. According to UE capability, secondary cells (Scells) may be configured to form a set of serving cells together with the Pcell. The Scell may be configured after completion of RRC connection establishment and used to provide additional radio resources in addition to resources of a specific cell (SpCell). A carrier corresponding to the Pcell on DL is referred to as a downlink primary CC (DL PCC), and a carrier corresponding to the Pcell on UL is referred to as an uplink primary CC (UL PCC). A carrier corresponding to the Scell on DL is referred to as a downlink secondary CC (DL SCC), and a carrier corresponding to the Scell on UL is referred to as an uplink secondary CC (UL SCC).

In a dual connectivity (DC) operation, the term special cell (SpCell) refers to a Pcell of a master cell group (MCG) or a primary secondary cell (PSCell) of a secondary cell group (SCG). The SpCell supports PUCCH transmission and contention-based random access and is always activated. The MCG is a group of service cells associated with a master node (e.g., BS) and includes the SpCell (Pcell) and optionally one or more Scells. For a UE configured with DC, the SCG is a subset of serving cells associated with a secondary node and includes the PSCell and 0 or more Scells. The PSCell is a primary Scell of the SCG. For a UE in RRC_CONNECTED state, that is not configured with CA or DC, only one serving cell including only the Pcell is present. For a UE in RRC_CONNECTED state, that is configured with CA or DC, the term serving cells refers to a set of cells including SpCell(s) and all Scell(s). In DC, two medium access control (MAC) entities, i.e., one MAC entity for the MCG and one MAC entity for the SCG, are configured for the UE.

For a UE that is configured with CA and is not configured with DC, a Pcell PUCCH group (also called a primary PUCCH group) including the Pcell and 0 or more Scells and an Scell PUCCH group (also called a secondary PUCCH group) including only Scell(s) may be configured. For the Scell, an Scell on which a PUCCH associated with the corresponding cell is transmitted (hereinafter, a PUCCH cell) may be configured. An Scell for which a PUCCH Scell is indicated belongs to the Scell PUCCH group (i.e., the secondary PUCCH group) and PUCCH transmission of related uplink control information (UCI) is performed on the PUCCH Scell. If a PUCCH Scell is not indicated for an Scell or a cell which is indicated for PUCCH transmission for the Scell is a Pcell, the Scell belongs to the Pcell PUCCH group (i.e., the primary PUCCH group) and PUCCH transmission of related UCI is performed on the Pcell. Hereinbelow, if the UE is configured with the SCG and some implementations of the present disclosure related to a PUCCH are applied to the SCG, the primary cell may refer to the PSCell of the SCG. If the UE is configured with the PUCCH Scell and some implementations of the present disclosure related to the PUCCH are applied to the secondary PUCCH group, the primary cell may refer to the PUCCH Scell of the secondary PUCCH group.

In a wireless communication system, the UE receives information on DL from the BS and the UE transmits information on UL to the BS. The information that the BS and UE transmit and/or receive includes data and a variety of control information and there are various physical channels according to types/usage of the information that the UE and the BS transmit and/or receive.

The 3GPP-based communication standards define DL physical channels corresponding to resource elements carrying information originating from a higher layer and DL physical signals corresponding to resource elements which are used by the physical layer but do not carry the information originating from the higher layer. For example, a physical downlink shared channel (PDSCH), a physical broadcast channel (PBCH), a physical multicast channel (PMCH), a physical control format indicator channel (PCFICH), a physical downlink control channel (PDCCH), etc. are defined as the DL physical channels, and a reference signal (RS) and a synchronization signal (SS) are defined as the DL physical signals. The RS, which is also referred to as a pilot, represents a signal with a predefined special waveform known to both the BS and the UE. For example, a demodulation reference signal (DMRS), a channel state information RS (CSI-RS), etc. are defined as DL RSs. The 3GPP-based communication standards define UL physical channels corresponding to resource elements carrying information originating from the higher layer and UL physical signals corresponding to resource elements which are used by the physical layer but do not carry the information originating from the higher layer. For example, a physical uplink shared channel (PUSCH), a physical uplink control channel (PUCCH), and a physical random access channel (PRACH) are defined as the UL physical channels, and a DMRS for a UL control/data signal, a sounding reference signal (SRS) used for UL channel measurement, etc. are defined.

In the present disclosure, a PDCCH refers to a set of time-frequency resources (e.g., resource elements (REs)) carrying downlink control information (DCI), and a PDSCH refers to a set of time-frequency resources carrying DL data. A PUCCH, a PUSCH, and a PRACH refer to a set of time-frequency resources carrying UCI, a set of time-frequency resources carrying UL data, and a set of time-frequency resources carrying random access signals, respectively. In the following description, "the UE transmits/receives a PUCCH/PUSCH/PRACH" is used as the same meaning that the UE transmits/receives the UCI/UL data/ random access signals on or through the PUCCH/PUSCH/PRACH, respectively. In addition, "the BS transmits/receives a PBCH/PDCCH/PDSCH" is used as the same meaning that the BS transmits the broadcast information/DCI/DL data on or through a PBCH/PDCCH/PDSCH, respectively.

In this specification, a radio resource (e.g., a time-frequency resource) scheduled or configured to the UE by the BS for transmission or reception of the PUCCH/PUSCH/PDSCH may be referred to as a PUCCH/PUSCH/PDSCH resource.

Since a communication device receives a synchronization signal block (SSB), DMRS, CSI-RS, PBCH, PDCCH, PDSCH, PUSCH, and/or PUCCH in the form of radio signals on a cell, the communication device may not select and receive radio signals including only a specific physical channel or a specific physical signal through a radio frequency (RF) receiver, or may not select and receive radio signals without a specific physical channel or a specific physical signal through the RF receiver. In actual operations, the communication device receives radio signals on the cell via the RF receiver, converts the radio signals, which are RF band signals, into baseband signals, and then decodes physical signals and/or physical channels in the baseband signals using one or more processors. Thus, in some implementations of the present disclosure, reception of physical signals and/or physical channels may mean that a communication device does not attempt to restore the physical signals and/or physical channels from radio signals, for example, does not attempt to decode the physical signals and/or physical channels, rather than that the communication device does not actually receive the radio signals including the corresponding physical signals and/or physical channels.

As more and more communication devices have required greater communication capacity, there has been a need for eMBB communication relative to legacy radio access technology (RAT). In addition, massive MTC for providing various services at anytime and anywhere by connecting a plurality of devices and objects to each other is one main issue to be considered in next-generation communication. Further, communication system design considering services/UEs sensitive to reliability and latency is also under discussion. The introduction of next-generation RAT is being discussed in consideration of eMBB communication, massive MTC, ultra-reliable and low-latency communication (URLLC), and the like. Currently, in 3GPP, a study on the next-generation mobile communication systems after EPC is being conducted. In the present disclosure, for convenience, the corresponding technology is referred to as a new RAT (NR) or fifth-generation (5G) RAT, and a system using NR or supporting NR is referred to as an NR system.

Figure 1:
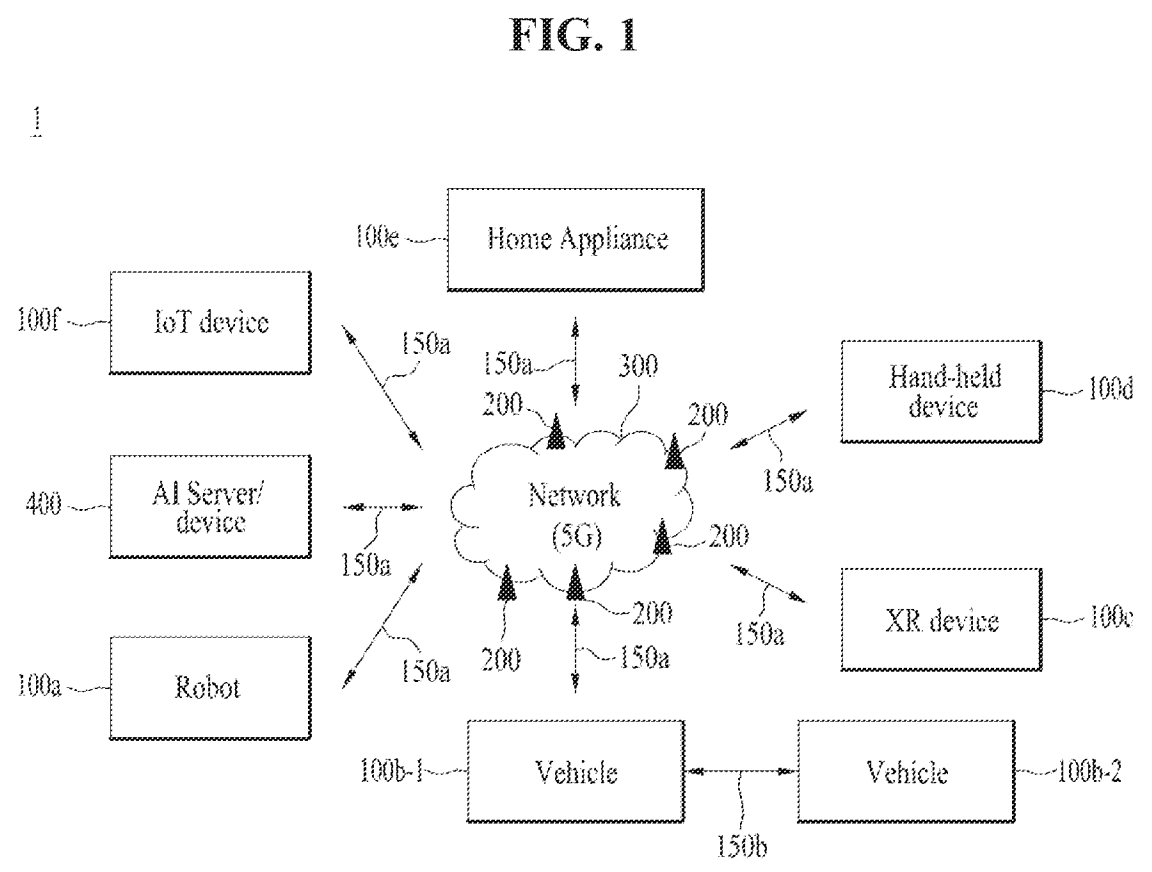

FIG. 1 illustrates an example of a communication system 1 to which implementations of the present disclosure are applied. Referring to FIG. 1, the communication system 1 applied to the present disclosure includes wireless devices, BSs, and a network. Here, the wireless devices represent devices performing communication using RAT (e.g., 5G NR or LTE (e.g., E-UTRA)) and may be referred to as communication/radio/5G devices. The wireless devices may include, without being limited to, a robot 100a, vehicles 100b-1 and 100b-2, an extended reality (XR) device 100c, a hand-held device 100d, a home appliance 100e, an Internet of Things (IOT) device 100f, and an artificial intelligence (AI) device/server 400. For example, the vehicles may include a vehicle having a wireless communication function, an autonomous driving vehicle, and a vehicle capable of performing vehicle-to-vehicle communication. Here, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may also be implemented as wireless devices and a specific wireless device may operate as a BS/network node with respect to another wireless device.

The wireless devices 100a to 100f may be connected to a network 300 via BSs 200. AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. vehicle-to-vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a and 150b may be established between the wireless devices 100a to 100f and the BSs 200 and between the wireless devices 100a to 100f). Here, the wireless communication/connections such as UL/DL communication 150a and sidelink communication 150b (or, device-to-device (D2D) communication) may be established by various RATs (e.g., 5G NR). The wireless devices and the BSs/wireless devices may transmit/receive radio signals to/from each other through the wireless communication/connections 150a and 150b. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

FIG. 2 is a block diagram illustrating examples of communication devices capable of performing a method according to the present disclosure. Referring to FIG. 2, a first wireless device 100 and a second wireless device 200 may transmit and/or receive radio signals through a variety of RATs (e.g., LTE and NR). Here, {the first wireless device 100 and the second wireless device 200} may correspond to {the wireless device 100x and the BS 200} and/or {the wireless device 100x and the wireless device 100x} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the below-described/proposed functions, procedures, and/or methods. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may perform a part or all of processes controlled by the processor(s) 102 or store software code including instructions for performing the below-described/ proposed procedures and/or methods. Here, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 is used interchangeably with radio frequency (RF) unit(s). In the present disclosure, the wireless device may represent the communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the below-described/proposed functions, procedures, and/or methods. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may perform a part or all of processes controlled by the processor(s) 202 or store software code including instructions for performing the below-described/ proposed procedures and/or methods. Here, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 is used interchangeably with RF unit(s). In the present disclosure, the wireless device may represent the communication modem/circuit/chip.

The wireless communication technology implemented in the wireless devices 100 and 200 of the present disclosure may include narrowband Internet of things for low-power communication as well as LTE, NR, and 6G. For example, the NB-IOT technology may be an example of low-power wide-area network (LPWAN) technologies and implemented in standards such as LTE Cat NB1 and/or LTE Cat NB2. However, the NB-IOT technology is not limited to the above names. Additionally or alternatively, the wireless communication technology implemented in the wireless devices XXX and YYY of the present disclosure may perform communication based on the LTE-M technology. For example, the LTE-M technology may be an example of LPWAN technologies and called by various names including enhanced machine type communication (eMTC). For example, the LTE-M technology may be implemented in at least one of the following various standards: 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, etc., but the LTE-M technology is not limited to the above names. Additionally or alternatively, the wireless communication technology implemented in the wireless devices XXX and YYY of the present disclosure may include at least one of ZigBee, Bluetooth, and LPWAN in consideration of low-power communication, but the wireless communication technology is not limited to the above names. For example, the ZigBee technology may create a personal area network (PAN) related to small/low-power digital communication based on various standards such as IEEE 802.15.4 and so on, and the ZigBee technology may be called by various names.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as a physical (PHY) layer, medium access control (MAC) layer, a radio link control (RLC) layer, a packet data convergence protocol (PDCP) layer, radio resource control (RRC) layer, and a service data adaptation protocol (SDAP) layer). The one or more processors 102 and 202 may generate one or more protocol data units (PDUs) and/or one or more service data units (SDUs) according to the functions, procedures, proposals, and/or methods disclosed in the present disclosure. The one or more processors 102 and 202 may generate messages, control information, data, or information according to the functions, procedures, proposals, and/or methods disclosed in the present disclosure. The one or more processors 102 and 202 may generate signals (e.g., baseband signals) including PDUs, SDUs, messages, control information, data, or information according to the functions, procedures, proposals, and/or methods disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the functions, procedures, proposals, and/or methods disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The functions, procedures, proposals, and/or methods disclosed in the present disclosure may be implemented using firmware or software, and the firmware or software may be configured to include the modules, procedures, or functions. Firmware or software configured to perform the functions, procedures, proposals, and/or methods disclosed in the present disclosure may be included in the one or more processors 102 and 202 or stored in the one or more memories 104 and 204 so as to be driven by the one or more processors 102 and 202. The functions, procedures, proposals, and/or methods disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, commands, and/or instructions. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of the present disclosure, to one or more other devices. The one or more transceivers 106 and 206 may receive user data, control information, and/or radio signals/channels, mentioned in the functions, procedures, proposals, methods, and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208. The one or more transceivers 106 and 206 may be configured to transmit and receive user data, control information, and/or radio signals/channels, mentioned in the functions, procedures, proposals, methods, and/or operational flowcharts disclosed in the present disclosure, through the one or more antennas 108 and 208. In the present disclosure, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 3:
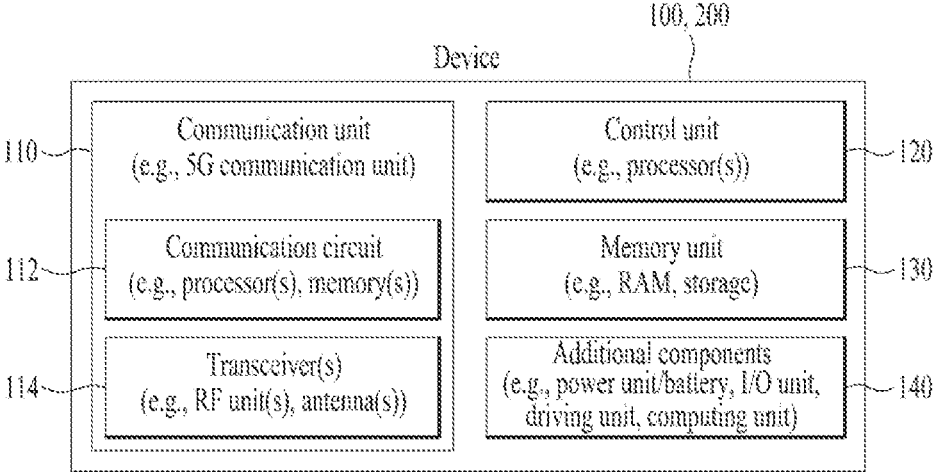
FIG. 3 illustrates another example of a wireless device capable of performing implementation(s) of the present disclosure.

FIG. 3 illustrates another example of a wireless device capable of performing implementation(s) of the present disclosure. Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 2. For example, the transceiver(s) 114 may include the one or more transceivers 106 and 206 and/or the one or more antennas 108 and 208 of FIG. 2. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast UE, a hologram device, a public safety device, an MTC device, a medicine device, a fintech device (or a finance device), a security device, a climate/environment device, the AI server/device (400 of FIG. 1), the BS (200 of FIG. 1), a network node, etc. The wireless device may be used in a mobile or fixed place according to a use-case/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a random access memory (RAM), a dynamic RAM (DRAM), a read-only memory (ROM)), a flash memory, a volatile memory, a non-volatile memory, and/or a combination thereof.

In the present disclosure, the at least one memory (e.g., 104 or 204) may store instructions or programs, and the instructions or programs may cause, when executed, at least one processor operably connected to the at least one memory to perform operations according to some embodiments or implementations of the present disclosure.

In the present disclosure, a computer readable (non-transitory) storage medium may store at least one instruction or program, and the at least one instruction or program may cause, when executed by at least one processor, the at least one processor to perform operations according to some embodiments or implementations of the present disclosure.

In the present disclosure, a processing device or apparatus may include at least one processor, and at least one computer memory operably connected to the at least one processor. The at least one computer memory may store instructions or programs, and the instructions or programs may cause, when executed, the at least one processor operably connected to the at least one memory to perform operations according to some embodiments or implementations of the present disclosure.

In the present disclosure, a computer program may include program code stored on at least one computer-readable (non-volatile) storage medium and, when executed, configured to perform operations according to some implementations of the present disclosure or cause at least one processor to perform the operations according to some implementations of the present disclosure. The computer program may be provided in the form of a computer program product. The computer program product may include at least one computer-readable (non-volatile) storage medium.

A communication device of the present disclosure includes at least one processor; and at least one computer memory operably connected to the at least one processor and configured to store instructions for causing, when executed, the at least one processor to perform operations according to example(s) of the present disclosure described later.

Figure 4:
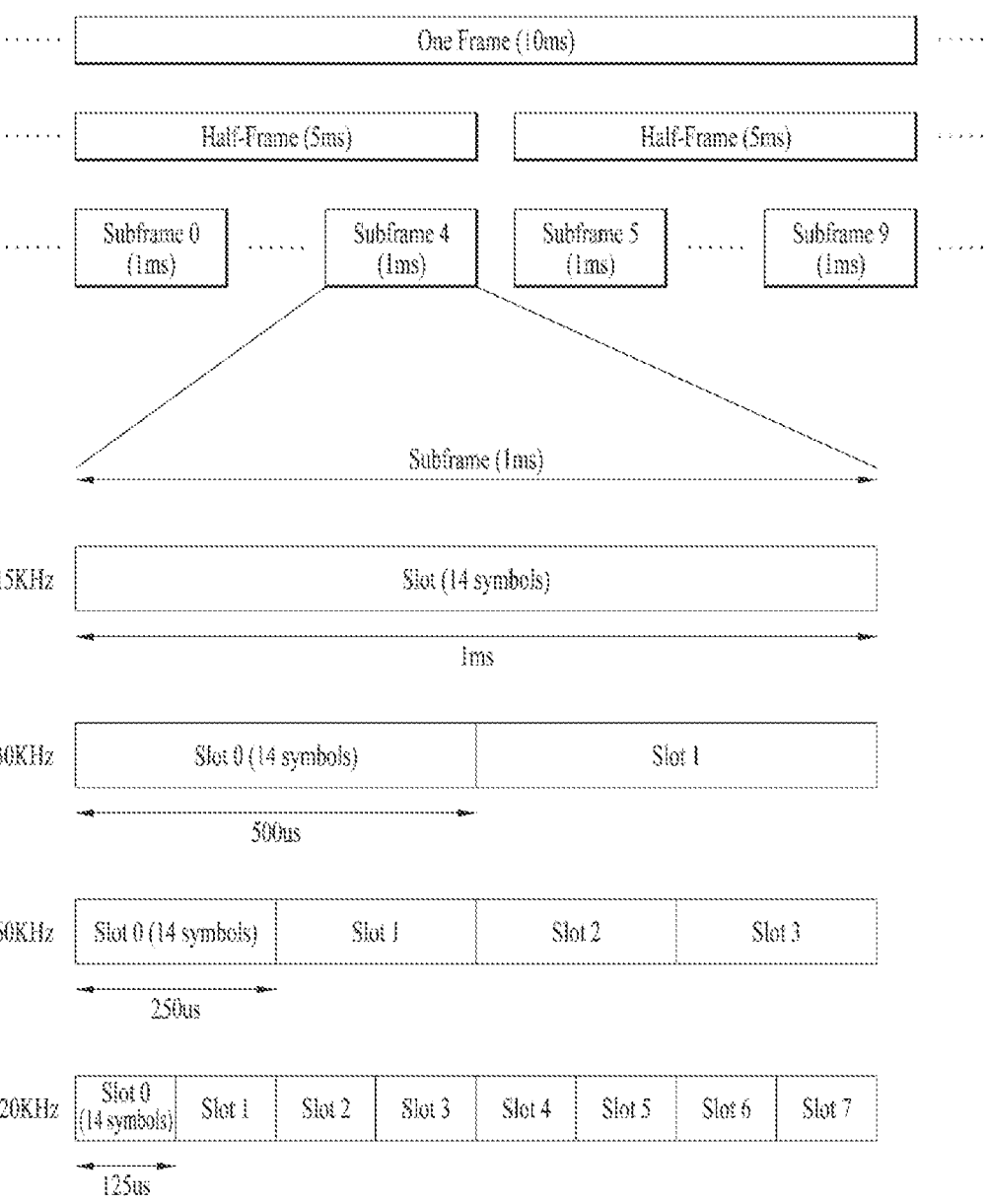
FIG. 4 illustrates an example of a frame structure used in a 3rd generation partnership project (3GPP)-based wireless communication system.

FIG. 4 illustrates an example of a frame structure used in a 3GPP-based wireless communication system.

The frame structure of FIG. 4 is purely exemplary and the number of subframes, the number of slots, and the number of symbols, in a frame, may be variously changed. In an NR system, different OFDM numerologies (e.g., subcarrier spacings (SCSs)) may be configured for multiple cells which are aggregated for one UE. Accordingly, the (absolute time) duration of a time resource including the same number of symbols (e.g., a subframe, a slot, or a transmission time interval (TTI)) may be differently configured for the aggregated cells. Here, the symbol may include an OFDM symbol (or cyclic prefix-OFDM (CP-OFDM) symbol) and an SC-FDMA symbol (or discrete Fourier transform-spread-OFDM (DFT-s-OFDM) symbol). In the present disclosure, the symbol, the OFDM-based symbol, the OFDM symbol, the CP-OFDM symbol, and the DFT-s-OFDM symbol are used interchangeably.

Referring to FIG. 4, in the NR system, UL and DL transmissions are organized into frames. Each frame has a duration of $T_f = (\Delta f_{max} * N_f / 100) * T_c = 10$ ms and is divided into two half-frames of 5 ms each. A basic time unit for NR is $T_c = 1/(\Delta f_{max} * N_f)$ where $\Delta f_{max} = 480 * 10^3$ Hz and $N_f = 4096$. For reference, a basic time unit for LTE is $T_s = 1/(\Delta f_{ref} * N_{f,ref})$ where $\Delta f_{ref} = 15 * 10^3$ Hz and $N_{f,ref} = 2048$. $T_c$ and $T_f$ have the relationship of a constant $\kappa = T_s / T_c = 64$. Each half-frame includes 5 subframes and a duration $T_{sf}$ of a single subframe is 1 ms. Subframes are further divided into slots and the number of slots in a subframe depends on a subcarrier spacing. Each slot includes 14 or 12 OFDM symbols based on a cyclic prefix. In a normal CP, each slot includes 14 OFDM symbols and, in an extended CP, each slot includes 12 OFDM symbols. The numerology depends on an exponentially scalable subcarrier spacing $\Delta f = 2^u * 15$ kHz. The table below shows the number of OFDM symbols ($N^{slot}_{symb}$) per slot, the number of slots ($N^{frame,u}_{slot}$) per frame, and the number of slots ($N^{subframe,u}_{slot}$) per subframe.

TABLE 1

| u | $N^{slot}_{symb}$ | $N^{frame,\,u}_{slot}$ | $N^{subframe,\,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The table below shows the number of OFDM symbols per slot, the number of slots per frame, and the number of slots per subframe, according to the subcarrier spacing $\Delta f=2^u*15$ KHz.

TABLE 2

| u | $N^{slot}_{symb}$ | $N^{frame,\,u}_{slot}$ | $N^{subframe,\,u}_{slot}$ |
|---|---|---|---|
| 2 | 12 | 40 | 4 |

For a subcarrier spacing configuration u, slots may be indexed within a subframe in ascending order as follows: $n^u_s\in\{0,\ldots,n^{subframe,u}_{slot}-1\}$ and indexed within a frame in ascending order as follows: $n_{s,f}^{u}\in\{0,\ldots,n^{frame,u}_{slot}-1\}$.

Figure 5:
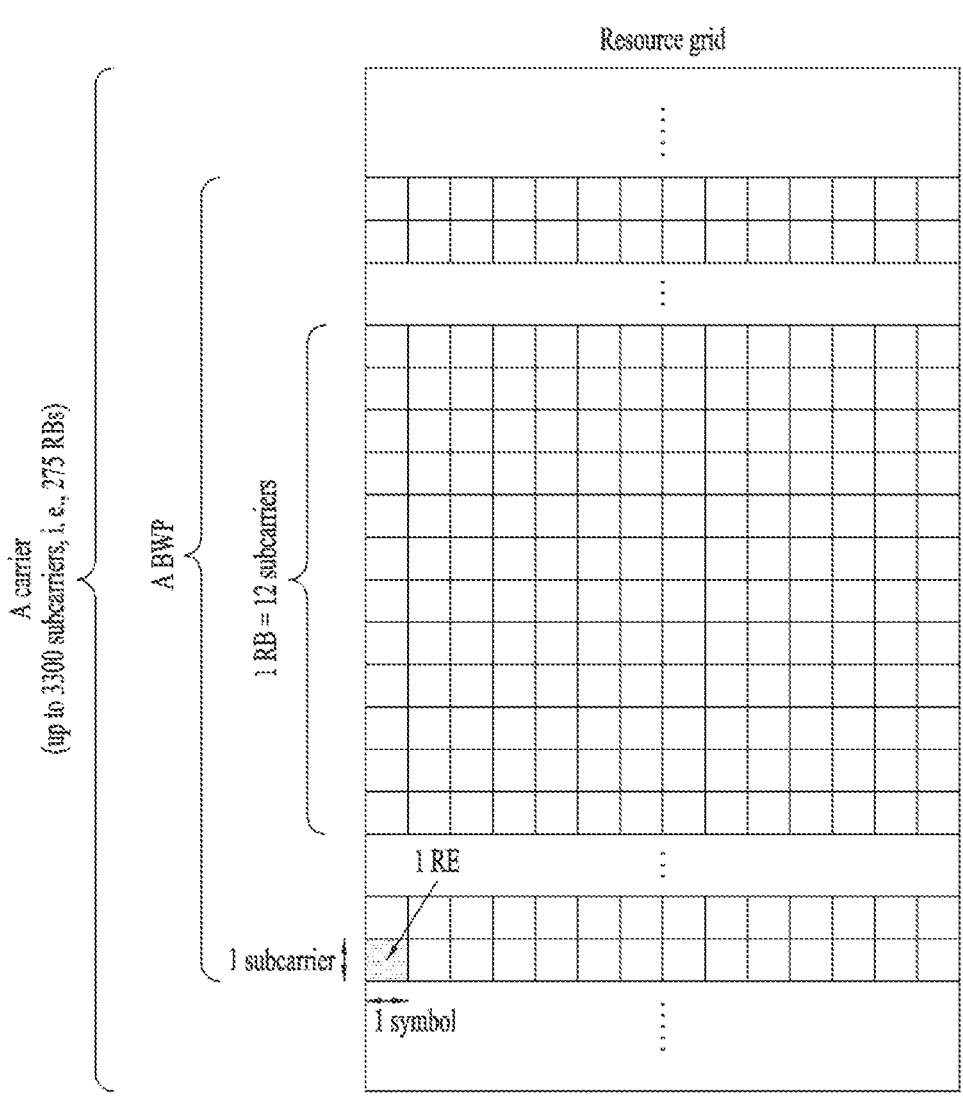
FIG. 5 illustrates a resource grid of a slot.

FIG. 5 illustrates a resource grid of a slot. The slot includes multiple (e.g., 14 or 12) symbols in the time domain. For each numerology (e.g., subcarrier spacing) and carrier, a resource grid of $N^{size,u}_{grid,x}*N^{RB}_{sc}$ subcarriers and $N^{subframe,u}_{symb}$ OFDM symbols is defined, starting at a common resource block (CRB) $N^{start,u}_{grid}$ indicated by higher layer signaling (e.g. RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP-based wireless communication system, $N^{RB}_{sc}$ is typically 12. There is one resource grid for a given antenna port p, a subcarrier spacing configuration u, and a transmission link (DL or UL). The carrier bandwidth $N^{size,u}_{grid}$ for the subcarrier spacing configuration u is given to the UE by a higher layer parameter (e.g. RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the NR system, an RB is defined by 12 consecutive subcarriers in the frequency domain. In the NR system, RBs are classified into CRBs and physical resource blocks (PRBs). The CRBs are numbered from 0 upwards in the frequency domain for the subcarrier spacing configuration u. The center of subcarrier 0 of CRB 0 for the subcarrier spacing configuration u is equal to 'Point A' which serves as a common reference point for RB grids. The PRBs for subcarrier spacing configuration u are defined within a bandwidth part (BWP) and numbered from 0 to $N^{size,u}_{BWP,i}-1$, where i is a number of the BWP. The relation between a PRB $n_{PRB}$ in a BWP i and a CRB $n^u_{CRB}$ is given by: $n^u_{PRB}=n^u_{CRB}+N^{size,u}_{BWP,i}$, where $N^{size}_{BWP,i}$ is a CRB in which the BWP starts relative to CRB 0. The BWP includes a plurality of consecutive RBs in the frequency domain. For example, the BWP may be a subset of contiguous CRBs defined for a given numerology $u_i$ in the BWP i on a given carrier. A carrier may include a maximum of N (e.g., 5) BWPs. The UE may be configured to have one or more BWPs on a given component carrier. Data communication is performed through an activated BWP and only a predetermined number of BWPs (e.g., one BWP) among BWPs configured for the UE may be active on the component carrier.

For each serving cell in a set of DL BWPs or UL BWPs, the network may configure at least an initial DL BWP and one (if the serving cell is configured with uplink) or two (if supplementary uplink is used) initial UL BWPs. The network may configure additional UL and DL BWPs. For each DL BWP or UL BWP, the UE may be provided the following parameters for the serving cell: i) an SCS; ii) a CP; iii) a CRB $N^{start}_{BWP}=O_{carrier}+RB_{start}$ and the number of contiguous RBs $N^{size}_{BWP}=L_{RB}$ provided by an RRC parameter locationAndBandwidth, which indicates an offset $RB_{set}$ and a length/RB as a resource indicator value (RIV) on the assumption of $N^{start}_{BWP}=275$, and a value $O_{carrier}$ provided by an RRC parameter offsetToCarrier for the SCS; an index in the set of DL BWPs or UL BWPs; a set of BWP-common parameters; and a set of BWP-dedicated parameters.

Virtual resource blocks (VRBs) may be defined within the BWP and indexed from 0 to $N^{size,u}_{BWP,i}-1$, where i denotes a BWP number. The VRBs may be mapped to PRBs according to non-interleaved mapping. In some implementations, VRB n may be mapped to PRB n for non-interleaved VRB-to-PRB mapping.

The UE for which carrier aggregation is configured may be configured to use one or more cells. If the UE is configured with a plurality of serving cells, the UE may be configured with one or multiple cell groups. The UE may also be configured with a plurality of cell groups associated with different BSs. Alternatively, the UE may be configured with a plurality of cell groups associated with a single BS. Each cell group of the UE includes one or more serving cells and includes a single PUCCH cell for which PUCCH resources are configured. The PUCCH cell may be a Pcell or an Scell configured as the PUCCH cell among Scells of a corresponding cell group. Each serving cell of the UE belongs to one of cell groups of the UE and does not belong to a plurality of cells.

Figure 6:
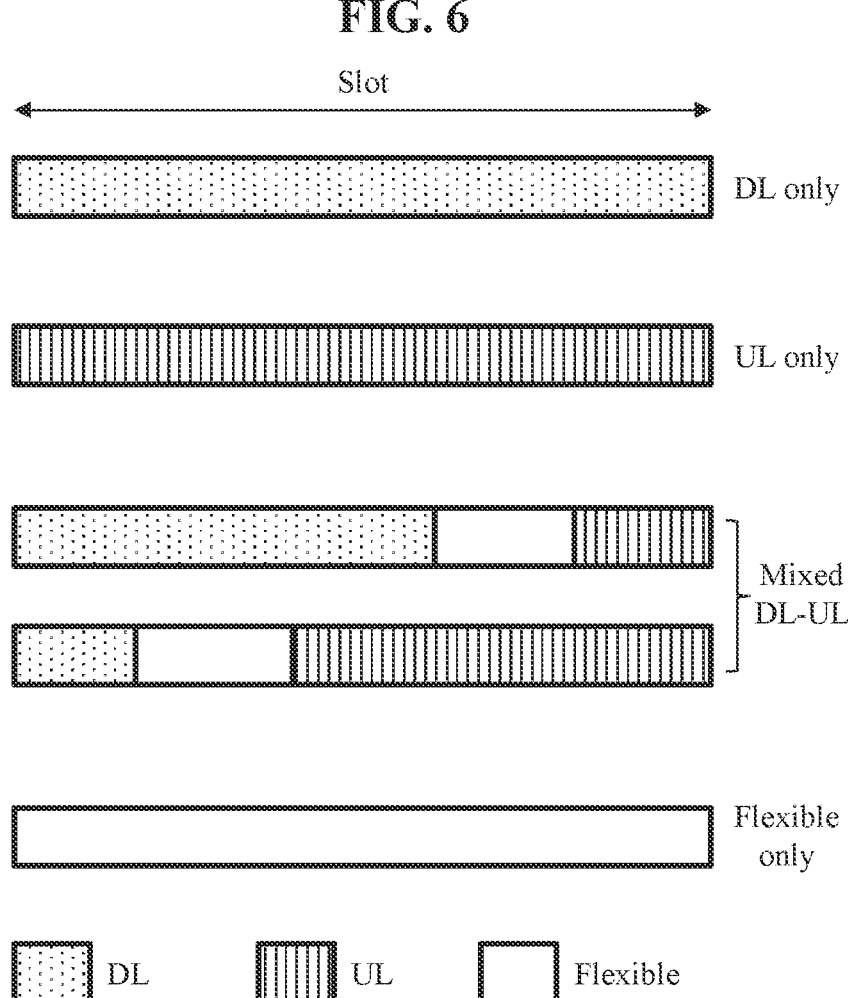
FIG. 6 illustrates slot structures used in a 3GPP-based system.

FIG. 6 illustrates slot structures used in a 3GPP-based system. In all 3GPP-based systems, for example, in an NR system, each slot may have a self-contained structure including i) a DL control channel, ii) DL or UL data, and/or iii) a UL control channel. For example, the first N symbols in a slot may be used to transmit the DL control channel (hereinafter, DL control region) and the last M symbols in a slot may be used to transmit the UL control channel (hereinafter, UL control region), where N and M are integers other than negative numbers. A resource region (hereinafter, data region) between the DL control region and the UL control region may be used to transmit DL data or UL data. Symbols in a single slot may be divided into group(s) of consecutive symbols that may be used as DL symbols, UL symbols, or flexible symbols. Hereinbelow, information indicating how each symbol in slot(s) is used will be referred to as a slot format. For example, which symbols in slot(s) are used for UL and which symbols in slot(s) are used for DL may be defined by a slot format.

When a BS intends to operate a serving cell in time division duplex (TDD) mode, the BS may configure a pattern for UL and DL allocation for the serving cell through higher layer (e.g., RRC) signaling. For example, the following parameters may be used to configure a TDD DL-UL pattern:

dl-UL-TransmissionPeriodicity that provides a periodicity of the DL-UL pattern;

nrofDownlinkSlots that provides the number of consecutive full DL slots at the beginning of each DL-UL pattern, where the full DL slots are slots having only DL symbols;

nrofDownlinkSymbols that provides the number of consecutive DL symbols at the beginning of a slot immediately following the last full DL slot;

nrofUplinkSlots that provides the number of consecutive full UL slots at the end of each DL-UL pattern, where the full UL slots are slots having only UL symbols; and nrofUplinkSymbols that provides the number of consecutive UL symbols in the end of a slot immediately preceding the first full UL slot.

The remaining symbols that are not configured as either DL symbols or UL symbols among symbols in the DL-UL pattern are flexible symbols.

If the UE is provided with a configuration for the TDD DL-UL pattern, i.e., a TDD UL-DL configuration (e.g., tdd-UL-DL-ConfigurationCommon, or tdd-UL-DLConfigurationDedicated), through higher layer signaling, the UE sets a slot format per slot over a number of slots based on the configuration.

For symbols, although there may be various combinations of DL symbols, UL symbols, and flexible symbols, a predetermined number of combinations may be predefined as slot formats and the predefined slot formats may be respectively identified by slot format indexes. The following table shows a part of the predefined slot formats. In the table below, D denotes a DL symbol, U denotes a UL symbol, and F denotes a flexible symbol.

(start) position of a slot format combination ID (i.e., SFI-index) for a corresponding serving cell in the SFI DCI, a set of slot format combinations applicable to the serving cell, and a reference subcarrier spacing configuration for each slot format in a slot format combination indicated by an SFI-index value in the SFI DCI. One or more slot formats are configured for each slot format combination in the set of the slot format combinations and the slot format combination ID (i.e., SFI-index) is assigned to the slot format combination. For example, when the BS intends to configure the slot format combination with N slot formats, N slot format indexes among slot format indexes for the predefined slot formats (e.g., see Table 3) may be indicated for the slot format combination. In order to configure the UE to monitor the group-common PDCCH for the SFIs, the BS informs the UE of an SFI-RNTI corresponding to a radio network temporary identifier (RNTI) used for an SFI and the total length of a DCI payload scrambled with the SFI-RNTI. Upon detecting the PDCCH based on the SFI-RNTI, the UE may determine slot format(s) for the corresponding serving cell from an SFI-index for the serving cell among SFI-indexes in the DCI payload in the PDCCH.

Symbols indicated as flexible symbols by the TDD DL-UL pattern configuration may be indicated as UL symbols, DL symbols, or flexible symbols by the SFI DCI. Symbols indicated as the DL/UL symbols by the TDD DL-UL pattern configuration are not overridden as the UL/DL symbols or the flexible symbols by the SFI DCI.

TABLE 3

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| . . . | | | | | | . . . | | | | | | | | |

To indicate which slot format is used in a specific slot among the predefined slot formats, the BS may configure a set of slot format combinations applicable to a corresponding serving cell per cell with respect to a set of serving cells through higher layer (e.g., RRC) signaling and cause the UE to monitor a group-common PDCCH for slot format indicator(s) (SFI(s)) through higher layer (e.g., RRC) signaling. Hereinafter, DCI carried by the group-common PDCCH for the SFI(s) will be referred to as SFI DCI. DCI format 2_0 is used as the SFI DCI. For example, for each serving cell in a set of serving cells, the BS may provide the UE with the If the TDD DL-UL pattern is not configured, the UE determines whether each slot is used for UL or DL and determines symbol allocation in each slot based on the SFI DCI and/or on DCI for scheduling or triggering DL or UL signal transmission (e.g., DCI format 1_0, DCI format 1_1, DCI format 1_2, DCI format 0_0, DCI format 0_1, DCI format 0_2, or DCI format 2_3).

NR frequency bands are defined as two types of frequency ranges, i.e., FR1 and FR2. FR2 is also referred to as millimeter wave (mmW). The following table shows frequency ranges within which NR may operate.

US 12,701,573 B2

21

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Hereinafter, physical channels that may be used in the 3GPP-based wireless communication system will be described in detail.

A PDCCH carries DCI. For example, the PDCCH (i.e., DCI) carries information about transport format and resource allocation of a downlink shared channel (DL-SCH), information about resource allocation of an uplink shared channel (UL-SCH), paging information about a paging channel (PCH), system information about the DL-SCH, information about resource allocation for a control message, such as a random access response (RAR) transmitted on a PDSCH, of a layer (hereinafter, higher layer) positioned higher than a physical layer among protocol stacks of the UE/BS, a transmit power control command, information about activation/deactivation of configured scheduling (CS), etc. DCI including resource allocation information on the DL-SCH is called PDSCH scheduling DCI, and DCI including resource allocation information on the UL-SCH is called PUSCH scheduling DCI. The DCI includes a cyclic redundancy check (CRC). The CRC is masked/scrambled with various identifiers (e.g., radio network temporary identifier (RNTI)) according to an owner or usage of the PDCCH. For example, if the PDCCH is for a specific UE, the CRS is masked with a UE identifier (e.g., cell-RNTI (C-RNTI)). If the PDCCH is for a paging message, the CRC is masked with a paging RNTI (P-RNTI). If the PDCCH is for system information (e.g., system information block (SIB)), the CRC is masked with a system information RNTI (SI-RNTI). If the PDCCH is for a random access response, the CRC is masked with a random access-RNTI (RA-RNTI).

When a PDCCH on one serving cell schedules a PDSCH or a PUSCH on another serving cell, it is referred to cross-carrier scheduling. Cross-carrier scheduling with a carrier indicator field (CIF) may allow a PDCCH on a serving cell to schedule resources on another serving cell. When a PDSCH on a serving cell schedules a PDSCH or a PUSCH on the serving cell, it is referred to as self-carrier scheduling. When the cross-carrier scheduling is used in a cell, the BS may provide information about a cell scheduling the cell to the UE. For example, the BS may inform the UE whether a serving cell is scheduled by a PDCCH on another (scheduling) cell or scheduled by the serving cell. If the serving cell is scheduled by the other (scheduling) cell, the BS may inform the UE which cell signals DL assignments and UL grants for the serving cell. In the present disclosure, a cell carrying a PDCCH is referred to as a scheduling cell, and a cell where transmission of a PUSCH or a PDSCH is scheduled by DCI included in the PDCCH, that is, a cell carrying the PUSCH or PDSCH scheduled by the PDCCH is referred to as a scheduled cell.

A PDSCH is a physical layer UL channel for UL data transport. The PDSCH carries DL data (e.g., DL-SCH transport block) and is subjected to modulation such as quadrature phase shift keying (QPSK), 16 quadrature amplitude modulation (QAM), 64 QAM, 256 QAM, etc. A codeword is generated by encoding a transport block (TB). The PDSCH may carry a maximum of two codewords. Scrambling and modulation mapping per codeword may be performed and modulation symbols generated from each codeword may be mapped to one or more layers. Each layer is mapped to a radio resource together with a DMRS and generated as an OFDM symbol signal. Then, the OFDM symbol signal is transmitted through a corresponding antenna port.

A PUCCH is a physical layer UL channel for uplink control information (UCI) transmission. The PUCCH carries UCI. UCI types transmitted on the PUCCH include hybrid automatic repeat request acknowledgement (HARQ-ACK) information, a scheduling request (SR), and channel state information (CSI). UCI bits include HARQ-ACK information bits if present, SR information bits if present, link recovery request (LRR) information bits if present, and CSI bits if present. In the present disclosure, HARQ-ACK information bits correspond to a HARQ-ACK codebook. In particular, a bit sequence in which HARQ-ACK information bits are arranged according to a predetermined rule is called a HARQ-ACK codebook.

Scheduling request (SR): Information that is used to request a UL-SCH resource.

Hybrid automatic repeat request (HARQ)-acknowledgment (ACK): A response to a DL data packet (e.g., codeword) on the PDSCH. HARQ-ACK indicates whether the DL data packet has been successfully received by a communication device. In response to a single codeword, 1-bit HARQ-ACK may be transmitted. In response to two codewords, 2-bit HARQ-ACK may be transmitted. The HARQ-ACK response includes positive ACK (simply, ACK), negative ACK (NACK), discontinuous transmission (DTX), or NACK/DTX. Here, the term HARQ-ACK is used interchangeably with HARQ ACK/NACK, ACK/NACK, or A/N.

Channel state information (CSI): Feedback information about a DL channel. The CSI may include channel quality information (CQI), a rank indicator (RI), a precoding matrix indicator (PMI), a CSI-RS resource indicator (CRI), an SS/PBCH resource block indicator (SSBRI), and a layer indicator (L1). The CSI may be classified into CSI part 1 and CSI part 2 according to UCI type included in the CSI. For example, the CRI, RI, and/or the CQI for the first codeword may be included in CSI part 1, and L1, PMI, and/or the CQI for the second codeword may be included in CSI part 2.

Link recovery request (LRR)

In the present disclosure, for convenience, PUCCH resources configured/indicated for/to the UE by the BS for HARQ-ACK, SR, and CSI transmission are referred to as a HARQ-ACK PUCCH resource, an SR PUCCH resource, and a CSI PUCCH resource, respectively.

PUCCH formats may be defined as follows according to UCI payload sizes and/or transmission lengths (e.g., the number of symbols included in PUCCH resources). In regard to the PUCCH formats, reference may also be made to Table 5.

(0) PUCCH Format 0 (PF0 or F0)

Supported UCI payload size: up to K bits (e.g., K=2)

Number of OFDM symbols constituting a single PUCCH: 1 to X symbols (e.g., X=2)

Transmission structure: Only a UCI signal without a DMRS is included in PUCCH format 0. The UE transmits a UCI state by selecting and transmitting one of a plurality of sequences. For example, the UE transmits specific UCI to the BS by transmitting one of a plurality of sequences through a PUCCH, which is PUCCH format 0. The UE transmits the PUCCH, which is PUCCH format 0, in PUCCH resources for a corresponding SR configuration only upon transmitting a positive SR.

Configuration for PUCCH format 0 includes the following parameters for a corresponding PUCCH resource: an index for initial cyclic shift, the number of symbols for PUCCH transmission, and/or the first symbol for PUCCH transmission.

(1) PUCCH Format 1 (PF1 or F1)

Supported UCI payload size: up to K bits (e.g., K=2)

Number of OFDM symbols constituting a single PUCCH: Y to Z symbols (e.g., Y=4 and Z=14)

Transmission structure: The DMRS and UCI are configured/mapped in TDM in/to different OFDM symbols. In other words, the DMRS is transmitted in symbols in which modulation symbols are not transmitted and the UCI is represented as the product between a specific sequence (e.g., orthogonal cover code (OCC)) and a modulation (e.g., QPSK) symbol. Code division multiplexing (CDM) is supported between a plurality of PUCCH resources (conforming to PUCCH format 1) (within the same RB) by applying cyclic shifts (CSs)/OCCs to both the UCI and the DMRS. PUCCH format 1 carries the UCI of up to 2 bits and the modulation symbols are spread by the OCC (differently configured depending on whether frequency hopping is performed) in the time domain.

Configuration for PUCCH format 1 includes the following parameters for a corresponding PUCCH resource: an index for initial cyclic shift, the number of symbols for PUCCH transmission, the first symbol for PUCCH transmission, and/or an index for the OCC.

(2) PUCCH Format 2 (PF2 or F2)

Supported UCI payload size: more than K bits (e.g., K=2)

Number of OFDM symbols constituting a single PUCCH: 1 to X symbols (e.g., X=2)

Transmission structure: The DMRS and UCI are configured/mapped using frequency division multiplexing (FDM) within the same symbol. The UE transmits the UCI by applying only IFFT without DFT to encoded UCI bits. PUCCH format 2 carries UCI of a larger bit size than K bits and modulation symbols are subjected to FDM with the DMRS, for transmission. For example, the DMRS is located in symbol indexes #1, #4, #7, and #10 within a given RB with the density of ⅓. A pseudo noise (PN) sequence is used for a DMRS sequence. Frequency hopping may be activated for 2-symbol PUCCH format 2.

Configuration for PUCCH format 2 includes the following parameters for a corresponding PUCCH resource: the number of PRBs, the number of symbols for PUCCH transmission, and/or the first symbol for PUCCH transmission.

(3) PUCCH Format 3 (PF3 or F3)

Supported UCI payload size: more than K bits (e.g., K=2)

Number of OFDM symbols constituting a single PUCCH: Y to Z symbols (e.g., Y=4 and Z=14)

Transmission structure: The DMRS and UCI are configured/mapped in TDM for/to different OFDM symbols. The UE transmits the UCI by applying DFT to encoded UCI bits. PUCCH format 3 does not support UE multiplexing for the same time-frequency resource (e.g., same PRB).

Configuration for PUCCH format 3 includes the following parameters for a corresponding PUCCH resource: the number of PRBs, the number of symbols for PUCCH transmission, and/or the first symbol for PUCCH transmission.

(4) PUCCH Format 4 (PF4 or F4)

Supported UCI payload size: more than K bits (e.g., K=2)

Number of OFDM symbols constituting a single PUCCH: Y to Z symbols (e.g., Y=4 and Z=14)

Transmission structure: The DMRS and UCI are configured/mapped in TDM for/to different OFDM symbols. PUCCH format 4 may multiplex up to 4 UEs in the same PRB, by applying an OCC at the front end of DFT and applying a CS (or interleaved FDM (IFDM) mapping) to the DMRS. In other words, modulation symbols of the UCI are subjected to TDM with the DMRS, for transmission.

Configuration for PUCCH format 4 includes the following parameters for a corresponding PUCCH resource: the number of symbols for PUCCH transmission, length for the OCC, an index for the OCC, and the first symbol for PUCCH transmission.

The table below shows the PUCCH formats. The PUCCH formats may be divided into short PUCCH formats (formats 0 and 2) and long PUCCH formats (formats 1, 3, and 4) according to PUCCH transmission length.

TABLE 5

| PUCCH format | Length in OFDM symbols $N^{PUCCH}_{symb}$ | Number of bits | Usage | Etc. |
|---|---|---|---|---|
| 0 | 1-2 | =<2 | HARQ, SR | Sequence selection |
| 1 | 4-14 | =<2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM(no UE multiplexing) |
| 4 | 4-14 | >2 | HARQ, CSI, [SR] | DFT-s-OFDM(Pre DFT OCC) |

A PUCCH resource may be determined according to a UCI type (e.g., A/N, SR, or CSI). A PUCCH resource used for UCI transmission may be determined based on a UCI (payload) size. For example, the BS may configure a plurality of PUCCH resource sets for the UE, and the UE may select a specific PUCCH resource set corresponding to a specific range according to the range of the UCI (payload) size (e.g., numbers of UCI bits). For example, the UE may select one of the following PUCCH resource sets according to the number of UCI bits, $N_{UCI}$.

PUCCH resource set #0, if the number of UCI bits=<2

PUCCH resource set #1, if 2<the number of UCI bits=<$N_1$

. . .

PUCCH resource set #(K−1), if $N_{K-2}$<the number of UCI bits=<$N_{K-1}$

Here, K represents the number of PUCCH resource sets (K>1) and $N_1$ represents a maximum number of UCI bits supported by PUCCH resource set #i. For example, PUCCH resource set #1 may include resources of PUCCH formats 0 to 1, and the other PUCCH resource sets may include resources of PUCCH formats 2 to 4 (see Table 6).

Configuration for each PUCCH resource includes a PUCCH resource index, a start PRB index, and configuration for one of PUCCH format 0 to PUCCH format 4. The UE is configured with a code rate for multiplexing HARQ-ACK, SR, and CSI report(s) within PUCCH transmission using PUCCH format 2, PUCCH format 3, or PUCCH format 4, by the BS through a higher layer parameter maxCodeRate. The higher layer parameter maxCodeRate is used to determine how to feed back the UCI on PUCCH resources for PUCCH format 2, 3, or 4.

If the UCI type is SR and CSI, a PUCCH resource to be used for UCI transmission in a PUCCH resource set may be configured for the UE through higher layer signaling (e.g., RRC signaling). If the UCI type is HARQ-ACK for a semi-persistent scheduling (SPS) PDSCH, the PUCCH resource to be used for UCI transmission in the PUCCH resource set may be configured for the UE through higher layer signaling (e.g., RRC signaling). On the other hand, if the UCI type is HARQ-ACK for a PDSCH scheduled by DCI, the PUCCH resource to be used for UCI transmission in the PUCCH resource set may be scheduled by the DCI.

In the case of DCI-based PUCCH resource scheduling, the BS may transmit the DCI to the UE on a PDCCH and indicate a PUCCH resource to be used for UCI transmission in a specific PUCCH resource set by an ACK/NACK resource indicator (ARI) in the DCI. The ARI may be used to indicate a PUCCH resource for ACK/NACK transmission and also be referred to as a PUCCH resource indicator (PRI). Here, the DCI may be used for PDSCH scheduling and the UCI may include HARQ-ACK for a PDSCH. The BS may configure a PUCCH resource set including a larger number of PUCCH resources than states representable by the ARI by (UE-specific) higher layer (e.g., RRC) signaling for the UE. The ARI may indicate a PUCCH resource subset of the PUCCH resource set and which PUCCH resource in the indicated PUCCH resource subset is to be used may be determined according to an implicit rule based on transmission resource information about the PDCCH (e.g., the starting CCE index of the PDCCH).

For UL-SCH data transmission, the UE should include UL resources available for the UE and, for DL-SCH data reception, the UE should include DL resources available for the UE. The UL resources and the DL resources are assigned to the UE by the BS through resource allocation. Resource allocation may include time domain resource allocation (TDRA) and frequency domain resource allocation (FDRA). In the present disclosure, UL resource allocation is also referred to as a UL grant and DL resource allocation is referred to as DL assignment. The UL grant is dynamically received by the UE on the PDCCH or in RAR or semi-persistently configured for the UE by the BS through RRC signaling. DL assignment is dynamically received by the UE on the PDCCH or semi-persistently configured for the UE by the BS through RRC signaling.

On UL, the BS may dynamically allocate UL resources to the UE through PDCCH(s) addressed to a cell radio network temporary Identifier (C-RNTI). The UE monitors the PDCCH(s) in order to discover possible UL grant(s) for UL transmission. The BS may allocate the UL resources using a configured grant to the UE. Two types of configured grants, Type 1 and Type 2, may be used. In Type 1, the BS directly provides the configured UL grant (including periodicity) through RRC signaling. In Type 2, the BS may configure a periodicity of an RRC-configured UL grant through RRC signaling and signal, activate, or deactivate the configured UL grant through the PDCCH addressed to a configured scheduling RNTI (CS-RNTI). For example, in Type 2, the PDCCH addressed to the CS-RNTI indicates that the corresponding UL grant may be implicitly reused according to the configured periodicity through RRC signaling until deactivation.

On DL, the BS may dynamically allocate DL resources to the UE through PDCCH(s) addressed to the C-RNTI. The UE monitors the PDCCH(s) in order to discover possible DL grant(s). The BS may allocate the DL resources to the UE using SPS. The BS may configure a periodicity of configured DL assignment through RRC signaling and signal, activate, or deactivate the configured DL assignment through the PDCCH addressed to the CS-RNTI. For example, the PDCCH addressed to the CS-RNTI indicates that the corresponding DL assignment may be implicitly reused according to the configured periodicity through RRC signaling until deactivation.

Hereinafter, resource allocation by the PDCCH and resource allocation by RRC will be described in more detail.

Resource Allocation by PDCCH: Dynamic Grant/Assignment

The PDCCH may be used to schedule DL transmission on the PDSCH and UL transmission on the PUSCH. DCI on the PDCCH for scheduling DL transmission may include DL resource assignment that at least includes a modulation and coding format (e.g., modulation and coding scheme (MCS)) index/MCS, resource allocation, and HARQ information, associated with a DL-SCH. DCI on the PDCCH for scheduling UL transmission may include a UL scheduling grant that at least includes a modulation and coding format, resource allocation, and HARQ information, associated with a UL-SCH. HARQ information on a DL-SCH or UL-SCH may include a new information indicator (NDI), transport block size (TBS), redundancy version (RV), and HARQ process ID (i.e., HARQ process number). The size and usage of the DCI carried by one PDCCH differs according to a DCI format. For example, DCI format 0_0, DCI format 0_1, or DCI format 0_2 may be used to schedule the PUSCH, and DCI format 1_0, DCI format 1_1, or DCI format 1_2 may be used to schedule the PDSCH. Particularly, DCI format 0_2 and DCI format 1_2 may be used to schedule transmission having higher transmission reliability and lower latency requirements than transmission reliability and latency requirement guaranteed by DCI format 0_0, DCI format 0_1, DCI format 1_0, or DCI format 1_1. Some implementations of the present disclosure may be applied to UL data transmission based on DCI format 0_2. Some implementations of the present disclosure may be applied to DL data reception based on DCI format 1_2.

Figure 7:
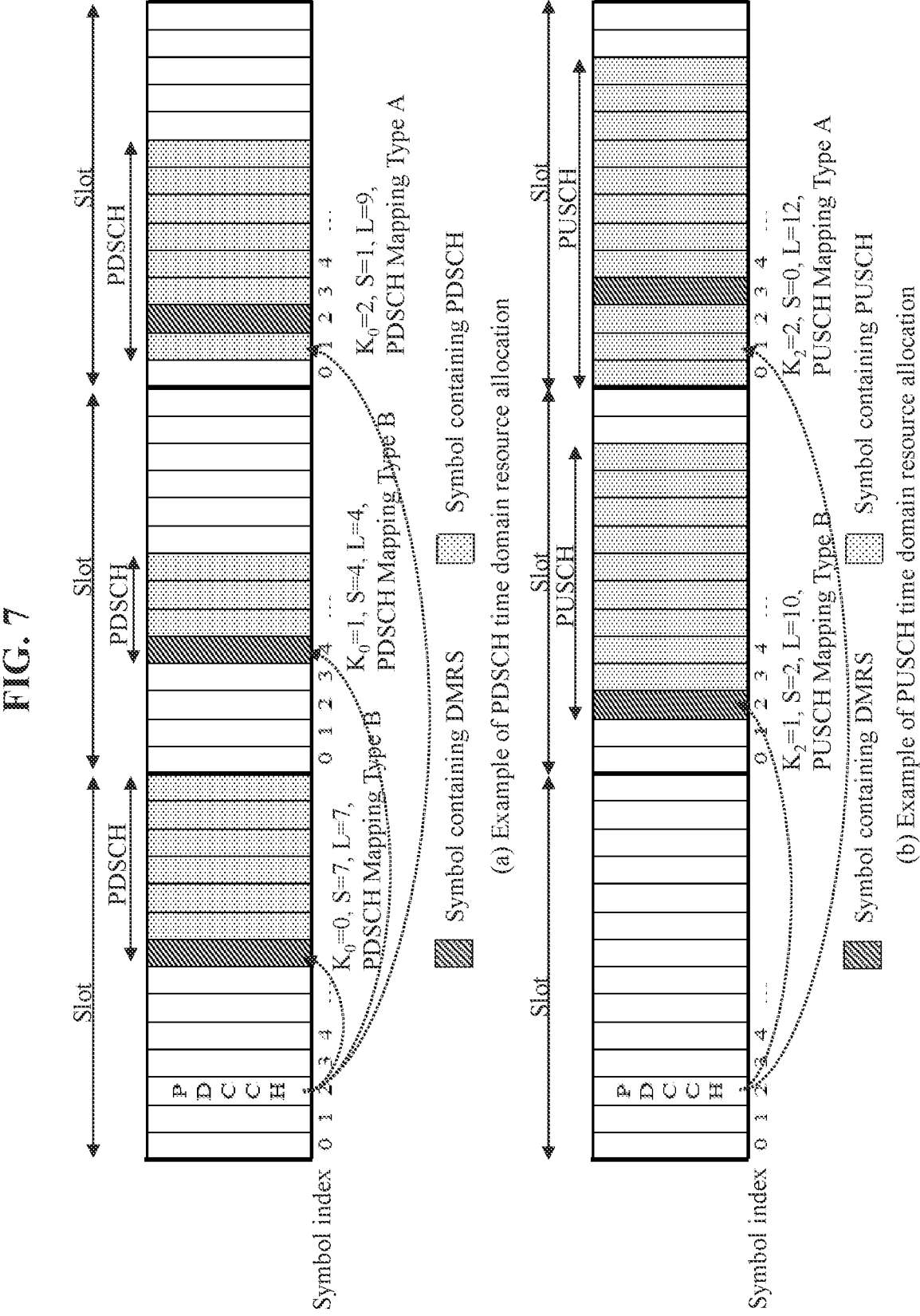
FIG. 7 illustrates an example of physical downlink shared channel (PDSCH) time domain resource assignment (TDRA) caused by a physical downlink control channel (PDCCH) and an example of physical uplink shared channel (PUSCH) TDRA caused by the PDCCH.

FIG. 7 illustrates an example of PDSCH TDRA caused by a PDCCH and an example of PUSCH TDRA caused by the PDCCH.

DCI carried by the PDCCH in order to schedule a PDSCH or a PUSCH includes a TDRA field. The TDRA field provides a value m for a row index m+1 to an allocation table for the PDSCH or the PUSCH. Predefined default PDSCH time domain allocation is applied as the allocation table for the PDSCH or a PDSCH TDRA table that the BS configures through RRC signaled pdsch-Time DomainAllocationList is applied as the allocation table for the PDSCH. Predefined default PUSCH time domain allocation is applied as the allocation table for the PUSCH or a PUSCH TDRA table that the BS configures through RRC signaled pusch-Time DomainAllocationList is applied as the allocation table for the PUSCH. The PDSCH TDRA table to be applied and/or the PUSCH TDRA table to be applied may be determined according a fixed/predefined rule (e.g., refer to 3GPP TS 38.214).

In PDSCH time domain resource configurations, each indexed row defines a DL assignment-to-PDSCH slot offset $K_0$, a start and length indicator value SLIV (or directly, a start position (e.g., start symbol index S') and an allocation length (e.g., the number of symbols, L) of the PDSCH in a slot), and a PDSCH mapping type. In PUSCH time domain resource configurations, each indexed row defines a UL grant-to-PUSCH slot offset $K_2$, a start position (e.g., start symbol index S) and an allocation length (e.g., the number of symbols, L) of the PUSCH in a slot, and a PUSCH mapping type. $K_0$ for the PDSCH and $K_2$ for the PUSCH indicate the difference between the slot with the PDCCH and the slot with the PDSCH or PUSCH corresponding to the PDCCH. SLIV denotes a joint indicator of the start symbol S relative to the start of the slot with the PDSCH or PUSCH and the number of consecutive symbols, L, counting from the symbol S. There are two PDSCH/PUSCH mapping types: one is mapping type A and the other is mapping type B. In the case of PDSCH/PUSCH mapping type A, a DMRS is mapped to a PDSCH/PUSCH resource with respect to the start of a slot. One or two of the symbols of the PDSCH/PUSCH resource may be used as DMRS symbol(s) according to other DMRS parameters. For example, in the case of PDSCH/PUSCH mapping type A, the DMRS is located in the third symbol (symbol #2) or the fourth symbol (symbol #3) in the slot according to RRC signaling. In the case of PDSCH/PUSCH mapping type B, a DMRS is mapped with respect to the first OFDM symbol of a PDSCH/PUSCH resource. One or two symbols from the first symbol of the PDSCH/PUSCH resource may be used as DMRS symbol(s) according to other DMRS parameters. For example, in the case of PDSCH/PUSCH mapping type B, the DMRS is located at the first symbol allocated for the PDSCH/PUSCH. In the present disclosure, the PDSCH/PUSCH mapping type may be referred to as a mapping type or a DMRS mapping type. For example, in the present disclosure, PUSCH mapping type A may be referred to as mapping type A or DMRS mapping type A, and PUSCH mapping type B may be referred to as mapping type B or DMRS mapping type B.

The scheduling DCI includes an FDRA field that provides assignment information about RBs used for the PDSCH or the PUSCH. For example, the FDRA field provides information about a cell for PDSCH or PUSCH transmission to the UE, information about a BWP for PDSCH or PUSCH transmission, and/or information about RBs for PDSCH or PUSCH transmission.

Resource Allocation by RRC

As mentioned above, there are two types of transmission without dynamic grant: configured grant Type 1 and configured grant Type 2. In configured grant Type 1, a UL grant is provided by RRC and stored as a configured UL grant. In configured grant Type 2, the UL grant is provided by the PDCCH and stored or cleared as the configured UL grant based on L1 signaling indicating configured UL grant activation or deactivation. Type 1 and Type 2 may be configured by RRC per serving cell and per BWP. Multiple configurations may be active simultaneously on different serving cells.

When configured grant Type 1 is configured, the UE may be provided with the following parameters through RRC signaling:

cs-RNTI corresponding to a CS-RNTI for retransmission;

periodicity corresponding to a periodicity of configured grant Type 1;

time DomainOffset indicating an offset of a resource with respect to system frame number (SFN)=0 in the time domain;

time DomainAllocation value m that provides a row index m+1 pointing to the allocation table, indicating a combination of the start symbol S, the length L, and the PUSCH mapping type;

frequencyDomainAllocation that provides frequency domain resource allocation; and mcsAndTBS that provides $I_{MCS}$ indicating a modulation order, a target code rate, and a transport block size.

Upon configuration of configured grant Type 1 for a serving cell by RRC, the UE stores the UL grant provided by RRC as a configured UL grant for an indicated serving cell and initializes or re-initializes the configured UL grant to start in a symbol according to timeDomainOffset and S (derived from SLIV) and to recur with periodicity. After the UL grant is configured for configured grant Type 1, the UE may consider that the UL grant recurs in association with each symbol satisfying: [(SFN*numberOfSlotsPerFrame (numberOfSymbolsPerSlot)+(slot number in the frame*numberOfSymbolsPerSlot)+symbol number in the slot]=(timeDomainOffset*numberOfSymbolsPerSlot+S+N*periodicity) modulo (1024*numberOfSlotsPerFrame*numberOfSymbolsPerSlot), for all N>=0, where numberOfSlotsPerFrame and numberOfSymbolsPerSlot indicate the number of consecutive slots per frame and the number of consecutive OFDM symbols per slot, respectively (refer to Table 1 and Table 2).

For configured grant Type 2, the UE may be provided with the following parameters by the BS through RRC signaling:

cs-RNTI corresponding to a CS-RNTI for activation, deactivation, and retransmission; and periodicity that provides a periodicity of configured grant Type 2.

An actual UL grant is provided to the UE by the PDCCH (addressed to the CS-RNTI). After the UL grant is configured for configured grant Type 2, the UE may consider that the UL grant recurs in association with each symbol satisfying: [(SFN*numberOfSlotsPerFrame*numberOfSymbols PerSlot)+(slot number in the frame*numberOfSymbolsPerSlot)+symbol number in the slot]=[(SFN $time$*numberOfSlotsPerFrame*numberOfSymbolsPerSlot+ slot$_{start\ time}$*numberOfSymbolsPerSlot+symbol$_{start\ time}$)+N*periodicity] modulo (1024*numberOfSlotsPerFrame*numberOfSymbolsPerSlot), for all N>=0, where SFN$_{start\ time}$, slot$_{start\ time}$, and symbol$_{start\ time}$ represent an SFN, a slot, and a symbol, respectively, of the first transmission opportunity of the PUSCH after the configured grant is (re-)initialized, and numberOfSlotsPerFrame and numberOfSymbolsPerSlot indicate the number of consecutive slots per frame and the number of consecutive OFDM symbols per slot, respectively (refer to Table 1 and Table 2).

In some scenarios, a parameter harq-ProcID-Offset and/or a parameter harq-ProcID)-Offset2 used to derive HARQ process IDs for configured UL grants may be further provided by the BS to the UE. harq-ProcID)-Offset is an offset of a HARQ process for a configured grant for operation with shared spectrum channel access, and harq-ProcID)-Offset2 is an offset of a HARQ process for a configured grant. In the present disclosure, cg-RetransmissionTimer is a duration after (re)transmission based on a configured grant in which the UE should not autonomously perform retransmission based on the HARQ process of the (re)transmission. cg-RetransmissionTimer may be provided to the UE by the BS when retransmission on a configured UL grant is configured. For configured grants configured with neither harq-ProcID-Offset nor cg-Retransmission Timer, the HARQ process ID associated with the first symbol of UL transmission may be derived from the following equation: HARQ Process ID= [floor(CURRENT_symbol/periodicity)] modulo nrof-HARQ-Processes. For configured UL grants with harq- ProcID-Offset2, the HARQ process ID associated with the first symbol of UL transmission may be derived from the following equation: HARQ Process ID=[floor(CURRENT_symbol/periodicity)] modulo nrofHARQ-Processes+harq-ProcID-Offset2, where CURRENT_symbol= (SFN*numberOfSlotsPerFrame*numberOfSymbolsPerSlot+ slot number in the frame*numberOfSymbolsPerSlot+ symbol number in the slot), and numberOfSlotsPerFrame and numberOfSymbolsPerSlot denote the number of consecutive slots per frame and the number of consecutive OFDM symbols per slot, respectively. For configured UL grants with cg-RetransmissionTimer, the UE may select a HARQ process ID from among HARQ process IDs available for the configured grant configuration.

On DL, the UE may be configured with semi-persistent scheduling (SPS) per serving cell and per BWP by RRC signaling from the BS. For DL SPS, DL assignment is provided to the UE by the PDCCH and stored or cleared based on L1 signaling indicating SPS activation or deactivation. When SPS is configured, the UE may be provided with the following parameters by the BS through RRC signaling (e.g., SPS configuration) used to configure a semi-persistent transmission:

cs-RNTI corresponding to a CS-RNTI for activation, deactivation, and retransmission;
nrofHARQ-Processes that provides the number of HARQ processes for SPS;
periodicity that provides a periodicity of configured DL assignment for SPS;
n1PUCCH-AN that provides a HARQ resource for a PUCCH for SPS (the network configures the HARQ resource as format 0 or format 1, and the actual PUCCH resource is configured by P(((H-Config and referred to in n1PUCCH-AN by the ID thereof).

Multiple DL SPS configurations may be configured within the BWP of a serving cell. After DL assignment is configured for SPS, the UE may consider sequentially that N-th DL assignment occurs in a slot satisfying: (numberOfSlotsPerFrame*SFN+slot number in the frame)= [(numberOfSlotsPerFrame*SFN$_{start\ time}$+slot$_{start\ time}$)+ N*periodicity*numberOfSlotsPerFrame/10] modulo (1024*numberOfSlotsPerFrame), where SFN$_{start\ time}$ and slot$_{start\ time}$ represent an SFN and a slot, respectively, of first transmission of the PDSCH after configured DL assignment is (re-)initialized, and numberOfSlotsPerFrame and numberOfSymbolsPerSlot indicate the number of consecutive slots per frame and the number of consecutive OFDM symbols per slot, respectively (refer to Table 1 and Table 2).

In some scenarios, a parameter harq-ProcID-Offset used to derive HARQ process IDs for configured DL assignments may be further provided by the BS to the UE. harq-ProcID-Offset is an offset of a HARQ process for SPS. For configured DL assignments without harq-ProcID-Offset, a HARQ process ID associated with a slot in which DL transmission starts may be determined from the following equation: HARQ Process ID=[floor (CURRENT_slot*10/ (numberOfSlotsPerFrame*periodicity))] modulo nrof-HARQ-Processes, where CURRENT slot= [(SFN*numberOfSlotsPerFrame)+slot number in the frame], and numberOfSlotsPerFrame denotes the number of consecutive slots per frame. For configured DL assignments with harq-ProcID-Offset, a HARQ process ID associated with a slot in which DL transmission starts may be determined from the following equation: HARQ Process ID= [floor (CURRENT_slot/periodicity)] modulo nrofHARQ-Processes+harq-ProcID-Offset, where CURRENT_slot=

[(SFN*numberOfSlotsPerFrame)+slot number in the frame], and numberOfSlotsPerFrame denotes the number of consecutive slots per frame.

If the CRC of a corresponding DCI format is scrambled with the CS-RNTI provided by the RRC parameter cs-RNTI, and a new data indicator field for an enabled transport block is set to 0, the UE validates, for scheduling activation or scheduling release, a DL SPS assignment PDCCH or a configured UL grant Type 2 PDCCH. Validation of the DCI format is achieved if all fields for the DCI format are set according to Table 6 and Table 7. Table 6 shows an example of special fields for DL SPS and UL grant Type 2 scheduling activation PDCCH validation, and Table 7 shows an example of special fields for DL SPS and UL grant Type 2 scheduling release PDCCH validation.

TABLE 6

| | DCI format 0_0/0_1 | DCI format 1_0 | DCI format 1_1 |
|---|---|---|---|
| HARQ process number | set to all '0's | set to all '0's | set to all '0's |
| Redundancy version | set to '00' | set to '00' | For the enabled transport block: set to '00' |

TABLE 7

| | DCI format 0_0 | DCI format 1_0 |
|---|---|---|
| HARQ process number | set to all '0's | set to all '0's |
| Redundancy version | set to '00' | set to '00' |
| Modulation and coding scheme | set to all '1's | set to all '1's |
| Resource block assignment | set to all '1's | set to all '1's |

Actual DL assignment and UL grant for DL SPS or UL grant Type 2, and a corresponding MCS are provided by resource assignment fields (e.g., a TDRA field providing a TDRA value m, an FDRA field providing frequency resource block assignment, and/or an MCS field) in the DCI format carried by a corresponding DL SPS or UL grant Type 2 scheduling activation PDCCH. If validation is achieved, the UE considers information in the DCI format as valid activation or valid release of DL SPS or configured UL grant Type 2.

In the present disclosure, a PDSCH based on DL SPS may be referred to as an SPS PDSCH, and a PUSCH based on a UL configured grant (CG) may be referred to as a CG PUSCH. A PDSCH dynamically scheduled by DCI carried on a PDCCH may be referred to as a dynamic grant (DG) PDSCH, and a PUSCH dynamically scheduled by DCI carried by on a PDCCH may be referred to as a DG PUSCH.

Figure 8:
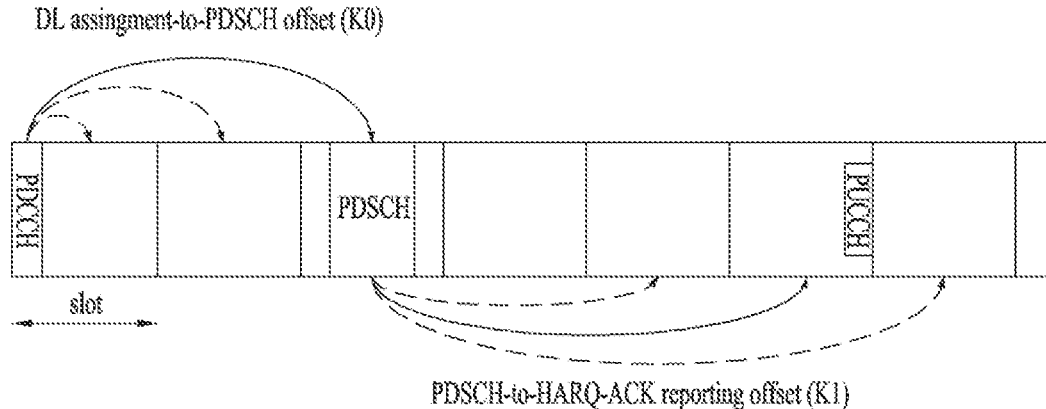
FIG. 8 illustrates a hybrid automatic repeat request-acknowledgement (HARQ-ACK) transmission/reception procedure.

FIG. 8 illustrates a HARQ-ACK transmission/reception procedure.

Referring to FIG. 8, the UE may detect a PDCCH in a slot n. Next, the UE may receive a PDSCH in a slot n+K0 according to scheduling information received through the PDCCH in the slot n and then transmit UCI through a PUCCH in a slot n+K1. In this case, the UCI includes a HARQ-ACK response for the PDSCH.

The DCI (e.g., DCI format 1_0 or DCI format 1_1) carried by the PDCCH for scheduling the PDSCH may include the following information.

FDRA: FDRA indicates an RB set allocated to the PDSCH.
TDRA: TDRA indicates a DL assignment-to-PDSCH slot offset K0, the start position (e.g., symbol index S) and length (e.g., the number of symbols, L) of the PDSCH in a slot, and the PDSCH mapping type. PDSCH mapping Type A or PDSCH mapping Type B may be indicated by TDRA. For PDSCH mapping Type A, the DMRS is located in the third symbol (symbol #2) or fourth symbol (symbol #3) in a slot. For PDSCH mapping Type B, the DMRS is allocated in the first symbol allocated for the PDSCH.

PDSCH-to-HARQ_feedback timing indicator: This indicator indicates K1.

If the PDSCH is configured to transmit a maximum of one TB, a HARQ-ACK response may consist of one bit. If the PDSCH is configured to transmit a maximum of 2 TBs, the HARQ-ACK response may consist of 2 bits when spatial bundling is not configured and one bit when spatial bundling is configured. When a HARQ-ACK transmission timing for a plurality of PDSCHs is designated as slot n+K1, UCI transmitted in slot n+K1 includes a HARQ-ACK response for the plural PDSCHs.

In the present disclosure, a HARQ-ACK payload consisting of HARQ-ACK bit(s) for one or plural PDSCHs may be referred to as a HARQ-ACK codebook. The HARQ-ACK codebook may be categorized as i) a semi-static HARQ-ACK codebook, ii) a dynamic HARQ-ACK codebook and iii) HARQ process based HARQ-ACK codebook, according to a HARQ-ACK payload determination scheme.

In the case of the semi-static HARQ-ACK codebook, parameters related to a HARQ-ACK payload size that the UE is to report are semi-statically determined by a (UE-specific) higher layer (e.g., RRC) signal. The HARQ-ACK payload size of the semi-static HARQ-ACK codebook, e.g., the (maximum) HARQ-ACK payload (size) transmitted through one PUCCH in one slot, may be determined based on the number of HARQ-ACK bits corresponding to a combination (hereinafter, bundling window) of all DL carriers (i.e., DL serving cells) configured for the UE and all DL scheduling slots (or PDSCH transmission slots or PDCCH monitoring slots) for which the HARQ-ACK transmission timing may be indicated. That is, in a semi-static HARQ-ACK codebook scheme, the size of the HARQ-ACK codebook is fixed (to a maximum value) regardless of the number of actually scheduled DL data. For example, DL grant DCI (PDCCH) includes PDSCH-to-HARQ-ACK timing information, and the PDSCH-to-HARQ-ACK timing information may have one (e.g., k) of a plurality of values. For example, when the PDSCH is received in slot #m and the PDSCH-to-HARQ-ACK timing information in the DL grant DCI (PDCCH) for scheduling the PDSCH indicates k, the HARQ-ACK information for the PDSCH may be transmitted in slot #(m+k). As an example, k ∈ {1, 2, 3, 4, 5, 6, 7, 8}. When the HARQ-ACK information is transmitted in slot #n, the HARQ-ACK information may include possible maximum HARQ-ACK based on the bundling window. That is, HARQ-ACK information of slot #n may include HARQ-ACK corresponding to slot #(n-k). For example, when k∈{1, 2, 3, 4, 5, 6, 7, 8}, the HARQ-ACK information of slot #n may include HARQ-ACK corresponding to slot #(n-8) to slot #(n-1) regardless of actual DL data reception (i.e., HARQ-ACK of a maximum number). Here, the HARQ-ACK information may be replaced with a HARQ-ACK codebook or a HARQ-ACK payload. A slot may be understood/replaced as/with a candidate occasion for DL data reception. As described in the example, the bundling window may be determined based on the PDSCH-to-HARQ-ACK timing based on a HARQ-ACK slot, and a PDSCH-to-HARQ-ACK timing set may have predefined values (e.g., {1, 2, 3, 4, 5, 6, 7, 8}) or may be configured by higher layer (RRC) signaling. The semi-static HARQ-ACK codebook is referred to as a Type-1 HARQ-ACK codebook. For the Type-1 HARQ-ACK codebook, the number of bits to be transmitted in a HARQ-ACK report is fixed and may be potentially large. If many cells are configured but only few cells are scheduled, the Type-1 HARQ-ACK codebook may be inefficient.

In the case of the dynamic HARQ-ACK codebook, the HARQ-ACK payload size that the UE is to report may be dynamically changed by the DCI etc. The dynamic HARQ-ACK codebook is referred to as a Type-2 HARQ-ACK codebook. The Type-2 HARQ-ACK codebook may be considered as optimized HARQ-ACK feedback because the UE sends feedback only for scheduled serving cells. However, in poor channel conditions, the UE may erroneously determine the number of scheduled serving cells. To solve this problem, a downlink assignment index (DAI) may be included as a part of DCI. For example, in the dynamic HARQ-ACK codebook scheme, DL scheduling DCI may include a counter-DAI (i.e., c-DAI) and/or a total-DAI (i.e., t-DAI). Here, the DAI indicates a downlink assignment index and is used for the BS to inform the UE of transmitted or scheduled PDSCH(s) for which HARQ-ACK(s) are to be included in one HARQ-ACK transmission. Particularly, the c-DAI is an index indicating order between PDCCHs carrying DL scheduling DCI (hereinafter, DL scheduling PDCCHs), and t-DAI is an index indicating the total number of DL scheduling PDCCHs up to a current slot in which a PDCCH with the t-DAI is present.

In the case of a HARQ-ACK codebook based on HARQ processes, the HARQ-ACK payload is determined based on all HARQ processes of all configured (or activated) serving cells in a PUCCH group. For example, the size of the HARQ-ACK payload to be reported by the UE using the HARQ-ACK codebook based on HARQ processes may be determined based on the number of all configured or activated serving cells in the PUCCH group configured for the UE and the number of HARQ processes for the serving cells. The HARQ-ACK codebook based on HARQ processes is also referred to as a Type-3 HARQ-ACK codebook. The type-3 HARQ-ACK codebook may be applied to one-shot feedback.

Figure 9:
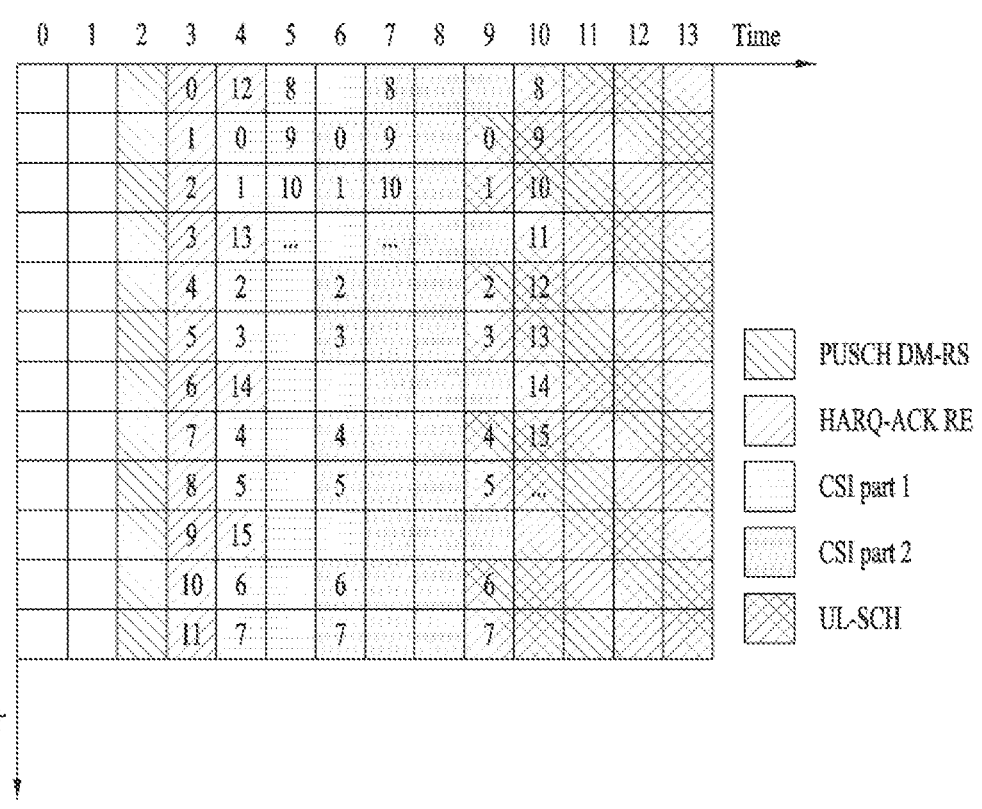
FIG. 9 illustrates an example of multiplexing uplink control information (UCI) with a PUSCH.

FIG. 9 illustrates an example of multiplexing UCI with a PUSCH. When PUCCH resource(s) and a PUSCH resource overlap in a slot and PUCCH-PUSCH simultaneous transmission is not configured, UCI may be transmitted on the PUSCH as illustrated.

Transmission of the UCI on the PUSCH is referred to as UCI piggyback or PUSCH piggyback. Particularly, FIG. 9 illustrates the case in which HARQ-ACK and CSI are carried on the PUSCH resource.

When a plurality of UL channels overlaps within a predetermined time interval, a method for the UE to process the UL channels needs to be specified in order to allow the BS to correctly receive the UL channel(s). Hereinafter, methods of handling collision between UL channels will be described.

Figure 10:
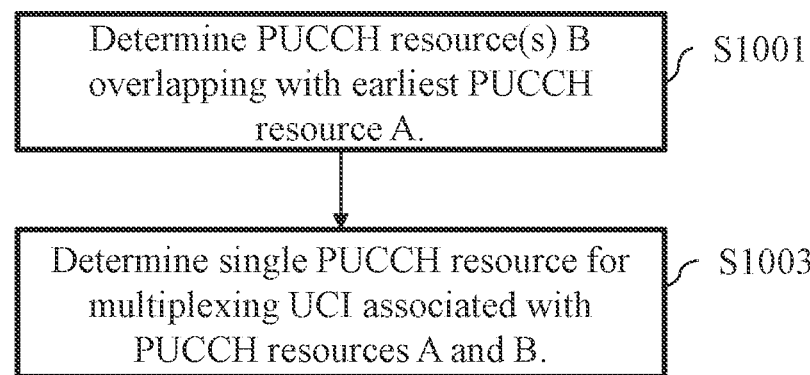
FIG. 10 illustrates an example of a process for a UE with overlapping physical uplink control channels (PUCCHs) in a single slot to handle collision between UL channels.

FIG. 10 illustrates an example of a process for a UE with overlapping PUCCHs in a single slot to handle collision between UL channels.

To transmit UCI, the UE may determine PUCCH resources for each UCI. Each PUCCH resource may be defined by a start symbol and a transmission interval. When PUCCH resources for PUCCH transmission overlap in a single slot, the UE may perform UCI multiplexing based on a PUCCH resource with the earliest start symbol. For example, the UE may determine overlapping PUCCH resource(s) (in time) (hereinafter, PUCCH resource(s) B) based on a PUCCH resource with the earliest start symbol (hereinafter, PUCCH resource A) in a slot (S1001). The UE may apply a UCI multiplexing rule to the PUCCH resource A and the PUCCH resource(s) B. For example, based on UCI A of the PUCCH resource A and UCI B of the PUCCH resource(s) B, MUX UCI including all or part of the UCI A and the UCI B may be obtained according to the UCI multiplexing rule. To multiplex UCI associated with the PUCCH resource A and the PUCCH resource(s) B, the UE may determine a single PUCCH resource (hereinafter, MUX PUCCH resource) (S1003). For example, the UE determines a PUCCH resource set corresponding to a payload size of the MUX UCI (hereinafter, PUCCH resource set X) among PUCCH resource sets configured or available for the UE and determines one of PUCCH resources belonging to the PUCCH resource set X as a MUX PUCCH resource. For example, the UE may determine one of the PUCCH resources belonging to the PUCCH resource set X as the MUX PUCCH resource, using a PUCCH resource indicator field in the last DCI among DCIs having a PDSCH-to-HARQ feedback timing indicator field that indicates the same slot for PUCCH transmission. The UE may determine the total number of PRBs of the MUX PUCCH resource based on the payload size of the MUX UCI and a maximum code rate for a PUCCH format of the MUX PUCCH resource. If the MUX PUCCH resource overlaps with other PUCCH resources (except for the PUCCH resource A and the PUCCH resource(s) B), the UE may perform the above-described operation again based on the MUX PUCCH resource (or a PUCCH resource having the earliest start symbol among the other PUCCH resources including the MUX PUCCH resource).

Figure 11:
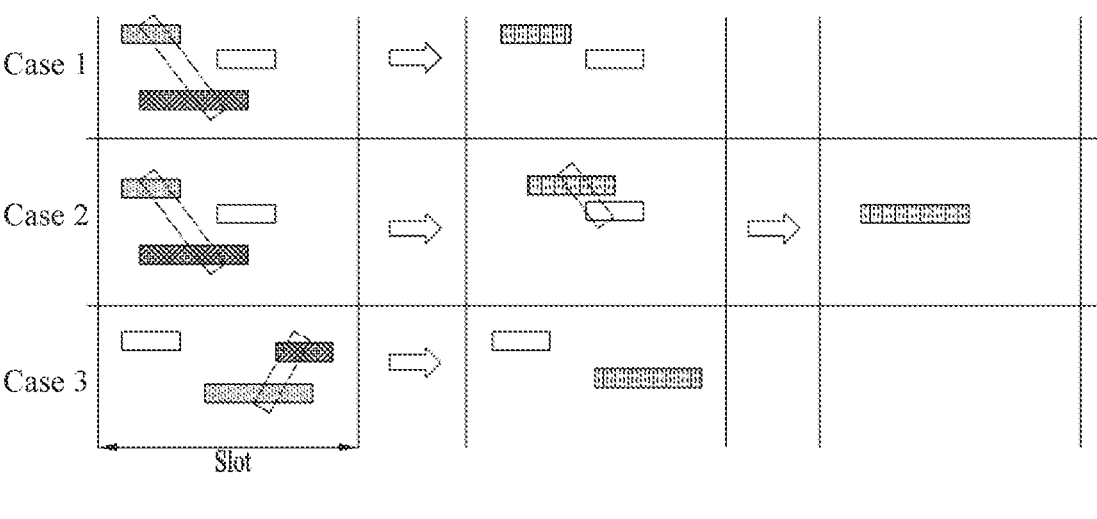
FIG. 11 illustrates cases for performing UCI multiplexing based on FIG. 10.

FIG. 11 illustrates cases for performing UCI multiplexing based on FIG. 10. Referring to FIG. 11, when a plurality of PUCCH resources overlap in a slot, UCI multiplexing may be performed based on the earliest PUCCH resource A (e.g., PUCCH resource A with the earliest start symbol). In FIG. 11, Case 1 and Case 2 show that the first PUCCH resource overlaps with another PUCCH resource. In this case, the process of FIG. 10 may be performed in a state in which the first PUCCH resource is regarded as the earliest PUCCH resource A. In contrast, Case 3 shows that the first PUCCH resource does not overlap with another PUCCH resource and the second PUCCH resource overlaps with another PUCCH resource. In Case 3, UCI multiplexing is not performed on the first PUCCH resource. Instead, the process of FIG. 10 may be performed in a state in which the second PUCCH resource is regarded as the earliest PUCCH resource A. Case 2 shows that a MUX PUCCH resource determined to transmit the multiplexed UCI newly overlaps with another PUCCH resource. In this case, the process of FIG. 10 may be additionally performed in a state in which the MUX PUCCH resource (or the earliest PUCCH resource (e.g., a PUCCH resource having the earliest start symbol) among the other PUCCH resources including the MUX PUCCH resource) is regarded as the earliest PUCCH resource A.

Figure 12:
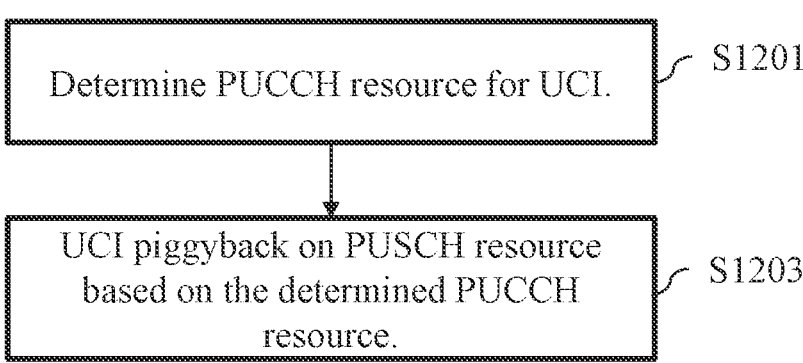
FIG. 12 illustrates a process for a UE with an overlapping PUCCH and PUSCH in a single slot to handle collision between UL channels.

FIG. 12 illustrates a process for a UE with an overlapping PUCCH and PUSCH in a single slot to handle collision between UL channels.

To transmit UCI, the UE may determine a PUCCH resource (S1201). Determination of the PUCCH resource for the UCI may include determining a MUX PUCCH resource. In other words, determination of the PUCCH resource for the UCI by the UE may include determining the MUX PUCCH resource based on a plurality of overlapping PUCCHs in a slot.

The UE may perform UCI piggyback on a PUSCH resource based on the determined (MUX) PUCCH resource (S1203). For example, when there is a PUSCH resource (on which multiplexed UCI transmission is allowed), the UE may apply the UCI multiplexing rule to PUCCH resource(s) overlapping with the PUSCH resource (on the time axis). The UE may transmit the UCI on the PUSCH.

When there is no PUSCH overlapping with the determined PUCCH resource in a slot, S1103 is omitted and the UCI may be transmitted on the PUCCH.

When the determined PUCCH resource overlaps with a plurality of PUSCHs on the time axis, the UE may multiplex the UCI with one of the PUSCHs. For example, when the UE intends to transmit the PUSCHs to respective serving cells, the UE may multiplex the UCI on a PUSCH of a specific serving cell (e.g., a serving cell having the smallest serving cell index) among the serving cells. When more than one PUSCH is present in the slot of the specific serving cell, the UE may multiplex the UCI on the earliest PUSCH transmitted in the slot.

Figure 13:
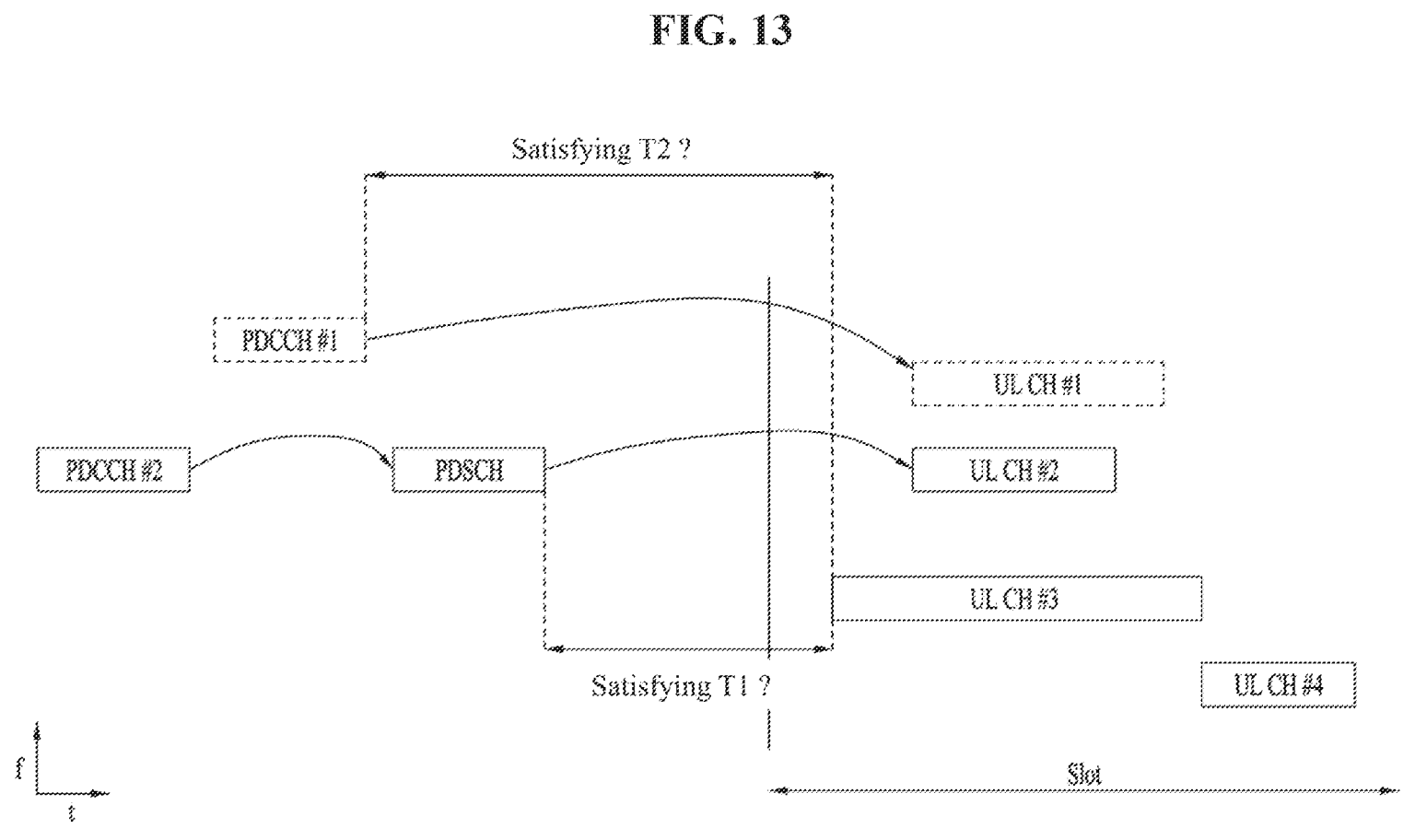

FIG. 13 illustrates UCI multiplexing considering a timeline condition. When the UE performs UCI and/or data multiplexing for overlapping PUCCH(s) and/or PUSCH(s) on the time axis, the UE may be lacking in processing time for UCI and/or data multiplexing due to flexible UL timing configuration for the PUCCH or the PUSCH. In order to prevent the processing time of the UE from being insufficient, two timeline conditions (hereinafter, multiplexing timeline conditions) described below are considered in a process of performing UCI/data multiplexing for the overlapping PUCCH(s) and/or PUSCH(s) (on the time axis).

(1) The last symbol of a PDSCH corresponding to HARQ-ACK information is received before time T1 from the start symbol of the earliest channel among the overlapping PUCCH(s) and/or PUSCH(s) (on the time axis). T1 may be determined based on i) a minimum PDSCH processing time $N_1$ defined according to a UE processing capability, and/or ii) $d_{1,1}$ predefined as an integer equal to or greater than 0 according to position of scheduled symbol(s), a PUSCH mapping type, BWP switching, etc.

For example, T1 may be determined as follows: $T1=(N_1+d_{1,1})*(2048+144)*\kappa*2^{-\mu}*T_c$. $N_1$ is based on u of Table 8 and Table 9 for UE processing capabilities #1 and #2, respectively, and u is one of $(u_{PDCCH}, u_{PDSCH}, u_{UL})$, that causes the largest T1, where $u_{PDCCH}$ corresponds to a subcarrier spacing of a PDCCH for scheduling the PDSCH, $\mu_{PDSCH}$ corresponds to a subcarrier spacing of the scheduled PDSCH, $u_{UL}$ corresponds to a subcarrier spacing of a UL channel on which HARQ-ACK is to be transmitted, and $\kappa=T_s/T_c=64$. In Table 8, in the case of $N_{1,0}$, if a PDSCH DMRS position of an added DMRS is $1_1=12$, then $N_{1,0}=14$ and, otherwise, $N_{1,0}=13$ (refer to Section 7.4.1.1.2 of 3GPP TS 38.211). If the last symbol of the PDSCH for PDSCH mapping type A is present on an i-th slot, $d_{1,1}=7$-i for i<7 and, otherwise, $d_{1,1}=0$. If the PDSCH has mapping type B for UE processing capability #1, d1 may be 0 when the number of allocated PDSCH symbols is 7, $d_{1,1}$ may be 3 when the number of allocated PDSCH symbols is 4, $d_{1,1}$ may be 3+d when the number of allocated PDSCH symbols is 2, where d is the number of overlapping symbols of the scheduling PDCCH and the scheduled PDSCH. If the PDSCH mapping type is B for UE processing capability #2, $d_{1,1}$ may be 0 when the number of allocated PDSCH symbols is 7, and $d_{1,1}$ may correspond to the number of overlapping symbols of the scheduling PDCCH and the scheduled PDSCH when the number of allocated PDSCH symbols is 4. Further, if the number of allocated PDSCH symbols is 2, $d_{1,1}$ may be 3 when the scheduling PDSCH is within a 3-symbol CORE-SET and the CORESET and the PDSCH have the same starting symbol, and $d_{1,1}$ may be the number of overlapping symbols of the scheduling PDCCH and the scheduled PDSCH for the other cases. In the present disclosure T1 may also be referred to as T_proc,1.

(2) The last symbol of a (e.g., triggering) PDCCH for indicating PUCCH or PUSCH transmission is received before time T2 from the start symbol of the earliest channel among overlapping PUCCH(s) and/or PUSCH(s) (on the time axis). T2 may be determined based on i) a minimum PUSCH preparation time $N_2$ defined according to a UE PUSCH timing capability, and/or ii) $d_{2,x}$ predefined as an integer equal to or greater than 0 according to the scheduled symbol position, BWP switching, etc. $d_{2,x}$ may be categorized into $d_{2,1}$ related to the position of scheduled symbol(s) and $d_{2,2}$ related to BWP switching.

For example, T2 may be determined as follows: $T2=\max\{(N_2+d_{2,1})*(2048+144)*\kappa*2^{-u}*T_c+T_{ext}+T_{switch}, d_{2,2}\}$. N2 is based on u of Table 10 and Table 11 for UE timing capabilities #1 and #2, respectively, and u is one of $(u_{DL}, u_{UL})$, that causes the largest T1, where $u_{DL}$ corresponds to a subcarrier spacing of a PDCCH carrying DCI for scheduling a PUSCH, $u_{UL}$ corresponds to a subcarrier spacing of the PUSCH, and $\kappa=T_s/T_f=64$. If the first symbol of PUSCH allocation is composed only of a DMRS, then $d_{2,1}$ may be 0 and, otherwise, $d_{2,1}$ may be 1. If the scheduling DCI has triggered BWP switching, $d_{2,2}$ is equal to a switching time and, otherwise, $d_{2,2}$ is 0. The switching time may be differently defined depending on a frequency range (FR). For example, the switching time may be defined as 0.5 ms for FR1 and as 0.25 ms for FR2. In the present disclosure, T2 may also be referred to as T_proc,2.

Tables below show processing times according to UE processing capability. Particularly, Table 8 shows a PDSCH processing time for PDSCH processing capability #1 of the UE, Table 9 shows a PDSCH processing time for PDSCH processing capability #2 of the UE, Table 10 shows a PUSCH preparation time for PUSCH timing capability #1 of the UE, and Table 11 shows a PUSCH processing time for PUSCH timing capability #2 of the UE.

TABLE 8

| | PDSCH decoding time $N_1$ [symbols] | |
| u/SCS | Front-loaded DMRS only | Front-loaded + additional DMRS |
| --- | --- | --- |
| 0/15 kHz | 8 | $N_{1, 0}$ |
| 1/30 kHz | 10 | 13 |
| 2/60 kHz | 17 | 20 |
| 3/120 kHz | 20 | 24 |

TABLE 9

| u/SCS | PDSCH decoding time $N_1$ [symbols] |
| --- | --- |
| 0/15 kHz | 3 |
| 1/30 kHz | 4.5 |
| 2/60 kHz | 9 for frequency range 1 |

TABLE 10

| u/SCS | PUSCH preparation time $N_2$ [symbols] |
| --- | --- |
| 0/15 kHz | 10 |
| 1/30 kHz | 12 |
| 2/60 kHz | 23 |
| 3/120 kHz | 36 |

TABLE 11

| u/SCS | PUSCH preparation time $N_2$ [symbols] |
| --- | --- |
| 0/15 kHz | 5 |
| 1/30 kHz | 5.5 |
| 2/60 kHz | 11 for frequency range 1 |

The UE may report a PDSCH processing capability supported thereby with respect to carriers corresponding to one band entry in a band combination to the BS. For example, whether the UE supports only PDSCH processing capability #1 or supports PDSCH processing capability #2 with respect to each subcarrier spacing (SCS) supported in a corresponding band may be reported as a UE capability. The UE may report a PUSCH processing capability supported thereby with respect to carriers corresponding to one band entry in a band combination to the BS. For example, whether the UE supports only PUSCH processing capability #1 or supports PUSCH processing capability #2 with respect to each SCS supported in a corresponding band may be reported as a UE capability.

If the UE configured to multiplex different UCI types within one PUCCH intends to transmit a plurality of overlapping PUCCHs in a slot or transmit overlapping PUCCH(s) and PUSCH(s) in a slot, the UE may multiplex the UCI types when specific conditions are fulfilled. The specific conditions may include multiplexing timeline condition(s). For example, PUCCH(s) and PUSCH(s) to which UCI multiplexing is applied in FIGS. 10 to 12 may be UL channels that satisfy the multiplexing timeline condition(s). Referring to FIG. 13, the UE may need to transmit a plurality of UL channels (e.g., UL channels #1 to #4) in the same slot. Here, UL CH #1 may be a PUSCH scheduled by PDCCH #1. UL CH #2 may be a PUCCH for transmitting HARQ-ACK for a PDSCH. The PDSCH is scheduled by PDCCH #2 and a resource of UL CH #2 may also be indicated by PDCCH #2.

In this case, if overlapping UL channels (e.g., UL channels #1 to #3) on the time axis satisfy the multiplexing timeline condition, the UE may perform UCI multiplexing for overlapping UL channels #1 to #3 on the time axis. For example, the UE may check whether the first symbol of UL CH #3 from the last symbol of the PDSCH satisfies the condition of T1. The UE may also check whether the first symbol of UL CH #3 from the last symbol of PDCCH #1 satisfies the condition of T2. If the multiplexing timeline condition is satisfied, the UE may perform UCI multiplex for UL channels #1 to #3. In contrast, if the earliest UL channel (e.g., UL channel having the earliest start symbol) among overlapping UL channels does not satisfy the multiplexing timeline condition, the UE may not be allowed to multiplex all of the corresponding UCI types.

In some scenarios, it is regulated that a UE is not expected to transmit more than one PUCCH having HARQ-ACK information in one slot. Accordingly, according to these scenarios, the UE may transmit at most one PUCCH with the HARQ-ACK information in one slot. In order to prevent a situation in which the UE fails to transmit the HARQ-ACK information due to restrictions on the number of HARQ-ACK PUCCHs transmittable by the UE, the BS needs to perform DL scheduling so that the HARQ-ACK information may be multiplexed on one PUCCH resource. However, when taking into consideration a service with stringent latency and reliability requirements, such as a URLLC service, a scheme of concentrating a plurality of HARQ-ACK feedbacks only on one PUCCH in a slot may not be desirable in terms of PUCCH performance. Furthermore, in order to support a latency-critical service, the BS may be required to schedule a plurality of consecutive PDSCHs with a short duration in one slot. Although the UE may transmit a PUCCH in random symbol(s) in a slot by the configuration/indication of the BS, if the UE is allowed to transmit only a maximum of one HARQ-ACK PUCCH in a slot, it may be impossible for the BS to perform fast back-to-back scheduling for PDSCHs and for the UE to perform fast HARQ-ACK feedback. Therefore, for more flexible and efficient resource use and service support, a plurality of (non-overlapping) HARQ-ACK PUCCHs (or PUSCHs) may be allowed to be transmitted in one slot. Thus, in some scenarios, not only PUCCH feedback based on a slot including 14 OFDM symbols but also PUCCH feedback based on a subslot including (e.g., 2 to 7) OFDM symbols smaller than 14 OFDM symbols may be considered.

UL channels may be scheduled or triggered with different priorities. In some implementations of the present disclosure, the priority of a UL channel may be represented by a priority index, and a UL channel of a larger priority index may be determined to have a higher priority than a UL channel of a smaller priority index. In some implementations, the priority of a UL channel may be provided by DCI that schedules or triggers transmission of the UL channel or by an RRC configuration regarding a configured grant for the UL channel. If the priority (or priority index) of a UL channel is not provided to the UE, the priority of the UL channel may be regulated as a low priority (or priority index 0).

For HARQ-ACK feedback for a plurality of DL data channels (e.g., a plurality of PDSCHs) having different service types, QoS, latency requirements, reliability requirements, and/or priorities, separate codebooks may be formed/generated. For example, a HARQ-ACK codebook for PDSCH(s) associated with a high priority and a HARQ-ACK codebook for PDSCH(s) associated with a low priority may be separately configured/formed. For HARQ-ACK feedback for PDSCHs of different priorities, different parameters and resource configurations may be considered for respective PUCCH transmissions for different priorities (e.g., see information element (IE) pucch-ConfigurationList of 3GPP TS 38.331). For example, if the UE is provided with pdsch-HARQ-ACK-CodebookList through RRC signaling, the UE may be instructed to generate one or multiple HARQ-ACK codebooks by pdsch-HARQ-ACK-CodebookList. If the UE is instructed to generate one HARQ-ACK codebook, the HARQ-ACK codebook is associated with a PUCCH of priority index 0. If the UE is provided with pdsch-HARQ-ACK-CodebookList, the UE multiplexes only HARQ-ACK information associated with the same priority index in the same HARQ-ACK codebook. If the UE is instructed to generate two HARQ-ACK codebooks, a first HARQ-ACK codebook is associated with a PUCCH of priority index 0, and a second HARQ-ACK codebook is associated with a PUCCH of priority index 1.

A unit of a time difference (e.g., a PDSCH-to-HARQ_feedback timing indicator) between a DL data channel and PUCCH transmission for HARQ-ACK feedback transmission may be determined by a pre-configured subslot length (e.g., the number of symbols constituting a subslot). For example, a unit of the time difference from the DL data channel to a PUCCH for HARQ-ACK feedback transmission may be configured by parameter "subslotLengthForPUCCH" in PUCCH-Config, which is configuration information used to configure UE-specific PUCCH parameters. According to these scenarios, a length unit of the PDSCH-to-HARQ feedback timing indicator may be configured for each HARQ-ACK codebook.

In some scenarios, UL or DL scheduling may be dynamically or semi-statically performed, and the BS may configure or indicate a transmission direction (e.g., DL, UL, or flexible) of each symbol for or to the UE semi-statically using a tdd-UL-DL-ConfigurationCommon or tdd-UL-DL-ConfigurationDedicated message or dynamically using DCI format 2_0. UL or DL scheduling configured by the configured/indicated transmission direction may also be cancelled.

In some scenarios, UL or DL scheduling may be dynamically or semi-statically performed, and the BS may configure or indicate a transmission direction (e.g., DL, UL, or flexible) of each symbol for or to the UE semi-statically using a tdd-UL-DL-ConfigurationCommon or tdd-UL-DL-ConfigurationDedicated message or dynamically using DCI format 2_0. UL or DL scheduling configured by the configured/indicated transmission direction may also be cancelled.

Figure 14:
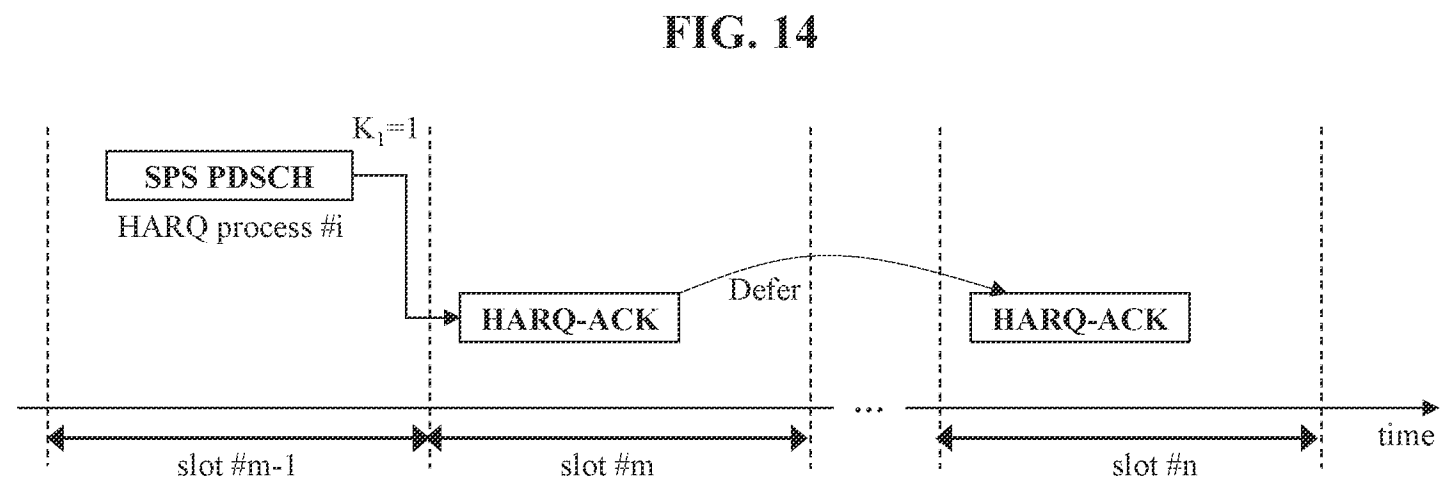

FIG. 14 illustrates exemplary HARQ-ACK deferral.

In some scenarios (e.g., 3GPP NR Rel-16), if the UE receives a PDSCH scheduled by the BS, the UE may transmit a PUCCH carrying a HARQ-ACK for the PDSCH (hereinafter, HARQ-ACK PUCCH) at a time designated by scheduling information for the PDSCH. However, these series of operations always cause the UE to transmit the PUCCH after a lapse of a predetermined time from reception of a semi-persistently configured SPS PDSCH. As a result, a TDD pattern that is not aligned with the period of the SPS PDSCH may be used, or PUCCH transmission may be easily canceled by the dynamic TDD operation of the BS. Further, PDSCH transmission associated with the canceled PUCCH transmission may also be canceled, or retransmission may be requested. To solve these issues, an operation in which the UE defers a PUCCH timing determined for a PDSCH in a prescribed or arbitrary manner, that is, delaying operation is being considered. For example, when a PUCCH configured for carrying a HARQ-ACK for an SPS PDSCH (hereinafter, SPS HARQ-ACK) is canceled by a configured or indicated transmission direction, HARQ-ACK deferral, which delays the HARQ-ACK transmission after the originally expected time, may be considered. Referring to FIG. 14, for example, when an SPS PDSCH in slot #m−1 uses HARQ process #i, and when HARQ-ACK transmission for the SPS PDSCH is scheduled in slot #m, the UE may determine to defer a PUCCH for the HARQ-ACK transmission for the SPS PDSCH from in slot #m to slot #n based on predetermined conditions. According to such HARQ-ACK deferral, even if PUCCH transmission is canceled, the UE and BS may transmit/receive HARQ-ACK information for the SPS PDSCH later.

In some scenarios (e.g., LTE-based systems or NR Rel-16-based systems), a CC (i.e., serving cell) used by the UE for PUCCH transmission may be configured semi-statically through RRC signaling from the BS. In some scenarios, to enable the UE to transmit a PUCCH as quickly as possible, dynamically switching a carrier (or cell) to transmit the PUCCH by determining a CC to transmit the PUCCH based on L1 signaling from the BS or by UE's arbitrary determination, or semi-statically switching a cell (or cell) to transmit the PUCCH according to predefined rules is under consideration. In the present disclosure, switching a CC may refer to switching a cell including the CC. In other words, carrier switching described herein may mean switching from one cell to another cell or may also refer to switching between carriers within a single cell.

Figure 15:
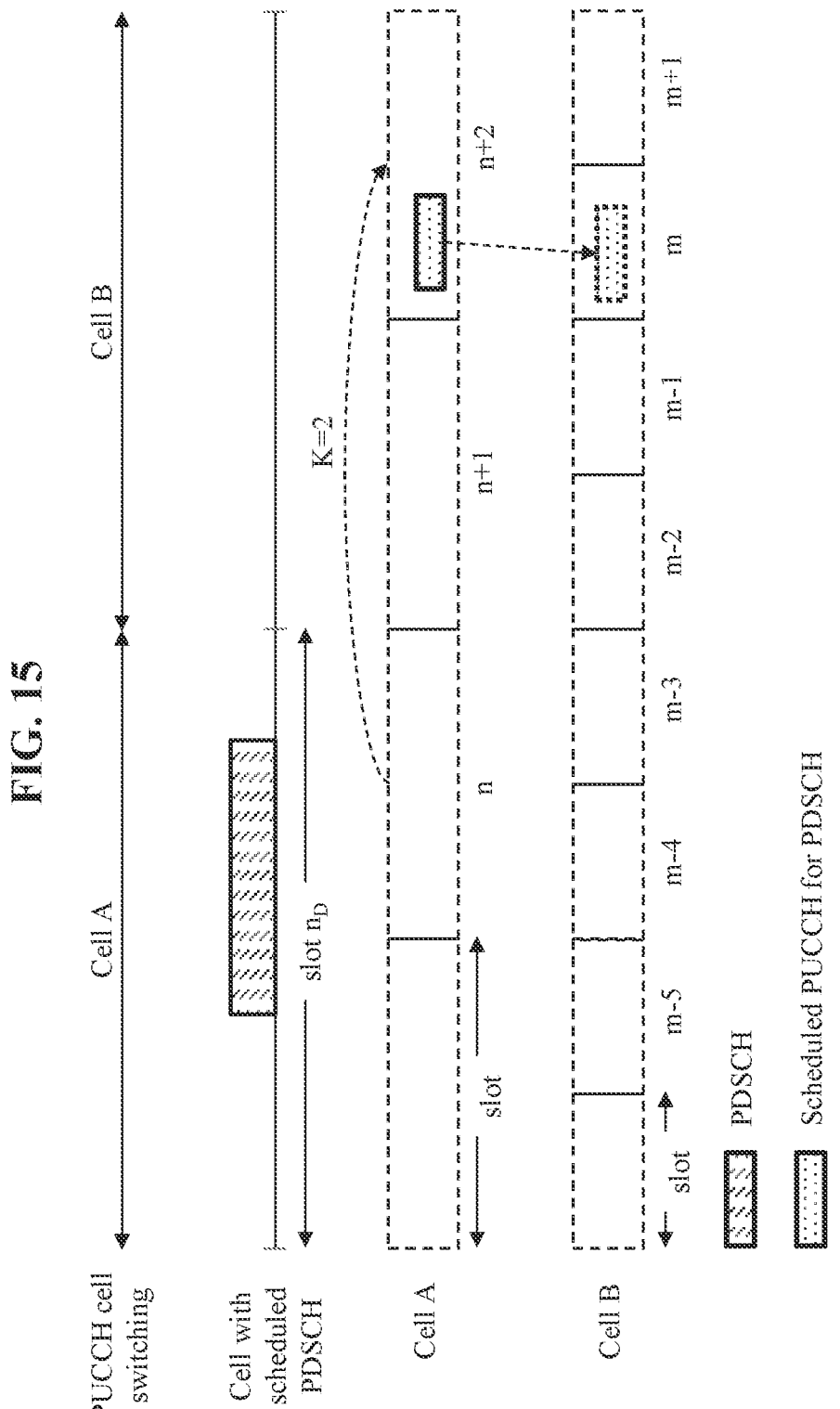
FIG. 15 illustrates exemplary PUCCH cell switching.

FIG. 15 illustrates exemplary PUCCH cell switching. For the sake of clarity in the description, FIG. 15 illustrates an example where a cell on which a PDSCH is transmitted differs from candidate PUCCH cells for PUCCH cell switching and the SCS of the cell on which the PDSCH is transmitted also differs from the SCSs of the candidate PUCCH cells. However, the PDSCH may be transmitted on a candidate PUCCH cell, and the SCS of the cell on which the PDSCH is transmitted may be the same as the SCSs of some candidate PUCCH cells.

In some implementations of the present disclosure, when the UE is capable of using multiple CCs, the UE may change a PUCCH transmission carrier (e.g., PUCCH cell) according to predefined rules or change the PUCCH transmission carrier (e.g., PUCCH cell) based on L1 signaling provided by the BS, thereby enabling the UE to perform continuous UL transmission.

In some implementations, the UE may use a set of HARQ-ACK feedback timing values (e.g., dl-DataToIL-ACK, dl-DataToIL-ACK-r16, or dl-DataToIL-ACK-DCI-1-2-r16), which are configured on the primary cell of a PUCCH group where a PDSCH is scheduled, to select a PUCCH resource. For example, if the PUCCH group where the PDSCH is scheduled is an MCG, the UE may determine a HARQ-ACK feedback timing value K for the PDSCH based on a set of HARQ-ACK feedback timing values configured on the Pcell. If the PUCCH group where the PDSCH is scheduled is an SCG, the UE may determine the HARQ-ACK feedback timing value K for the PDSCH based on a set of HARQ-ACK feedback timing values configured on a PSCell of the SCG. If the PUCCH group where the PDSCH is scheduled is a primary PUCCH group, the UE may determine the HARQ-ACK feedback timing value K for the PDSCH based on the set of HARQ-ACK feedback timing values configured on the Pcell. If the PUCCH group where the PDSCH is scheduled is a secondary PUCCH group, the UE may determine the HARQ-ACK feedback timing value K for the PDSCH based on a set of HARQ-ACK feedback timing values configured on a PUCCH-SCell of the secondary PUCCH group.

Referring to FIG. 15, for example, for PDSCH reception that ends in DL slot np, if no PUCCH cell switching is configured, supported, or indicated, the UE may transmit a PUCCH including HARQ-ACK information for the PDSCH reception in UL slot n+k on a primary cell (e.g., cell A in FIG. 15), where slot n is the last slot for PUCCH transmission overlapping with slot np, and k may be provided by the determined HARQ-ACK feedback timing value K. In some implementations, the determined HARQ-ACK feedback timing value K may be counted based on the slots on the primary cell. On the other hand, when PUCCH cell switching is configured, supported, or indicated, a PUCCH cell may be determined according to predefined/preconfigured rules or L1 signaling for a slot on the primary cell determined based on the determined HARQ-ACK feedback timing value K. For example, referring to FIG. 15, when the PUCCH cell switching is configured, supported, or indicated, and when the PUCCH cell for slot n+2 is determined to be cell B according to predefined/preconfigured rules or L1 signaling, the UE may perform PUCCH transmission for the PDSCH, for example, in the earliest slot, slot m among the slots on cell B overlapping with slot n+2 on cell A, instead of performing the PUCCH transmission for the PDSCH in slot n+2 on cell A.

As described above, HARQ-ACK transmission deferral and PUCCH carrier switching are being considered to address the following issues: transmission of a HARQ-ACK for an SPS PDSCH is not allowed in the TDD environment; and a long time delay occurs in the TDD environment. In other words, HARQ-ACK deferral and PUCCH cell switching are being considered to enable the UE to perform PUCCH transmission as quickly as possible. Switching a PUCCH carrier dynamically or deferring transmission of a HARQ-ACK have a commonality in that UL transmission on resources that are unavailable for transmission due to the TDD operation is performed on other available resources. Therefore, the HARQ-ACK transmission deferral (i.e., HARQ-ACK deferral) and PUCCH carrier switching (i.e., PUCCH cell switching) may be required at the same time. Since the effects that could be achieved through the HARQ-ACK deferral and PUCCH cell switching are also similar, it may be desirable for the UE and BS to perform one of the two operations when the HARQ-ACK deferral and PUCCH cell switching are required. For example, if the UE is capable of performing the HARQ-ACK deferral and PUCCH cell switching in a slot where HARQ-ACK transmission is not allowed, the UE may transmit a HARQ-ACK with lower latency by performing the PUCCH cell switching only without deferring the HARQ-ACK transmission. Alternatively, the UE may perform the HARQ-ACK deferral only, but the UE may consider the impact of the PUCCH cell switching while performing the HARQ-ACK deferral.

However, when the UE supports both the HARQ-ACK deferral and PUCCH cell switching, and when the UE selects one of the two operation, and more particularly, when the UE autonomously determines one of the two operations, consideration is needed regarding how the BS will operate.

Hereinafter, implementations of the present disclosure to achieve lower latency by combining the above two methods will be described by assuming that whenever the UE transmits a PUCCH, the UE is capable of dynamically switching a carrier for PUCCH transmission by determining a CC on which the UE performs the PUCCH transmission based on L1 signaling (e.g., DCI) from the BS or by determining the CC (arbitrarily or according to predetermined rules) and that the UE is capable of deferring transmission of a HARQ-ACK for an SPS PDSCH according to TDD configurations. For example, implementations of the present disclosure that allow a HARQ-ACK to be transmitted in an earlier slot by considering the PUCCH cell switching during the HARQ-ACK deferral operation will be described.

In some implementations of the present disclosure, if the UE is capable of using multiple CCs, the UE may switch a PUCCH transmission carrier according to predefined rules (PUCCH carrier switching) or defer HARQ-ACK transmission that is not allowed due to the TDD operation (HARQ-ACK deferral) to perform continuous UL transmission. In this case, the UE may determine whether to perform the PUCCH carrier switching or HARQ-ACK deferral for UL transmission(s) configured/indicated on unavailable resources based on TDD configurations and CA configurations according to some implementations of the present disclosure. The UE may also determine a PUCCH carrier and a PUCCH resource to be used for each operation.

When the HARQ-ACK deferral is performed, the UE may defer HARQ-ACK transmission from an originally indicated/configured HARQ-ACK transmission slot (hereinafter referred to as an initial slot) to another slot (hereinafter referred to as a target slot).

If the UE is configured with an SCG, the UE may apply some implementations of the present disclosure described below to both an MCG and the SCG. If some implementations of the present disclosure described below are applied to the MCG, the terms "secondary cell", "secondary cells", "serving cell", and "serving cells" in the following description may refer to a secondary cell, secondary cells, a serving cell, and serving cells, respectively, belonging to the MCG. If some implementations of the present disclosure described below are applied to the SCG, the terms "secondary cell", "secondary cells" (without a PSCell), "serving cell", and "serving cells" in the following description may refer to a secondary cell, secondary cells, a serving cell, and serving cells, respectively, belonging to the SCG. Hereinafter, the term "primary cell" may refer to a Pcell of the MCG when some implementations of the present disclosure are applied to the MCG and refer to a PSCell of the SCG when some implementations of the present disclosure are applied to the SCG.

When the UE is configured with the PUCCH-SCell, the UE may apply some implementations of the present disclosure described below to both a primary PUCCH group and a secondary PUCCH group. If some implementations of the present disclosure described below are applied to the primary PUCCH group, the terms "secondary cell", "secondary cells", "serving cell", and "serving cells" in the following description may refer to a secondary cell, secondary cells, a serving cell, and serving cells, respectively, belonging to the primary PUCCH group. If some implementations of the present disclosure described below are applied to the secondary PUCCH group, the terms "secondary cell", "secondary cells" (without a PSCell), "serving cell", and "serving cells" in the following description may refer to a secondary cell, secondary cells, a serving cell, and serving cells, respectively, belonging to the secondary PUCCH group. Hereinafter, the term "primary cell" may refer to a Pcell of the primary PUCCH group when some implementations of the present disclosure are applied to the primary PUCCH group and refer to a PUCCH-SCell of the secondary PUCCH group when some implementations of the present disclosure are applied to the secondary PUCCH group.

In the present disclosure, the term "carrier" or "component carrier (CC)" may refer to a cell that includes a carrier described above. In other words, the term "carrier switching" may refer to switching from one cell to another cell or switching between carriers within a single cell.

Figure 16:
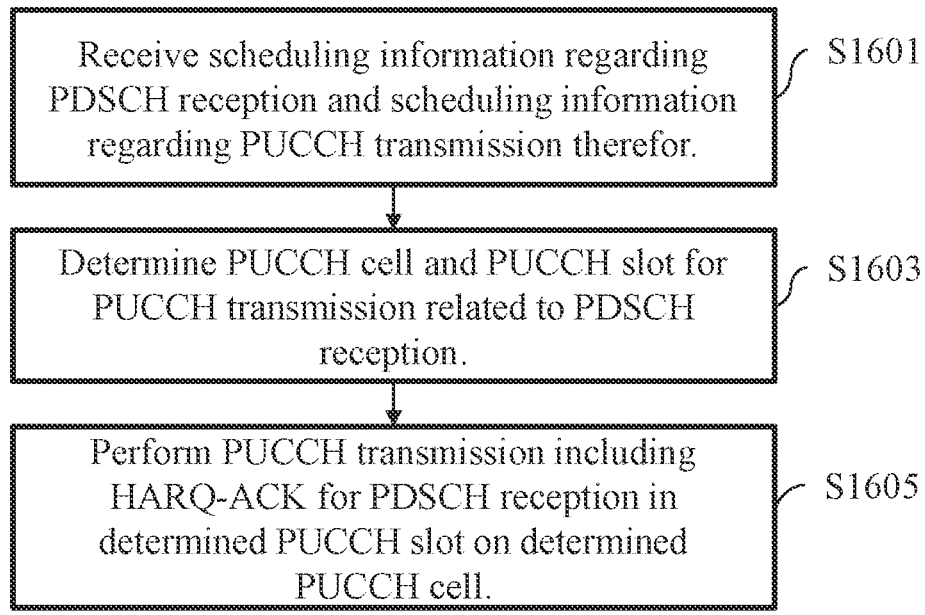
FIG. 16 illustrates a HARQ-ACK transmission flow according to some implementations of the present disclosure.

UE Side:

FIG. 16 illustrates a HARQ-ACK transmission flow according to some implementations of the present disclosure.

The UE may be provided with a cell configuration upon connecting to the BS. The UE may obtain information regarding CCs available to the UE from the cell configuration. The BS may transmit a MAC control element (CE) message to the UE to activate or deactivate each carrier. When the BS schedules the UE to receive a PDSCH and transmit a PUCCH carrying a HARQ-ACK response therefor, the UE may dynamically select a carrier on which the UE will transmit the PUCCH carrying the HARQ-ACK response according to some implementations of the present disclosure. In addition, the UE may determine a PUCCH resource to be used on the corresponding carrier according to some implementations of the present disclosure.

In some implementations, for example, the UE may receive scheduling information regarding PDSCH reception and scheduling information regarding PUCCH transmission for a HARQ-ACK response therefor (S1601). If the UE supports HARQ-ACK deferral and PUCCH cell switching, the UE may determine a PUCCH cell and a PUCCH slot, in which the UE will perform the PUCCH transmission for the scheduled PDSCH reception, based on the HARQ-ACK deferral and/or PUCCH cell switching according to some implementations of the present disclosure (S1603). The UE may perform the PUCCH transmission including the HARQ-ACK information for the scheduled PDSCH reception in the determined PUCCH slot on the determined PUCCH cell (S1605).

The following are examples of UE operations according to some implementations of the present disclosure.

1) Upon connecting to the BS, the UE may receive an RRC configuration including CC information (e.g., ServingCellConfigCommon) through RRC signaling from the BS.

2) The UE may receive an SPS PDSCH configuration and an RRC configuration for deferring a HARQ-ACK for an SPS PDSCH through RRC signaling from the BS.

3) The BS may transmit a MAC CE message to the UE to activate or deactivate each carrier configured for the UE.

4) The BS may schedule the UE to perform PDSCH reception, SPS PDSCH release reception, and PUCCH transmission for HARQ-ACK responses therefor.

5) The UE may determine whether to change a carrier on which the PUCCH for the HARQ-ACK responses will be transmitted and/or change a HARQ-ACK transmission time indicated/configured to the UE based on some implementations of the present disclosure.

6) The UE may determine a PUCCH resource to be used on the changed/determined carrier and/or at the changed/determined HARQ-ACK transmission time based on some implementations of the present disclosure.

In some implementations of the present disclosure, DL symbol(s) may refer to symbol(s) included in at least one of the following:

A set of symbols in a slot indicated as DL by tdd-UL-DL-ConfigurationCommon or tdd-UL-DL-ConfigurationDedicated;

A set of symbols in a slot indicated to the UE by pdcch-ConfigSIB1 in a master information block (MIB) for a control resource set (CORESET) for a Type0-PDCCH CSS set;

A set of symbols in a slot indicated to the UE for reception of SS/PBCH blocks in any serving cell among multiple serving cells by ssb-PositionInBurst in SystemInformationBlockType1 or by ssb-PositionInBurst in ServingCellConfigCommon; or A set of symbols in a slot with DCI format 2_0 having an SFI-index field value indicated as DL.

In some implementations of the present disclosure, UL symbol(s) may refer to symbol(s) included in at least one of the following:

A set of symbols in a slot indicated as UL by tdd-UL-DL-ConfigurationCommon or tdd-UL-DL-ConfigurationDedicated;

A set of symbols in a slot corresponding to a valid PRACH occasion and $N_{gap}$ symbols before the valid PRACH occasion; or A set of symbols in a slot with DCI format 2_0 having an SFI-index field value indicated as UL.

The following UE operations according to some implementations of the present disclosure are mainly explained in the context of UCI transmission on a PUCCH, and more particularly, transmission of a HARQ-ACK response for an SPS PDSCH over the PUCCH. However, implementations of the present disclosure may be applied not only to transmission of a HARQ-ACK response for a PDSCH scheduled by DCI but also to PUSCH transmission and PUCCH transmission that carry other UCI.

In some implementations of the present disclosure, PUCCH carrier switching refers to an operation in which the UE arbitrarily changes a PUCCH carrier according to predefined rules and performs PUCCH transmission as described above. The following rules may be considered as the predefined rules.

When a PUCCH radio resource is determined based on a PRI included in DCI and when the DCI includes a PUCCH carrier indication, the UE may perform the PUCCH carrier switching according to the PUCCH carrier indication.

A PUCCH carrier switching pattern may be configured for the UE through higher layer signaling of the BS.

The PUCCH carrier switching pattern may mean information in which lists in which one or more available UL CCs are included are listed in order according to a certain time unit (e.g., a couple of slots) in a certain time period (e.g., dozens of slots, one frame, or 10 ms).

In order to represent that a list of available UL CCs occupies a certain time unit, a time length $T_L$ may be included in each list. The time length $T_L$ may mean a time occupied by the corresponding list. In this case, the period of the PUCCH carrier switching pattern may be the total sum of the time lengths $T_L$ of lists of available UL CCs. For example, there may be a certain UL CC list L1={C1, C2, C3}, and the time information $T_L$ may be additionally assigned to the list L1. For example, L1={{C1, C2, C3}, $T_L$} may be provided. In this case, at least one of C1, C2, or C3 may be used during the time $T_L$. These lists may be enumerated in order. For example, if the lists are given as {L1, L2, L3, ... LN}, the total sum of the time lengths T for respective lists Ln may represent the length of the entire pattern.

In some implementations, information indicating that PUCCH carrier switching is not performed in a specific time duration may also be included in one or more patterns. This information may also be expressed as a list of UL CCs including a separate RRC parameter (e.g., noPUCCHCarrierSwithcing). The UE may not perform PUCCH carrier switching in a duration in which such information is included.

The time unit or slot length (i.e., time length per slot) may be determined through a UL SCS configuration configured in a cell. For example, at least one of the following may be considered.

A separate UL reference SCS for the PUCCH carrier switching pattern may be configured, and the time unit may be determined through a corresponding SCS value.

The time unit may be determined through the largest or smallest SCS among SCSs of UL BWPs configured for the UE.

The time unit may be determined through the largest or smallest SCS configurable in a cell. As an example, the time unit may be determined through the smallest or largest SCS configuration u provided by ses-SpecificCarrierList of FrequencyInfoUL, or FrequencyInfoUL-SIB.

When one frame has a length of 10 ms, a slot length according to each SCS configuration u may be determined according to Table 1.

<Implementation A1> Deferring First within PUCCH Carrier, Carrier Switching Second When the UE receives an SPS PDSCH configured/indicated by the BS and attempts to transmit a HARQ-ACK response for the SPS PDSCH, if HARQ-ACK transmission, which is determined based on a PUCCH resource and a PDSCH-to-HARQ-ACK timing that are indicated or configured, is not allowed due to overlapping in time with one or more DL symbols, the UE may perform the HARQ-ACK deferral procedure first in an initial slot to determine a new target slot for transmitting the HARQ-ACK response and then transmit the HARQ-ACK response in the corresponding slot.

In addition, the UE may attempt the PUCCH carrier switching to perform PUCCH transmission in an initial slot on another CC in the following cases: when the UE is allowed to transmit the HARQ-ACK response at a position that is farther away in time by more than a time interval T (e.g., maximum deferral limit) from the end of related PDSCH reception or from the start of indicated PUCCH transmission in the initial slot (for example, when the HARQ-ACK response is allowed to be transmitted at a time later than T_pdsch+T or T_pucch+T where T_pdsch and T_pucch are the PDSCH reception end time and the PUCCH transmission start time, respectively) as a result of the HARQ-ACK deferral procedure, that is, due to the HARQ-ACK deferral; when an explicit latency budget (e.g., packet delay budget) is given for a service associated with the HARQ-ACK response transmitted by the UE and it is determined that the determined target slot is unlikely to satisfy the delay budget (e.g., packet delay budget); or when it is difficult to successfully perform the HARQ-ACK deferral procedure for other reasons.

The time interval T may be predefined or may be determined by L1 signaling and/or higher layer signaling from the BS.

According to Implementation A1, the UE may minimize the execution of the PUCCH carrier switching operation, thereby causing the utilization of channel information on a single CC, which is acquired and maintained on the corresponding CC, to be maximized.

<Implementation A2> Carrier Switching First, Deferring Second

When the UE receives an SPS PDSCH configured/indicated by the BS and attempts to transmit a HARQ-ACK response for the SPS PDSCH, if HARQ-ACK transmission, which is determined based on a PUCCH resource and a PDSCH-to-HARQ-ACK timing that are indicated or configured, is not allowed due to overlapping in time with one or more DL symbols, the UE may attempt the PUCCH carrier switching first in an initial slot to perform PUCCH transmission. If the PUCCH transmission in the initial slot is not allowed after the PUCCH carrier switching, the UE may perform the HARQ-ACK deferral procedure.

For example, the UE attempts HARQ-ACK PUCCH transmission in the initial slot based on the PUCCH carrier switching if possible. If the UE is not allowed to transmit the PUCCH in the initial slot despite the PUCCH carrier switching (for example, in cases where there is no CC with sufficient UL symbols available for the PUCCH transmission in the initial slot), the UE may perform the HARQ-ACK deferral additionally to determine a new target slot for transmitting the HARQ-ACK and then transmit the HARQ-ACK response in the corresponding slot.

When the UE additionally performs the HARQ-ACK deferral, the UE may perform the HARQ-ACK deferral based on some implementations of the present disclosure. Accordingly, the UE may perform the HARQ-ACK deferral considering multiple CCs and minimize a round-trip time (RTT) required for PDSCH reception.

Alternatively, to simplify UE operations, when the UE receives the SPS PDSCH configured/indicated by the BS and attempts to transmit the HARQ-ACK response for the SPS PDSCH, if the HARQ-ACK transmission, which is determined based on the indicated or configured PUCCH resource and PDSCH-to-HARQ-ACK timing, is not allowed due to overlapping in time with one or more DL symbols, the UE may perform the PUCCH transmission by attempting the PUCCH carrier switching in the initial slot. The UE may not perform the HARQ-ACK deferral procedure even if the PUCCH transmission is not allowed in the initial slot after the PUCCH carrier switching. In other words, once the UE performs the PUCCH carrier switching, the UE does not perform the HARQ-ACK deferral procedure.

As another example, when the PUCCH carrier switching is performed according to a PUCCH carrier switching pattern, the permissibility of the PUCCH carrier switching at each instance may be determined by the PUCCH carrier pattern. The UE may not perform the PUCCH carrier switching at a position where an initial CC is indicated on the PUCCH carrier pattern but may perform the PUCCH carrier switching at a position where a carrier for switching is indicated. The UE may perform the PUCCH carrier switching at a time where the PUCCH carrier switching is allowed and perform the HARQ-ACK deferral procedure in a period where the PUCCH carrier switching is not allowed.

<Implementation A2-1> Deferring after Carrier Switching

In the case of using Implementation A2, when the UE receives an SPS PDSCH configured/indicated by the BS and attempts to transmit a HARQ-ACK response for the SPS PDSCH, if HARQ-ACK transmission, which is determined based on a PUCCH resource and a PDSCH-to-HARQ-ACK timing that are indicated or configured, is not allowed due to overlapping in time with one or more DL symbols, the UE may attempt the PUCCH carrier switching first in an initial slot to perform PUCCH transmission.

When the UE is explicitly configured with a target carrier for carrier switching to be used in a UL slot to which the corresponding PUCCH is scheduled, if the PUCCH transmission is not allowed in an initial slot after the PUCCH carrier switching, the UE may perform the HARQ-ACK deferral procedure. In this case, the following methods may be considered.

Method A2_1: The UE may perform the carrier switching to a target carrier, which is configured to be used in the initial slot, and then defer the PUCCH transmission to a target slot in which the UE is capable of performing the PUCCH transmission on the target carrier. If a UL carrier configured to be used in the target slot is different from the target carrier, the UE may perform the PUCCH carrier switching to the target carrier again.

Method A2_2: The UE may perform the HARQ-ACK deferral procedure on an original carrier to defer the PUCCH transmission to a target slot in which the UE is capable of performing the PUCCH transmission on the original carrier. The UE may perform the carrier switching to a target carrier configured to be used in the target slot and then perform the PUCCH transmission.

Method A2_3: The UE may consider a UL carrier configured to be used in each UL slot while performing the HARQ-ACK deferral procedure as in Implementation A3/B3. For example, while finding a first UL slot in which the UE is capable of transmitting the deferred PUCCH, the UE may consider the feasibility of transmission on a target UL carrier of a corresponding slot (e.g., a UL slot where a PUCCH carrier to be used is configured). If the PUCCH transmission is allowed, the UE may defer the PUCCH transmission to a slot in which the PUCCH transmission is allowed among slots of the target UL carrier.

<Implementation A3> HARQ-ACK Deferral with PUCCH Carrier Switching

Figure 17:
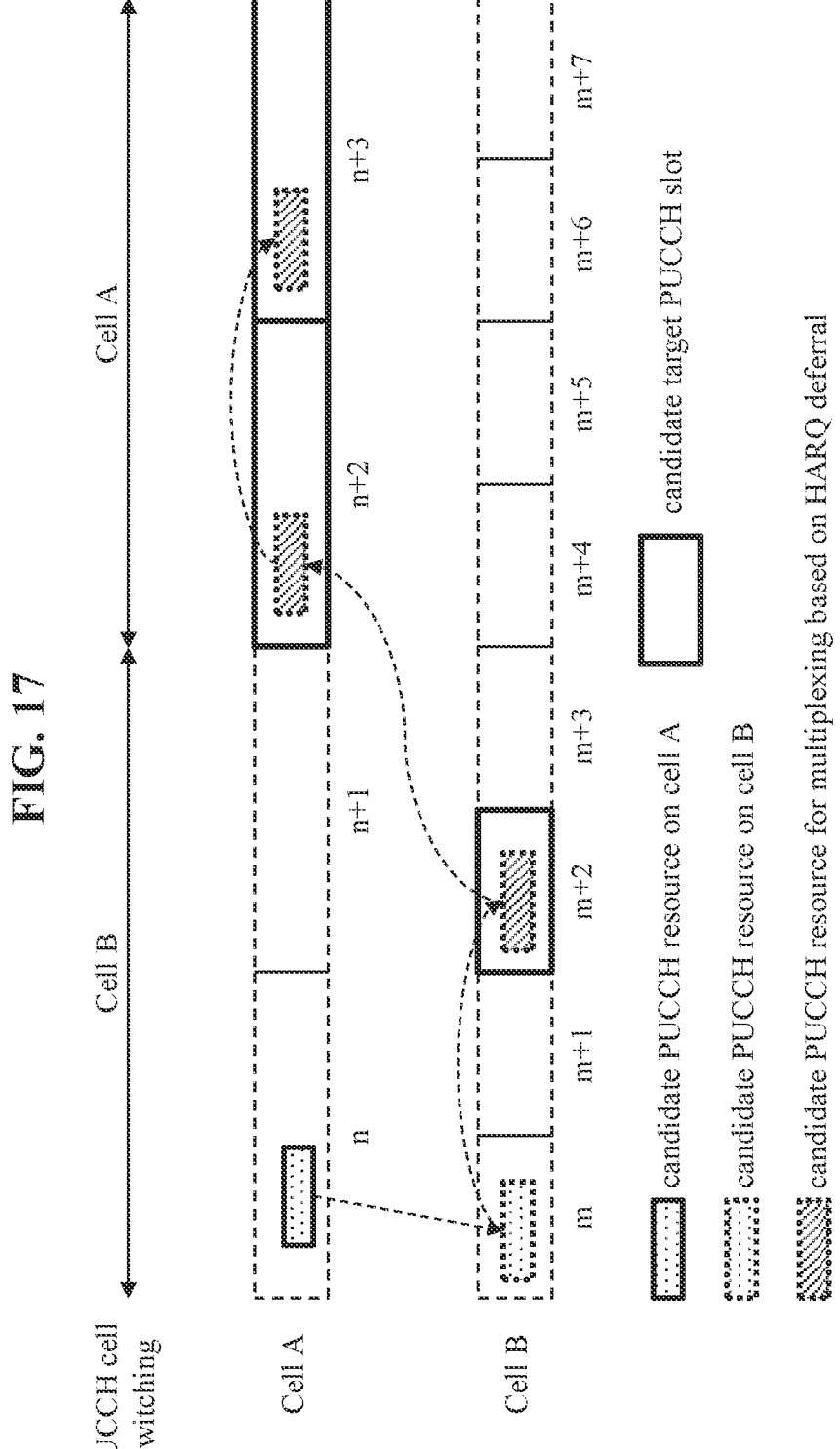
FIG. 17 illustrates a cell and a slot where a HARQ-ACK response is transmitted according to some implementations of the present disclosure.

FIG. 17 illustrates a cell and a slot where a HARQ-ACK response is transmitted according to some implementations of the present disclosure.

When the UE configured with a plurality of CCs performs the HARQ-ACK deferral operation, and more particularly, when the UE intends to transmits a HARQ-ACK response, which is supposed to be transmitted in an initial slot on an initial CC indicated/configured by the BS, (even) in another slot, i.e., target slot, the UE may determine the target slot and a target CC for transmitting the HARQ-ACK response by considering the configured CCs. For example, when a UE configured with a plurality of CCs would perform a (SPS) PDSCH reception configured/indicated by the BS and attempt to transmit a HARQ-ACK response for the (SPS) PDSCH reception, the UE may determine a target slot and a target CC for actually performing the HARQ-ACK transmission, which are determined based on a PUCCH resource and a PDSCH-to-HARQ-ACK timing that are indicated or configured, by considering the configured CCs and the HARQ-ACK deferral.

Method A3_1: Among slots within a predetermined time interval from the initial slot, a CC having consecutive available symbols (e.g., consecutive UL or flexible symbols) sufficient to transmit the PUCCH resource for the deferred HARQ-ACK response may be selected as a target PUCCH carrier. In this case, a slot of each CC where the consecutive available symbols are present may become the target slot of each CC. The predetermined time interval may be a value indicated or configured by the BS, or the maximum deferral limit derived by the UE based thereon.

Method A3_2: When the target slot of each CC is determined, a CC with the smallest gap from the initial slot to the target slots may be selected as the target CC.

Method A3_3: When the target slot of each CC is determined, a CC with the earliest starting symbol of the PUCCH resource for transmitting the deferred HARQ-ACK response in the target slot of each CC may be selected as the target CC.

Method A3_4: An activated CC may be selected as the target CC.

Method A3_5: A CC with the same SCS as the initial CC may be selected as the target CC.

Method A3_6: A CC with an SCS greater than or equal to that of the initial CC may be selected as the target CC.

Method A3_7: A CC capable of handling the same priority level as the HARQ-ACK response deferred from the initial CC may be selected as the target CC. For example, if the HARQ-ACK response deferred from the initial CC has a high priority, a CC having configured a PUCCH resource for a high priority may be selected as the target CC.

Method A3_8: If two or more CCs are selected according to all of the considered conditions, a CC with the lowest cell index among the two or more CCs may be selected as the target CC.

Alternatively, in some implementations of the present disclosure, the method (described above) by which the UE determines a PUCCH carrier to be changed based on the PUCCH carrier switching may be equally applied as a method of determining a target CC. For example, a PUCCH cell for a slot may be determined according to a predetermined or predefined rule. In this case, to perform the HARQ-ACK deferral operation in consideration of a plurality of CCs, the UE may transmit a deferred HARQ-ACK response for a given PUCCH in initial slot n (i.e., PUCCH given for initial slot n), by applying the PUCCH carrier switching, in the earliest slot where the PUCCH may be transmitted, when assuming performing the PUCCH carrier switching in each of slot n, slot n+1, . . . , and slot n+k. In other words, to support the simultaneous configuration of the HARQ-ACK deferral and PUCCH cell switching, the UE may operate as follows. The UE may determine a next PUCCH slot on the PUCCH cell determined according to a predefined rule for the PUCCH cell switching. Then, according to HARQ-ACK deferral rule(s), the UE may determine whether the next PUCCH slot on the determined PUCCH cell is a target PUCCH slot for transmission. Here, the next PUCCH slot is a slot on the PUCCH cell determined based on the PUCCH cell switching, which is mapped from slot n+k on an initial cell to which the HARQ-ACK response is scheduled, and k increases on the initial cell.

Referring to FIG. 17, assuming that an initial CC and an initial slot to which transmission of a HARQ-ACK response is scheduled are cell A and slot n, respectively, the UE may determine that cell B is a PUCCH transmission cell for slot n according to predefined rules for the PUCCH cell switching. The UE may determine whether the transmission of the HARQ-ACK response is allowed in the earliest slot, slot m overlapping with slot n among slots on cell B. For example, the UE may determine a PUCCH resource for UCI including the corresponding HARQ-ACK response in the earliest slot, slot m overlapping with slot n among the slots on cell B. Then, the UE may determine whether the transmission of the HARQ-ACK response is allowed in slot m on cell B, depending on whether the PUCCH resource includes DL symbol(s). If the transmission of the HARQ-ACK response is not allowed in slot m on cell B, for example, if the PUCCH resource in slot m on cell B for the HARQ-ACK response includes DL symbol(s), the UE may determine to defer the transmission of the HARQ-ACK response. To determine a target slot to which the transmission of the HARQ-ACK response is deferred, the UE may determine a PUCCH cell for slot n+1 on cell A to which the transmission of the HARQ-ACK response is originally scheduled. Then, the UE may determine whether slot m+2 mapped from slot n+1 among the slots on cell B, which is the PUCCH cell for slot n+1, is the target slot for transmitting the deferred HARQ-ACK response. If the transmission of the deferred HARQ-ACK response is allowed in slot m+2 on cell B, the UE may transmit UCI including the deferred HARQ-ACK response on a PUCCH resource in slot m+2 on cell B. If the transmission of the deferred HARQ-ACK response is not allowed in slot m+2 on cell B, the UE may determine whether the transmission of the deferred HARQ-ACK response is allowed in slot n+2 on cell A, which is a PUCCH cell for slot n+2, and determine whether slot n+2 on cell A is the target slot.

In considering UL slots of each UL CC, a slot length (i.e., the time length of the slot) configured for each priority and each HARQ-ACK codebook may also be considered to count the UL slots. To simplify the operation, considering a priority indicated/configured for a source PUCCH on which the carrier switching is performed, a UL slot applied to a target CC when the corresponding priority is used may be considered as the UL slot for the target CC. For example, assuming that for cell A, slot lengths X and Y are used for priorities 0 and 1, respectively, and for cell B, slot lengths Y and Z are used for priorities 0 and 1, respectively, if UCI over PUCCH transmission indicated as priority 1 for cell A needs to be transmitted on cell B by the carrier switching, the UCI over the PUCCH transmission may be transmitted over a PUCCH on cell B with slot length Z. In some implementations of the present disclosure, for this operation, the target CC may be limitedly selected from CCs configured with the same priority.

Since the effects obtained by the HARQ-ACK deferral and PUCCH cell switching are similar, the UE and BS may to some extent achieve the objective of transmitting a PUCCH, which could not be transmitted due to overlapping with DL symbol(s) in an originally scheduled slot on an initial cell even if only one of the HARQ-ACK deferral and PUCCH cell switching is performed at the time when the HARQ-ACK deferral and PUCCH cell switching are required. However, when the UE and BS consider the HARQ-ACK deferral and PUCCH cell switching together according to Implementation A3, the UE and BS may achieve shorter latency in PUCCH transmission, compared to when only one of the HARQ-ACK deferral and PUCCH cell switching is performed or when the HARQ-ACK deferral and PUCCH cell switching are considered separately.

<Implementation A4> Maximum HARQ-ACK Deferral Considering PUCCH Carrier Switching When the UE is configured with a plurality of CCs and performs the HARQ-ACK deferral operation, that is, when the UE performs HARQ-ACK response transmission, which is instructed/configured by the BS to be performed in an initial slot on an initial CC, in another slot, i.e., target slot, the UE may determine the maximum HARQ-ACK deferral range, max_defer by considering the configured CCs. The UE may perform the HARQ-ACK deferral only within the max_defer range. For example, to determine the value of max_defer, the UE may consider at least one of the following.

When the UE considers configured sets of PDSCH-to-HARQ_feedback timings K1 to determine max_defer, for example, when the UE considers configured dlData-ToUL-ACK, dl-DataToUL-ACK-r16, or dl-DataToUL-ACKForDCIFormat1_2, the UE may consider only a set of K1 configured for a UL CC used when the PUCCH carrier switching is not performed, for example, a primary cell.

the UE may consider sets of K1 for all candidate cells that may be subject to the configured PUCCH carrier switching.

the UE may consider only a set of K1 configured for an available UL CC configured for a PUCCH carrier switching pattern at the time of the HARQ-ACK deferral.

If the UE uses max_defer included in each SPS PDSCH configuration to determine max_defer, the UE may use the corresponding value without any change. The parameter max_defer in the SPS PDSCH configuration may indicate the maximum number of slots or subslots that SPS HARQ-ACK transmission in a slot or subslot can be deferred.

When the UE considers configured sets of PDSCH-to-HARQ_feedback timings K1 to determine max_defer, the UE may determine, for example, the largest K1 value in the configured set(s) of K1 as the maximum HARQ-ACK deferral range, max_defer. That is, even if the HARQ-ACK deferral is performed, the HARQ-ACK deferral may be performed such that a slot position difference between a deferred HARQ-ACK PUCCH and PDSCH reception related thereto is limited to max_defer.

To determine the largest K1 value or to apply the determined max_defer value to UL CCs with different slot lengths (e.g., different SCSs), the time length of max_defer needs to be determined. That is, when the PUCCH carrier switching is used, the timing of PUCCH transmission deferred from the timing of PDSCH reception may be limited by the actually calculated time length of max_defer. To this end, at least one of the following may be considered.

An effective slot offset length obtained by applying the SCS of a UL CC used when the PUCCH carrier switching is not performed is used as the time length of max_defer. That is, even if the UE performs the HARQ-ACK deferral based on the PUCCH carrier switching, the HARQ-ACK deferral based on the PUCCH carrier switching does not exceed the maximum HARQ-ACK deferral range when the PUCCH carrier switching is not performed.

The time length of max_defer may be determined based on a UL reference SCS or UL reference cell used for a PUCCH carrier switching pattern. The PUCCH carrier switching pattern may be predefined/preconfigured based on the UL reference SCS or UL reference cell. The BS may configure the value of max_defer for each SPS configuration based on the UL reference SCS or UL reference cell, and the UE may determine the (maximum) slot range where the HARQ-ACK deferral is allowed by interpreting the configured value of max_defer based on the UL reference SCS or UL reference cell. The UL reference SCS or UL reference cell may be configured or defined to be commonly used for all SPS configuration(s) (for example, a primary cell or Pcell may be predefined as the UL reference cell). Alternatively, the UL reference SCS or UL reference cell may be configured for each SPS configuration.

The time length of max_defer may be determined based on the largest or smallest SCS among UL BWPs configured for all candidate cell(s) subject to the PUCCH carrier switching.

The time length of max_defer may be determined based on the largest or smallest SCS configurable in a cell. For example, the time length of max_defer may be determined based on the smallest or largest SCS configuration u provided by ses-SpecificCarrierList of Fre-quencyInfoUL, or FrequencyInfoUL-SIB, which is an RRC configuration.

Depending on a given SCS, max_defer*(the number of OFDM symbols per slot)*(the symbol length of the given SCS) or max_defer*(10 ms)/(the number of slots per frame of the given SCS) may be used as the actual time length of max_defer.

When max_defer is applied on the assumption of a specific cell or specific SCS, deferred PUCCH transmission may be overlap with the boundary of the maximum deferral range determined by max_defer. For example, in typical single-carrier operation, the boundary of the maximum deferral range determined by max_defer aligns with slot boundaries, and thus there is no difficulty in validating the effectiveness of the deferral operation. In the typical single-carrier operation, the UE may determine a PUCCH as valid if the PUCCH is deferred within the boundary of the deferral range and as invalid if the PUCCH is deferred outside the boundary of the deferral range. However, in the HARQ-ACK deferral procedure considering the PUCCH carrier switching, the boundary of the determined maximum defer-ral range may not align with the slot boundary of a UL carrier on which the PUCCH is transmitted.

If the boundary of the maximum deferral range does not align with the slot boundary of the UL carrier on which the PUCCH is transmitted, the boundary of the deferral range may extend into a PUCCH resource. In this case, it may be difficult to determine whether the corresponding PUCCH needs to be dropped because of its going beyond the boundary of the deferral range. In some implementations of the present disclosure, the following may be considered to assess the effectiveness of PUCCH dropping and deferral operations.

Method A4_1: The boundary of the deferral range may be redefined based on slots of a PUCCH carrier. To this end, at least one of the following methods may be considered.

Method A4_1-1: Based on the reference cell or refer-ence SCS used to determine the boundary of the deferral range, the UE may determine that a slot of the PUCCH carrier that overlap in time with one or more slots within a range where the deferral opera-tion is allowed is within the range where the deferral operation is allowed.

Method A4_1-2: Based on the reference cell or refer-ence SCS used to determine the boundary of the deferral range, the UE may determine that a slot of the PUCCH carrier that overlap more than half (i.e., overlap with more than half of symbols included in a slot) in time with a slot within a range where the deferral operation is allowed is within the range where the deferral operation is allowed.

Method A4_1-2: Based on the reference cell or refer-ence SCS used to determine the boundary of the deferral range, the UE may determine that a slot of the PUCCH carrier completely included within a range where the deferral operation is allowed is within the range where the deferral operation is allowed. In other words, the UE may assume that only slots that end before the boundary of the defer-ral range are within the range where the deferral operation is allowed.

Method A4_2: The effectiveness of the deferral operation may be determined based on the PUCCH resource, and more particularly, by comparing the PUCCH resource with the boundary of the deferral range. To this end, at least one of the following methods may be considered.

Method A4_2-1: If one or more symbols of the PUCCH resource are included in a range where the deferral operation is allowed, the UE may determine that the deferral operation is valid. In other words, only if the starting symbol of the PUCCH resource is later than the boundary of the deferral range, the UE may determine that the deferral operation is invalid.

Method A4_2-1: If more than half of the symbols of the PUCCH resource are included in a range where the deferral operation is allowed, the UE may determine that the deferral operation is valid.

Method A4_2-2: Only if all symbols of the PUCCH resource are included in a range where the deferral operation is allowed, the UE may determine that the deferral operation is valid. In other words, if the last symbol of the PUCCH resource is later than the boundary of the deferral range, the UE may determine that the deferral operation is invalid.

<Implementation A5> Reference Subcarrier Spacing for PUCCH Cell/Carrier Switching In some implementations of the present disclosure, the PUCCH cell/carrier switching may mean that the UE arbitrarily changes a PUCCH cell/carrier according to predefined rules and performs PUCCH transmission as described above. The following rules may be considered as the predefined rules.

When a PUCCH radio resource is determined based on a PRI included in DCI, and when the DCI includes a PUCCH carrier indication, the PUCCH carrier switching may be performed according to the PUCCH carrier indication.

The UE may be configured with a PUCCH carrier switching pattern through higher layer signaling from the BS. The PUCCH carrier switching pattern may refer to information that lists cell(s) to be used in a specific time unit (e.g., slot(s) for a given SCS configuration) within a specific time period (e.g., dozens of slots, one frame, or 10 ms). If the UE performs the PUCCH carrier/cell switching between two cells: a primary cell and an SCell configured as the target of the PUCCH carrier/cell switching, the PUCCH carrier switching pattern may correspond to information listing whether the primary cell or the configured SCell will be used in each time unit of a specific time period. The length of the time unit or slot may be determined by a UL SCS configuration configured for a cell. For example, a reference SCS configuration u_ref by referenceSubcarrierSpacing provided in tdd-UL-DL-Configuration-Common may be used to determine the length of the time unit or slot.

If one frame has a length of 10 ms, the slot length according to each SCS configuration u may be determined according to Table 1.

As described above, the reference SCS configuration provided to the UE through tdd-UL-DL-ConfigurationCommon may be used to determine the slot length of the PUCCH cell/carrier switching pattern. However, since the corresponding parameter is not essential for UE operations, the BS may not configure the parameter for network configurations and operations. According to some implementations of the present disclosure, in such cases where the UE does not receive higher layer parameters required to interpret the PUCCH cell/carrier switching pattern, the UE may interpret the PUCCH cell/carrier switching pattern using at least one of the following methods.

Method A5_1: To prevent such cases, the reference SCS configuration in tdd-UL-DL-ConfigurationCommon may be defined as a prerequisite for the PUCCH cell/carrier switching. In other words, it may be regulated that the PUCCH cell/carrier switching is performed only when the reference SCS parameter in tdd-UL-DL-ConfigurationCommon is configured. For example, if the UE is not provided with the reference SCS configuration in tdd-UL-DL-ConfigurationCommon, the UE may not perform the PUCCH cell/carrier switching operation. Alternatively, the tdd-UL-DL-ConfigurationCommon parameter set may be defined as a prerequisite element of the PUCCH cell/carrier switching capability of the UE. In other words, it may be regulated that the PUCCH cell/carrier switching is performed only if the UE is configured with the IE tdd-UL-DL-ConfigurationCommon. Accordingly, the tdd-UL-DL-ConfigurationCommon parameter set may be always provided if the BS configures the PUCCH cell/carrier switching operation for the UE.

Method A5_2: To prepare for cases where the tdd-UL-DL-ConfigurationCommon parameter set is not provided, a separate UL reference SCS may be configured for the PUCCH carrier switching pattern. The slot length of the PUCCH cell/carrier switching pattern may be determined based on the corresponding SCS only when the tdd-UL-DL-ConfigurationCommon parameter set is not provided.

Method A5_3: When the tdd-UL-DL-ConfigurationCommon parameter set is not provided, the slot length of the PUCCH cell/carrier switching pattern may be determined based on the largest or smallest SCS among all UL BWP(s) configured for the UE (in the primary cell). Alternatively, to simplify UE operations, the slot length of the PUCCH cell/carrier switching pattern may always be determined based on the largest or smallest SCS among all UL BWP(s) configured for the UE (in the primary cell), regardless of whether the tdd-UL-DL-ConfigurationCommon parameter set is provided to the UE.

Method A5_4: When the tdd-UL-DL-ConfigurationCommon parameter set is not provided, the slot length of the PUCCH carrier switching pattern may be determined based on the largest or smallest SCS configurable in the primary cell. For example, the slot length of the PUCCH cell/carrier switching pattern may be determined based on the smallest or largest SCS configuration u provided by ses-SpecificCarrierList of FrequencyInfoUL, or FrequencyInfoUL-SIB. Alternatively, to simplify UE operations, the slot length of the PUCCH carrier switching pattern may always be determined based on the largest or smallest SCS configurable in the primary cell, regardless of whether the tdd-UL-DL-ConfigurationCommon parameter set is provided to the UE.

Method A5_5: When the tdd-UL-DL-ConfigurationCommon parameter set is not provided, the slot length of the PUCCH cell/carrier switching pattern may be determined based on a predefined SCS value (e.g., u=0 for 15 kHz). Alternatively, to simplify UE operations, the slot length of the PUCCH cell/carrier switching pattern may always be determined based on the predefined SCS value (e.g., u=0 for 15 kHz), regardless of whether the tdd-UL-DL-ConfigurationCommon parameter set is provided to the UE.

Method A5_6: When the tdd-UL-DL-ConfigurationCommon parameter set is not provided, the slot length of the PUCCH cell/carrier switching pattern may be determined based on the SCS of a BWP with the lowest identifier (ID) among all UL BWPs configured for the UE (in the primary cell). Alternatively, to simplify UE operations, the slot length of the PUCCH cell/carrier switching pattern may always be determined based on the SCS of the BWP with the lowest ID among all UL BWPs configured for the UE (in the primary cell), regardless of whether the tdd-UL-DL-Configuration-Common parameter set is provided to the UE.

Method A5_7: When the tdd-UL-DL-ConfigurationCommon parameter set is not provided, the slot length of the PUCCH cell/carrier switching pattern may be determined based on the SCS of an initial UL BWP (e.g., a BWP provided by an RRC parameter initialUplinkBWP) configured for the UE (in the primary cell). Alternatively, to simplify UE operations, the slot length of the PUCCH cell/carrier switching pattern may always be determined based on the SCS of the initial UL BWP (e.g., the BWP provided by the RRC parameter initialUplinkBWP) configured for the UE (in the primary cell), regardless of whether the tdd-UL-DL-ConfigurationCommon parameter set is provided to the UE.

Method A5_8: When the tdd-UL-DL-ConfigurationCommon parameter set is not provided, the slot length of the PUCCH cell/carrier switching pattern may be determined based the SCS of a first active UL BWP (e.g., a BWP provided by an RRC parameter firstActiveUplinkBWP-Id) configured for the UE (in the primary cell). Alternatively, to simplify UE operations, the slot length of the PUCCH cell/carrier switching pattern may always be determined based the SCS of the first active BWP (e.g., the BWP provided by the RRC parameter firstActiveUplinkBWP-Id) configured for the UE (in the primary cell), regardless of whether the tdd-UL-DL-ConfigurationCommon parameter set is provided to the UE.

The UE and BS may use multiple of the above-described methods simultaneously and complementary. For example, the UE and BS may use Method A5_1 and Method A5_2 together. Specifically, when the tdd-UL-DL-Configuration-Common parameter set is provided, the UE and BS may use Method A5_1. When the tdd-UL-DL-ConfigurationCommon parameter set is not provided, the UE and BS may Method A5_2.

Figure 18:
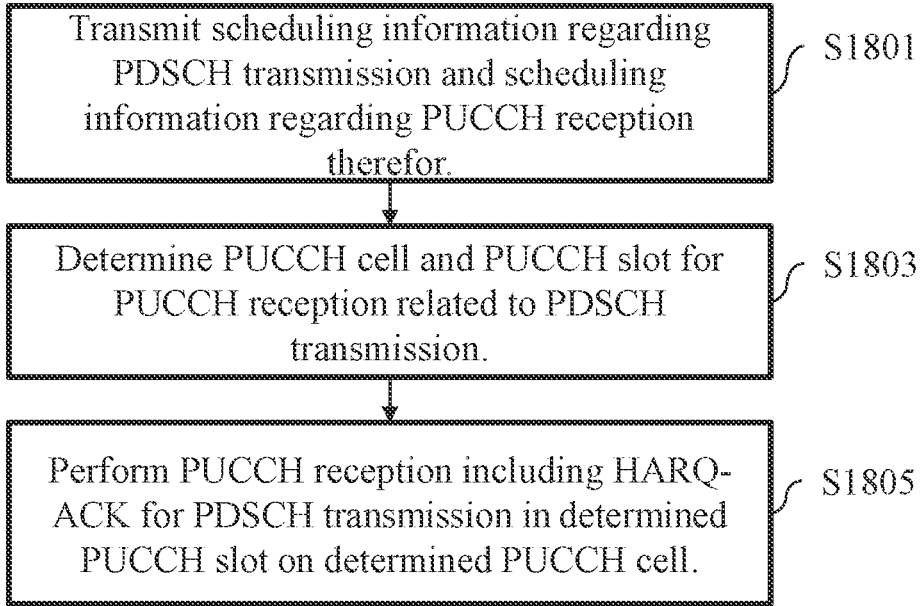
FIG. 18 illustrates a HARQ-ACK reception flow according to some implementations of the present disclosure.

BS Side:

FIG. 18 illustrates a HARQ-ACK reception flow according to some implementations of the present disclosure.

The above-described implementations of the present disclosure will be explained again from the perspective of the BS. The BS may provide a cell configuration to the UE connected to the BS. The BS may transmit information regarding CCs available to the UE through the cell configuration. The BS may transmit a MAC CE message to the UE to activate or deactivate each carrier. When the BS schedules the UE to receive a PDSCH and transmit a PUCCH carrying a HARQ-ACK response therefor, the UE may dynamically select a carrier on which the UE will transmit the PUCCH carrying the HARQ-ACK response according to some implementations of the present disclosure, and the BS may receive UCI on a PUCCH resource to be used on the corresponding carrier according to some implementations of the present disclosure.

In some implementations, for example, the BS may transmit scheduling information regarding PDSCH transmission and scheduling information regarding PUCCH reception for a HARQ-ACK response therefor (S1801). If the UE supports HARQ-ACK deferral and PUCCH cell switching, for example, if the BS configures the HARQ-ACK deferral and PUCCH cell switching for the UE, the BS may determine a PUCCH cell and a PUCCH slot, in which the BS will perform the PUCCH reception for the scheduled PDSCH transmission, based on the HARQ-ACK deferral and/or PUCCH cell switching according to some implementations of the present disclosure (S1803). The BS may perform the PUCCH reception including the HARQ-ACK information for the scheduled PDSCH transmission in the determined PUCCH slot on the determined PUCCH cell (S1805).

The following are examples of BS operations according to some implementations of the present disclosure.

1) When the UE connects to the BS, the BS may transmit an RRC configuration including CC information (e.g., ServingCellConfigCommon) to the UE through RRC signaling.

2) The BS may transmit an SPS PDSCH configuration and an RRC configuration for deferring a HARQ-ACK for an SPS PDSCH to the UE through RRC signaling.

3) The BS may transmit a MAC CE message to the UE to activate or deactivate each carrier configured for the UE.

4) The BS may schedule the UE to perform PDSCH reception, SPS PDSCH release reception, and PUCCH transmission for HARQ-ACK responses therefor.

5) The BS may determine whether to change a carrier on which the PUCCH for the HARQ-ACK responses will be transmitted and/or change an indicated/configured HARQ-ACK transmission time based on some implementations of the present disclosure.

6) The BS may determine a PUCCH resource to be used on the changed/determined carrier and/or at the changed/determined HARQ-ACK transmission time based on some implementations of the present disclosure.

In some implementations of the present disclosure, DL symbol(s) may refer to symbol(s) included in at least one of the following:

A set of symbols in a slot indicated as DL by tdd-UL-DL-ConfigurationCommon or tdd-UL-DL-ConfigurationDedicated;

A set of symbols in a slot indicated to the UE by pdcch-ConfigSIB1 in an MIB for a CORESET for a Type0-PDCCH CSS set;

A set of symbols in a slot indicated to the UE for reception of SS/PBCH blocks in any serving cell among multiple serving cells by ssb-PositionInBurst in SystemInformationBlockType1 or by ssb-PositionInBurst in ServingCellConfigCommon; or A set of symbols in a slot with DCI format 2_0 having an SFI-index field value indicated as DL.

In some implementations of the present disclosure, UL symbol(s) may refer to symbol(s) included in at least one of the following:

A set of symbols in a slot indicated as UL by tdd-UL-DL-ConfigurationCommon or tdd-UL-DL-ConfigurationDedicated;

A set of symbols in a slot corresponding to a valid PRACH occasion and $N_{gap}$ symbols before the valid PRACH occasion; or A set of symbols in a slot with DCI format 2_0 having an SFI-index field value indicated as UL.

The following BS operations according to some implementations of the present disclosure are mainly explained in the context of UCI reception on a PUCCH, and more particularly, reception of a HARQ-ACK response for an SPS PDSCH over the PUCCH. However, implementations of the present disclosure may be applied not only to reception of a HARQ-ACK response for a PDSCH scheduled by DCI but also to PUSCH reception and PUCCH reception that carry other UCI.

In some implementations of the present disclosure, PUCCH carrier switching refers to an operation in which the BS arbitrarily changes a PUCCH carrier according to pre-defined rules and performs PUCCH reception as described above. The following rules may be considered as the pre-defined rules When a PUCCH radio resource is determined based on a PRI included in DCI and when the DCI includes a PUCCH carrier indication, the BS may perform the PUCCH carrier switching for the UE according to the PUCCH carrier indication.

A PUCCH carrier switching pattern may be configured for the UE through higher layer signaling (e.g., RRC signaling) from the BS.

The PUCCH carrier switching pattern may mean information in which lists in which one or more available UL CCs are included are listed in order according to a certain time unit (e.g., a couple of slots) in a certain time period (e.g., dozens of slots, one frame, or 10 ms).

In order to represent that a list of available UL CCs occupies a certain time unit, a time length $T_L$ may be included in each list. The time length $T_L$ may mean a time occupied by the corresponding list. In this case, the period of the PUCCH carrier switching pattern may be the total sum of the time lengths $T_L$ of lists of available UL CCs. For example, there may be a certain UL CC list L1={C1, C2, C3}, and the time information $T_L$ may be additionally assigned to the list L1. For example, L1={{C1, C2, C3}, $T_L$} may be provided. In this case, at least one of C1, C2, or C3 may be used during the time $T_L$. These lists may be enumerated in order. For example, if the lists are given as {L1, L2, L3, . . . LN}, the total sum of the time lengths T for respective lists Ln may represent the length of the entire pattern.

In some implementations, information indicating that PUCCH carrier switching is not performed in a specific time duration may also be included in one or more patterns. This information may also be expressed as a list of UL CCs including a separate RRC parameter (e.g., noPUCCHCarrierSwithcing). The BS may perform PUCCH reception by assuming that the UE performs no PUCCH carrier switching in the duration indicated by the corresponding information.

The time unit or slot length (i.e., time length per slot) may be determined through a UL SCS configuration configured in a cell. For example, at least one of the following may be considered.

A separate UL reference SCS for the PUCCH carrier switching pattern may be configured, and the time unit may be determined through a corresponding SCS value.

The time unit may be determined through the largest or smallest SCS among SCSs of UL BWPs configured for the UE.

The time unit may be determined through the largest or smallest SCS configurable in a cell. As an example, the time unit may be determined through the smallest or largest SCS configuration u provided by ses-SpecificCarrierList of FrequencyInfoUL, or FrequencyInfoUL-SIB.

When one frame has a length of 10 ms, a slot length according to each SCS configuration u may be determined according to Table 1.

<Implementation B1> Deferring First within PUCCH Carrier, Carrier Switching Second When the BS transmits an SPS PDSCH configured/indicated for the UE and attempts to receive a HARQ-ACK response for the SPS PDSCH, if HARQ-ACK reception, which is determined based on a PUCCH resource and a PDSCH-to-HARQ-ACK timing indicated or configured for the UE, is not allowed due to overlapping in time with one or more DL symbols, the BS may attempt to receive the HARQ-ACK response in a new target slot by assuming that the UE will perform the HARQ-ACK deferral procedure first in an initial slot to determine the new target slot for transmitting the HARQ-ACK response and then transmit the HARQ-ACK response in the corresponding slot.

In addition, the BS may receive the HARQ-ACK response by assuming that the UE will attempt the PUCCH carrier switching to perform PUCCH transmission in an initial slot on another CC in the following cases: when the BS is allowed to receive the HARQ-ACK response at a position that is farther away in time by more than a time interval T (e.g., maximum deferral limit) from the end of related PDSCH transmission or from the start of indicated PUCCH reception in the initial slot (for example, when the HARQ-ACK response is allowed to be received at a time later than T_pdsch+T or T_pucch+T where T_pdsch and T_pucch are the PDSCH reception end time and the PUCCH transmission start time, respectively) as a result of the HARQ-ACK deferral procedure, that is, due to the HARQ-ACK deferral; when an explicit latency budget (e.g., packet delay budget) is given for a service associated with the HARQ-ACK response transmitted by the UE and it is determined that the determined target slot is unlikely to satisfy the delay budget (e.g., packet delay budget); or when it is difficult to successfully perform the HARQ-ACK deferral procedure for other reasons.

The time interval T may be predefined or may be determined by L1 signaling and/or higher layer signaling from the BS.

According to Implementation B1, the UE may minimize the execution of the PUCCH carrier switching operation, thereby causing the utilization of channel information regarding a single CC, which is acquired and maintained on the corresponding CC, to be maximized.

<Implementation B2> Carrier Switching First, Deferring Second

When the BS transmits an SPS PDSCH configured/indicated for the UE and attempts to receive a HARQ-ACK response for the SPS PDSCH, if HARQ-ACK reception, which is determined based on a PUCCH resource and a PDSCH-to-HARQ-ACK timing indicated or configured for the UE, is not allowed due to overlapping in time with one or more DL symbols, the BS may receive a PUCCH by assuming that the UE will attempt the PUCCH carrier switching first in an initial slot. If it is expected that the UE is incapable of transmitting the PUCCH in the initial slot after the PUCCH carrier switching, the BS may receive the PUCCH from the UE in an expected target slot by assuming that the UE will perform the HARQ-ACK deferral procedure.

For example, the BS may receive the HARQ-ACK response based on the following assumptions: the UE will attempt HARQ-ACK PUCCH transmission in the initial slot based on the PUCCH carrier switching if possible; and if the UE is not allowed to transmit the PUCCH in the initial slot despite the PUCCH carrier switching (for example, in cases where there is no CC with sufficient UL symbols available for the PUCCH transmission in the initial slot), the UE will perform the HARQ-ACK deferral additionally to determine a new target slot for transmitting the HARQ-ACK and then transmit the HARQ-ACK response in the corresponding slot.

The BS may assume that if the UE additionally performs the HARQ-ACK deferral, the UE will perform the HARQ-ACK deferral based on some implementations of the present disclosure. Accordingly, the UE may perform the HARQ-ACK deferral considering multiple CCs and minimize an RTT required for PDSCH reception.

Alternatively, to simplify UE operations, when the BS transmits the SPS PDSCH configured/indicated for the UE and attempts to receive a HARQ-ACK response for the SPS PDSCH, if the HARQ-ACK reception, which is determined based on the PUCCH resource and PDSCH-to-HARQ-ACK timing indicated or configured for the UE, is not allowed due to overlapping in time with one or more DL symbols, the BS may receive the PUCCH based on the following assumptions: the UE will perform the PUCCH transmission by attempting the PUCCH carrier switching in the initial slot; or the UE will not perform the HARQ-ACK deferral procedure even if the PUCCH transmission is not allowed in the initial slot after the PUCCH carrier switching. In other words, the BS may perform the PUCCH reception by assuming that once the UE performs the PUCCH carrier switching, the UE will not perform the HARQ-ACK deferral procedure.

As another example, when the PUCCH carrier switching is performed according to a PUCCH carrier switching pattern, the permissibility of the PUCCH carrier switching at each instance may be determined by the PUCCH carrier pattern. The BS may assume that the UE will not perform the PUCCH carrier switching at a position where an initial CC is indicated on the PUCCH carrier pattern but will perform the PUCCH carrier switching at a position where a carrier for switching is indicated. In this case, the BS may perform the PUCCH reception by assuming that the UE will perform the PUCCH carrier switching at a time where the PUCCH carrier switching is allowed and perform the HARQ-ACK deferral procedure in a period where the PUCCH carrier switching is not allowed.

<Implementation B2-1> Deferring after Carrier Switching

In the case of using Implementation B2, when the BS transmits an SPS PDSCH configured/indicated for the UE and attempts to receive a HARQ-ACK response for the SPS PDSCH, if HARQ-ACK reception, which is determined based on a PUCCH resource and a PDSCH-to-HARQ-ACK timing indicated or configured for the UE, is not allowed due to overlapping in time with one or more DL symbols, the BS may receive a PUCCH by assuming that the UE will attempt the PUCCH carrier switching first in an initial slot to transmit the PUCCH.

When the BS explicitly configures to the UE a target carrier for carrier switching to be used in a UL slot to which the corresponding PUCCH is scheduled, the BS may receive the PUCCH by assuming that the UE will perform the HARQ-ACK deferral procedure if the UE is incapable of transmitting the PUCCH in an initial slot after the PUCCH carrier switching. In this case, the following methods may be considered.

Method B2_1: The BS may perform the carrier switching to a target carrier, which is configured to be used in the initial slot, and then defer the PUCCH reception to a target slot in which the BS is capable of performing the PUCCH reception on the target carrier. If a UL carrier configured to be used in the target slot is different from the target carrier, the BS may assume that the UE will perform the PUCCH carrier switching to the target carrier again.

Method B2_2: The BS may perform the HARQ-ACK deferral procedure on an original carrier to defer the PUCCH reception to a target slot in which the BS is capable of performing the PUCCH reception on the original carrier. The BS may perform the PUCCH reception by assuming that the UE will perform the carrier switching to a target carrier configured to be used in the target slot and then transmit the PUCCH.

Method B2_3: The BS may consider a UL carrier configured to be used in each UL slot while performing the HARQ-ACK deferral procedure as in Implementation A3/B3. For example, while finding a first UL slot in which the BS is capable of receiving the deferred PUCCH, the BS may consider the feasibility of reception on a target UL carrier of a corresponding slot (e.g., a UL slot where a PUCCH carrier to be used is configured). If the PUCCH reception is allowed, the BS may defer the PUCCH reception to a slot in which the PUCCH transmission is allowed among slots of the target UL carrier.

<Implementation B3> HARQ-ACK Deferral with PUCCH Carrier Switching

When the BS configures a plurality of CCs for the UE and when the UE performs the HARQ-ACK deferral operation, and more particularly, when the BS intends to receive a HARQ-ACK response, which is supposed to be received in an initial slot on an initial CC indicated/configured to the UE, (even) in another slot, i.e., target slot, the BS may perform the HARQ-ACK response reception by assuming that the UE will determine the target slot and a target CC for transmitting the HARQ-ACK response by considering the configured CCs. For example, when a BS would perform a (SPS) PDSCH transmission configured/indicated by the BS to a UE to which the BS has configured a plurality of CCs and attempt to receive a HARQ-ACK response for the (SPS) PDSCH transmission, the BS may determine a target slot and a target CC for actually performing the HARQ-ACK response reception, which are determined based on a PUCCH resource and a PDSCH-to-HARQ-ACK timing that are indicated or configured to the UE, by considering the configured CCs and the HARQ-ACK deferral. In some implementations of the present disclosure, the BS may determine the target slot and target CC in which the UE will perform PUCCH transmission according to at least one of the following methods.

Method B3_1: Among slots within a predetermined time interval from the initial slot, a CC having consecutive available symbols (e.g., consecutive UL or flexible symbols) sufficient to transmit the PUCCH resource for the deferred HARQ-ACK response may be selected as a target PUCCH carrier. In this case, a slot of each CC where the consecutive available symbols are present may become the target slot of each CC. The predetermined time interval may be a value indicated or configured by the BS, or the maximum deferral limit derived by the UE based thereon.

Method B3_2: When the target slot of each CC is determined, a CC with the smallest gap from the initial slot to the target slots may be selected as the target CC.

Method B3_3: When the target slot of each CC is determined, a CC with the earliest starting symbol of the PUCCH resource for transmitting the deferred HARQ-ACK response in the target slot of each CC may be selected as the target CC.

Method B3_4: An activated CC may be selected as the target CC.

Method B3_5: A CC with the same SCS as the initial CC may be selected as the target CC.

Method B3_6: A CC with an SCS greater than or equal to that of the initial CC may be selected as the target CC.

Method B3_7: A CC capable of handling the same priority level as the HARQ-ACK response deferred from the initial CC may be selected as the target CC. For example, if the HARQ-ACK response deferred from the initial CC has a high priority, a CC having configured a PUCCH resource for a high priority may be selected as the target CC.

Method B3_8: If two or more CCs are selected according to all of the considered conditions, a CC with the lowest cell index among the two or more CCs may be selected as the target CC.

Alternatively, in some implementations of the present disclosure, the method (described above) by which the UE determines a PUCCH carrier to be changed based on the PUCCH carrier switching may be equally applied as a method of determining a target CC. For example, a PUCCH cell for a slot may be determined according to a predetermined or predefined rule. In this case, to perform the HARQ-ACK deferral operation in consideration of a plurality of CCs, the UE may transmit a deferred HARQ-ACK response for a given PUCCH in initial slot n (i.e., PUCCH given for initial slot n), by applying the PUCCH carrier switching, in the earliest slot where the PUCCH may be transmitted when assuming performing the PUCCH carrier switching in each of slot n, slot n+1, . . . , and slot n+k. In other words, to enable the UE to support the simultaneous configuration of the HARQ-ACK deferral and PUCCH cell switching, the BS may operate as follows. The BS may determine a next PUCCH slot on the PUCCH cell determined according to a predefined rule for the PUCCH cell switching of the UE. Then, according to HARQ-ACK deferral rule(s), the BS may determine whether the next PUCCH slot on the determined PUCCH cell is a target PUCCH slot for reception. Here, the next PUCCH slot is a slot on the PUCCH cell determined based on the PUCCH cell switching, which is mapped from slot n+k on an initial cell to which the HARQ-ACK response is scheduled, and k increases on the initial cell.

Referring to FIG. 17, assuming that an initial CC and an initial slot to which the UE is scheduled by the BS to transmit a HARQ-ACK response are cell A and slot n, respectively, the BS and UE may determine that cell B is a PUCCH transmission cell for slot n according to predefined rules for the PUCCH cell switching. The BS may determine whether the BS is capable of receiving the HARQ-ACK response from the UE in the earliest slot, slot m overlapping with slot n among slots on cell B. For example, the BS may determine a PUCCH resource for UCI including the corresponding HARQ-ACK response in the earliest slot, slot m overlapping with slot n among the slots on cell B. Then, the BS may determine whether the BS is capable of receiving the HARQ-ACK response from the UE in slot m on cell B, depending on whether the PUCCH resource includes DL symbol(s). If the BS is incapable of receiving the HARQ-ACK response from the UE in slot m on cell B, for example, if the PUCCH resource in slot m on cell B for the HARQ-ACK response includes DL symbol(s), the BS may determine to defer the reception of the HARQ-ACK response. To determine a target slot to which the reception of the HARQ-ACK response is deferred, the BS may determine a PUCCH cell for slot n+1 on cell A to which the reception of the HARQ-ACK response is originally scheduled. Then, the BS may determine whether slot m+2 mapped from slot n+1 among the slots on cell B, which is the PUCCH cell for slot n+1, is the target slot for receiving the deferred HARQ-ACK response. If the reception of the deferred HARQ-ACK response is allowed in slot m+2 on cell B, the BS may receive UCI including the deferred HARQ-ACK response on a PUCCH resource in slot m+2 on cell B. If the reception of the deferred HARQ-ACK response is not allowed in slot m+2 on cell B, for example, if the PUCCH resource for the UCI including the deferred response in slot m+2 on cell B includes DL symbol(s), the BS may determine whether the reception of the deferred HARQ-ACK response is allowed in slot n+2 on cell A, which is a PUCCH cell for slot n+2, and determine whether slot n+2 on cell A is the target slot.

In considering UL slots of each UL CC, a slot length (i.e., the time length of the slot) configured for each priority and each HARQ-ACK codebook may also be considered to count the UL slots. To simplify the operation, considering a priority indicated/configured for a source PUCCH on which the carrier switching is performed, a UL slot applied to a target CC when the corresponding priority is used may be considered as the UL slot for the target CC. For example, assuming that for cell A, slot lengths X and Y are used for priorities 0 and 1, respectively, and for cell B, slot lengths Y and Z are used for priorities 0 and 1, respectively, if UCI over PUCCH transmission indicated as priority 1 for cell A needs to be transmitted on cell B by the carrier switching, the UCI over the PUCCH transmission may be transmitted over a PUCCH on cell B with slot length Z. In some implementations of the present disclosure, for this operation, the target CC may be limitedly selected from CCs configured with the same priority.

When the UE and BS consider the HARQ-ACK deferral and PUCCH cell switching together according to Implementation B3, the UE and BS may achieve shorter latency in PUCCH transmission, compared to when only one of the HARQ-ACK deferral and PUCCH cell switching is performed or when the HARQ-ACK deferral and PUCCH cell switching are considered separately.

<Implementation B4> Maximum HARQ-ACK Deferral Considering PUCCH Carrier Switching When the BS configures a plurality of CCs for the UE and when the UE performs the HARQ-ACK deferral operation, and more particularly, when the BS intends to receive a HARQ-ACK response, which is supposed to be received in an initial slot on an initial CC indicated/configured to the UE, (even) in another slot, i.e., target slot, the BS may perform the HARQ-ACK response reception by assuming that the UE will determine the maximum HARQ-ACK deferral range, max_defer by considering the configured CCs. The UE may perform the HARQ-ACK deferral only within the max_defer range. For example, the BS may assume that the UE may consider at least one of the following to determine the value of max_defer.

When the UE considers configured sets of PDSCH-to-HARQ_feedback timings K1 to determine max_defer, for example, when the UE considers configured dlData-ToUL-ACK, dl-DataToUL-ACK-r16, or dl-DataToUL-ACKForDCIFormat1_2, the UE may consider only a set of K1 configured for an UL CC used when the PUCCH carrier switching is not performed, for example, a primary cell.

the UE may consider sets of K1 for all candidate cells that may be subject to the configured PUCCH carrier switching.

the UE may consider only a set of K1 configured for an available UL CC configured for a PUCCH carrier switching pattern at the time of the HARQ-ACK deferral.

If the UE uses max_defer included in each SPS PDSCH configuration to determine max_defer, the UE may use the corresponding value without any change. The parameter max_defer in the SPS PDSCH configuration may indicate the maximum number of slots or subslots that SPS HARQ-ACK transmission in a slot or subslot can be deferred.

When the UE considers configured sets of PDSCH-to-HARQ_feedback timings K1 to determine max_defer, the BS may assume that the UE will determine, for example, the largest K1 value in the configured set(s) of K1 as the maximum HARQ-ACK deferral range, max_defer. That is, even if the HARQ-ACK deferral is performed, the HARQ-ACK deferral may be performed such that a slot position difference between a deferred HARQ-ACK PUCCH and PDSCH reception related thereto is limited to max_defer.

To determine the largest K1 value or to apply the determined max_defer value to UL CCs with different slot lengths (e.g., different SCSs), the time length of max_defer needs to be determined. That is, when the PUCCH carrier switching is used, the timing of PUCCH transmission deferred from the timing of PDSCH reception may be limited by the actually calculated time length of max_defer. To this end, at least one of the following may be considered.

An effective slot offset length obtained by applying the SCS of a UL CC used when the PUCCH carrier switching is not performed is used as the time length of max_defer. That is, the BS may assume that even if the UE performs the HARQ-ACK deferral based on the PUCCH carrier switching, the HARQ-ACK deferral based on the PUCCH carrier switching does not exceed the maximum HARQ-ACK deferral range when the PUCCH carrier switching is not performed.

The time length of max_defer may be determined based on a UL reference SCS or UL reference cell used for a PUCCH carrier switching pattern. The PUCCH carrier switching pattern may be predefined/preconfigured based on the UL reference SCS or UL reference cell. The BS may configure the value of max_defer for each SPS configuration based on the UL reference SCS or UL reference cell, and the UE may determine the (maximum) slot range where the HARQ-ACK deferral is allowed by interpreting the configured value of max_defer based on the UL reference SCS or UL reference cell. The UL reference SCS or UL reference cell may be configured or defined to be commonly used for all SPS configuration(s) (for example, a primary cell or Pcell may be predefined as the UL reference cell). Alternatively, the UL reference SCS or UL reference cell may be configured for each SPS configuration.

The time length of max_defer may be determined based on the largest or smallest SCS among UL BWPs configured for all candidate cell(s) subject to the PUCCH carrier switching.

The time length of max_defer may be determined based on the largest or smallest SCS configurable in a cell. For example, the time length of max_defer may be determined based on the smallest or largest SCS configuration u provided by ses-SpecificCarrierList of Fre-quencyInfoUL or FrequencyInfoUL-SIB, which is an RRC configuration.

Depending on a given SCS, max_defer*(the number of OFDM symbols per slot)*(the symbol length of the given SCS) or max_defer*(10 ms)/(the number of slots per frame of the given SCS) may be used as the actual time length of max_defer.

When max_defer is applied on the assumption of a specific cell or specific SCS, deferred PUCCH transmission may be overlap with the boundary of the maximum deferral range determined by max_defer. For example, in typical single-carrier operation, the boundary of the maximum deferral range determined by max_defer aligns with slot boundaries, and thus there is no difficulty in validating the effectiveness of the deferral operation. In the typical single-carrier operation, the BS and UE may determine a PUCCH as valid if the PUCCH is deferred within the boundary of the deferral range and as invalid if the PUCCH is deferred outside the boundary of the deferral range. However, in the HARQ-ACK deferral procedure considering the PUCCH carrier switching, the boundary of the determined maximum deferral range may not align with the slot boundary of a UL carrier on which the PUCCH is received.

If the boundary of the maximum deferral range does not align with the slot boundary of the UL carrier on which the PUCCH is received, the boundary of the deferral range may extend into a PUCCH resource. In this case, it may be difficult to determine whether the corresponding PUCCH needs to be dropped because of its going beyond the boundary of the deferral range. In some implementations of the present disclosure, the following may be considered to assess the effectiveness of PUCCH dropping and deferral operations.

Method B4_1: The boundary of the deferral range may be redefined based on slots of a PUCCH carrier. To this end, at least one of the following methods may be considered.

Method B4_1-1: Based on the reference cell or reference SCS used to determine the boundary of the deferral range, the BS may determine that a slot of the PUCCH carrier that overlap in time with one or more slots within a range where the deferral operation is allowed is within the range where the deferral operation is allowed.

Method B4_1-2: Based on the reference cell or reference SCS used to determine the boundary of the deferral range, the BS may determine that a slot of the PUCCH carrier that overlap more than half (i.e., overlap with more than half of symbols included in a slot) in time with a slot within a range where the deferral operation is allowed is within the range where the deferral operation is allowed.

Method B4_1-2: Based on the reference cell or reference SCS used to determine the boundary of the deferral range, the BS may determine that a slot of the PUCCH carrier completely included within a range where the deferral operation is allowed is within the range where the deferral operation is allowed. In other words, the BS may assume that only slots that end before the boundary of the deferral range are within the range where the deferral operation is allowed.

Method B4_2: The effectiveness of the deferral operation may be determined based on the PUCCH resource, and more particularly, by comparing the PUCCH resource with the boundary of the deferral range. To this end, at least one of the following methods may be considered.

Method B4_2-1: If one or more symbols of the PUCCH resource are included in a range where the deferral operation is allowed, the BS may determine that the deferral operation is valid. In other words, only if the starting symbol of the PUCCH resource is later than the boundary of the deferral range, the BS may determine that the deferral operation is invalid.

Method B4_2-1: If more than half of the symbols of the PUCCH resource are included in a range where the deferral operation is allowed, the BS may determine that the deferral operation is valid.

Method B4_2-2: Only if all symbols of the PUCCH resource are included in a range where the deferral operation is allowed, the BS may determine that the deferral operation is valid. In other words, if the last symbol of the PUCCH resource is later than the boundary of the deferral range, the BS may determine that the deferral operation is invalid.

<Implementation A5> Reference Subcarrier Spacing for PUCCH Cell/Carrier Switching In some implementations of the present disclosure, the PUCCH cell/carrier switching may mean that the UE arbitrarily changes a PUCCH cell/carrier according to predefined rules and performs PUCCH transmission and the BS receives the corresponding transmission from the UE on the changed PUCCH cell/carrier as described above. The following rules may be considered as the predefined rules.

When a PUCCH radio resource is determined based on a PRI included in DCI, and when the DCI includes a PUCCH carrier indication, the PUCCH carrier switching may be performed according to the PUCCH carrier indication.

The UE may be configured with a PUCCH carrier switching pattern through higher layer signaling from the BS. The PUCCH carrier switching pattern may refer to information that lists cell(s) to be used in a specific time unit (e.g., slot(s) for a given SCS configuration) within a specific time period (e.g., dozens of slots, one frame, or 10 ms). If the UE performs the PUCCH carrier/cell switching between two cells: a primary cell and an SCell configured as the target of the PUCCH carrier/cell switching, the PUCCH carrier switching pattern may correspond to information listing whether the primary cell or the configured SCell will be used in each time unit of a specific time period. The length of the time unit or slot may be determined by a UL SCS configuration configured for a cell. For example, a reference SCS configuration u_ref by referenceSubcarrierSpacing provided in tdd-UL-DL-ConfigurationCommon may be used to determine the length of the time unit or slot.

If one frame has a length of 10 ms, the slot length according to each SCS configuration u may be determined according to Table 1.

As described above, the reference SCS configuration provided to the UE through tdd-UL-DL-ConfigurationCommon may be used to determine the slot length of the PUCCH cell/carrier switching pattern. However, since the corresponding parameter is not essential for UE operations, the BS may not configure the parameter for network configurations and operations. According to some implementations of the present disclosure, in such cases where the BS does not configure for the UE higher layer parameters required to interpret the PUCCH cell/carrier switching pattern, the BS and UE may interpret the PUCCH cell/carrier switching pattern using at least one of the following methods.

Method B5_1: To prevent such cases, the reference SCS configuration in tdd-UL-DL-ConfigurationCommon may be defined as a prerequisite for the PUCCH cell/carrier switching. In other words, it may be regulated that the PUCCH cell/carrier switching is performed only when the reference SCS parameter in tdd-UL-DL-ConfigurationCommon is configured. For example, if the BS does not provide the UE with the reference SCS configuration in tdd-UL-DL-ConfigurationCommon, the BS may assume that the UE will not perform the PUCCH cell/carrier switching operation. Alternatively, the tdd-UL-DL-ConfigurationCommon parameter set may be defined as a prerequisite element of the PUCCH cell/carrier switching capability of the UE. In other words, it may be regulated that the PUCCH cell/carrier switching is performed only if the UE is configured with the IE tdd-UL-DL-ConfigurationCommon. Accordingly, the tdd-UL-DL-ConfigurationCommon parameter set may be always provided if the BS configures the PUCCH cell/carrier switching operation for the UE.

Method B5_2: To prepare for cases where the tdd-UL-DL-ConfigurationCommon parameter set is not provided to the UE, a separate UL reference SCS may be configured for the PUCCH carrier switching pattern. The slot length of the PUCCH cell/carrier switching pattern may be determined based on the corresponding SCS only when the tdd-UL-DL-ConfigurationCommon parameter set is not provided.

Method B5_3: When the tdd-UL-DL-ConfigurationCommon parameter set is not provided, the BS may assume that the UE will determine the slot length of the PUCCH cell/carrier switching pattern based on the largest or smallest SCS among all UL BWP(s) configured for the UE (in the primary cell). Alternatively, to simplify UE operations, the slot length of the PUCCH cell/carrier switching pattern may always be determined based on the largest or smallest SCS among all UL BWP(s) configured for the UE (in the primary cell), regardless of whether the tdd-UL-DL-ConfigurationCommon parameter set is provided to the UE.

Method B5_4: When the tdd-UL-DL-ConfigurationCommon parameter set is not provided to the UE, the slot length of the PUCCH carrier switching pattern may be determined based on the largest or smallest SCS configurable in the primary cell. For example, the slot length of the PUCCH cell/carrier switching pattern may be determined based on the smallest or largest SCS configuration u provided by ses-SpecificCarrierList of FrequencyInfoUL, or FrequencyInfoUL-SIB. Alternatively, to simplify UE operations, the slot length of the PUCCH carrier switching pattern may always be determined based on the largest or smallest SCS configurable in the primary cell, regardless of whether the tdd-UL-DL-ConfigurationCommon parameter set is provided to the UE.

Method B5_5: When the tdd-UL-DL-ConfigurationCommon parameter set is not provided to the UE, the slot length of the PUCCH cell/carrier switching pattern may be determined based on a predefined SCS value (e.g., u=0 for 15 kHz). Alternatively, to simplify UE operations, the slot length of the PUCCH cell/carrier switching pattern may always be determined based on the predefined SCS value (e.g., u=0 for 15 kHz), regardless of whether the tdd-UL-DL-ConfigurationCommon parameter set is provided to the UE.

Method B5_6: When the tdd-UL-DL-ConfigurationCommon parameter set is not provided to the UE, the slot length of the PUCCH cell/carrier switching pattern may be determined based on the SCS of a BWP with the lowest ID among all UL BWPs configured for the UE (in the primary cell). Alternatively, to simplify UE operations, the slot length of the PUCCH cell/carrier switching pattern may always be determined based on the SCS of the BWP with the lowest ID among all UL BWPs configured for the UE (in the primary cell), regardless of whether the tdd-UL-DL-Configuration-Common parameter set is provided to the UE.

Method B5_7: When the tdd-UL-DL-ConfigurationCommon parameter set is not provided to the UE, the slot length of the PUCCH cell/carrier switching pattern may be determined based on the SCS of an initial UL BWP (e.g., a BWP provided by an RRC parameter initialUplinkBWP) configured for the UE (in the primary cell). Alternatively, to simplify UE operations, the slot length of the PUCCH cell/carrier switching pattern may always be determined based on the SCS of the initial UL BWP (e.g., the BWP provided by the RRC parameter initialUplinkBWP) configured for the UE (in the primary cell), regardless of whether the tdd-UL-DL-ConfigurationCommon parameter set is provided to the UE.

Method B5_8: When the tdd-UL-DL-ConfigurationCommon parameter set is not provided to the UE, the slot length of the PUCCH cell/carrier switching pattern may be determined based the SCS of a first active UL BWP (e.g., a BWP provided by an RRC parameter firstActiveUplinkBWP-Id) configured for the UE (in the primary cell). Alternatively, to simplify UE operations, the slot length of the PUCCH cell/carrier switching pattern may always be determined based the SCS of the first active BWP (e.g., the BWP provided by the RRC parameter firstActiveUplinkBWP-Id) configured for the UE (in the primary cell), regardless of whether the tdd-UL-DL-ConfigurationCommon parameter set is provided to the UE.

The UE and BS may use multiple of the above-described methods simultaneously and complementary. For example, the UE and BS may use Method B5_1 and Method B5_2 together. Specifically, when the tdd-UL-DL-Configuration-Common parameter set is provided, the UE and BS may use Method B5_1. When the tdd-UL-DL-ConfigurationCommon parameter set is not provided, the UE and BS may Method B5_2.

In some implementations of the present disclosure, the BS may provide an RRC configuration through a cell configuration process to configure available CCs to the UE. When the BS configures and/or instructs the UE to receive an SPS PDSCH and transmit a PUCCH carrying a HARQ-ACK response for the SPS PDSCH, the UE may determine or change a carrier for transmitting the PUCCH carrying the HARQ-ACK response or a slot for transmitting the PUCCH according to some implementations of the present disclosure. The BS may receive UCI (including the HARQ-ACK information for the PDSCH) on a PUCCH resource in the determined/changed slot on the determined/changed carrier according to some implementations of the present disclosure.

According to some implementations of the present disclosure, when the BS and UE are capable of using a plurality of CCs, the BS and UE may determine whether to perform the PUCCH carrier switching and/or HARQ-ACK deferral for UL transmission(s) configured/indicated on unavailable resources based on TDD configurations and CA configurations. Alternatively, the BS and UE may perform the HARQ-ACK deferral by considering the plurality of CCs (e.g., by considering the PUCCH carrier switching between the plurality of CCs according to predetermined/defined rules). If the UE is capable of using a plurality of CCs with different TDD configurations for communication, the BS and UE may determine/change a PUCCH transmission carrier and defer a HARQ-ACK response according to some implementations of the present disclosure, thereby allowing transmissions/receptions dropped due to predetermined/predefined conditions to be performed while minimizing additional latency.

The UE may perform operations according to some implementations of the present disclosure in association with transmission of HARQ-ACK information. The UE may include at least one transceiver; at least one processor; and at least one computer memory operably connectable to the at least one processor and storing instructions that, when executed, cause the at least one processor to perform operations according to some implementations of the present disclosure. A processing device for a UE may include at least one processor; and at least one computer memory operably connectable to the at least one processor and storing instructions that, when executed, cause the at least one processor to perform operations according to some implementations of the present disclosure. A computer readable (non-volatile) storage medium may store at least one computer program including instructions that, when executed by at least one processor, cause the at least one processor to perform operations according to some implementations of the present disclosure. A computer program or a computer program product may include instructions recorded in at least one computer readable (non-volatile) storage medium and causing, when executed, (at least one processor) to perform operations according to some implementations of the present disclosure. For the UE, processing device, computer-readable (non-volatile) storage medium, and/or computer program product, the operations may include: performing PDSCH reception; based on a first cell slot n on a first cell on which HARQ-ACK transmission for the PDSCH reception is scheduled and a predetermined rule for PUCCH cell switching, determining a PUCCH cell among a plurality of cells including the first cell and a second cell different from the first cell; determining a PUCCH cell slot related to the first cell slot n among slots on the PUCCH cell for the first cell slot n; and based on that the HARQ-ACK transmission overlaps with a DL symbol in the PUCCH cell slot on the PUCCH cell for the first cell slot n, determining a target slot to which the HARQ-ACK transmission is deferred.

In some implementations, the first cell slot n may be a slot in which HARQ-ACK transmission for the PDSCH is scheduled.

In some implementations, the plurality of cells may be configured for PUCCH cell switching. Determining the PUCCH cell among the plurality of cells may include determining the PUCCH cell for the first cell slot n among the plurality of cells based on the predetermined rule for the PUCCH cell switching.

In some implementations, the target slot may be an earliest slot in which the HARQ-ACK transmission is capable of being performed among PUCCH cell slots determined based on the predetermined rule and first cell slots on the first cell.

In some implementations, the operations may further include, based on that the HARQ-ACK transmission overlaps with no DL symbol in the PUCCH cell slot on the PUCCH cell for the first cell slot n, performing the HARQ-ACK transmission in the PUCCH cell slot on the PUCCH cell for the first cell slot n.

In some implementations, determining the target slot may include: determining a PUCCH cell for a first cell slot n+k on the first cell based on the predetermined rule, where k is a positive integer; based on that the HARQ-ACK transmission overlaps with a downlink symbol in a PUCCH cell slot related to the first cell slot n+k among slots on the PUCCH cell for the first cell slot n+k, determining a PUCCH cell for a first cell slot n+k+1 on the first cell; and determining whether the HARQ-ACK transmission is capable of being performed in a PUCCH slot related to the first cell slot n+k+1 on the PUCCH cell for the first cell slot n+k+1.

In some implementations, the PDSCH reception may be semi-persistently scheduled PDSCH reception.

The BS may perform operations according to some implementations of the present disclosure in association with reception of HARQ-ACK information. The BS may include at least one transceiver; at least one processor; and at least one computer memory operably connectable to the at least one processor and storing instructions that, when executed, cause the at least one processor to perform operations according to some implementations of the present disclosure. A processing device for a BS may include at least one processor; and at least one computer memory operably connectable to the at least one processor and storing instructions that, when executed, cause the at least one processor to perform operations according to some implementations of the present disclosure. A computer readable (non-volatile) storage medium may store at least one computer program including instructions that, when executed by at least one processor, cause the at least one processor to perform operations according to some implementations of the present disclosure. A computer program or a computer program product may include instructions recorded in at least one computer readable (non-volatile) storage medium and causing, when executed, (at least one processor) to perform operations according to some implementations of the present disclosure. For the BS, processing device, computer readable (non-volatile) storage medium, and/or computer program product, the operations may include: performing PDSCH transmission; based on a first cell slot n on a first cell on which HARQ-ACK reception for the PDSCH transmission is scheduled and a predetermined rule for PUCCH cell switching, determining a PUCCH cell among a plurality of cells including the first cell and a second cell different from the first cell; determining a PUCCH cell slot related to the first cell slot n among slots on the PUCCH cell for the first cell slot n; and based on that the HARQ-ACK reception overlaps with a DL symbol in the PUCCH cell slot on the PUCCH cell for the first cell slot n, determining a target slot to which the HARQ-ACK reception is deferred. In some implementations, the first cell slot n may be a slot in which HARQ-ACK transmission for the PDSCH is scheduled.

In some implementations, the plurality of cells may be configured for PUCCH cell switching. Determining the PUCCH cell among the plurality of cells may include determining the PUCCH cell for the first cell slot n among the plurality of cells based on the predetermined rule for the PUCCH cell switching.

In some implementations, the target slot may be an earliest slot in which the HARQ-ACK reception is capable of being performed among PUCCH cell slots determined based on the predetermined rule and first cell slots on the first cell.

In some implementations, the operations may further include, based on that the HARQ-ACK reception overlaps with no DL symbol in the PUCCH cell slot on the PUCCH cell for the first cell slot n, performing the HARQ-ACK reception in the PUCCH cell slot on the PUCCH cell for the first cell slot n.

In some implementations, determining the target slot may include: determining a PUCCH cell for a first cell slot n+k on the first cell based on the predetermined rule, where k is a positive integer; based on that the HARQ-ACK reception overlaps with a downlink symbol in a PUCCH cell slot related to the first cell slot n+k among slots on the PUCCH cell for the first cell slot n+k, determining a PUCCH cell for a first cell slot n+k+1 on the first cell; and determining whether the HARQ-ACK reception is capable of being performed in a PUCCH slot related to the first cell slot n+k+1 on the PUCCH cell for the first cell slot n+k+1.

In some implementations, the PDSCH transmission may be semi-persistently scheduled PDSCH transmission.

The examples of the present disclosure as described above have been presented to enable any person of ordinary skill in the art to implement and practice the present disclosure. Although the present disclosure has been described with reference to the examples, those skilled in the art may make various modifications and variations in the example of the present disclosure. Thus, the present disclosure is not intended to be limited to the examples set for the herein, but is to be accorded the broadest scope consistent with the principles and features disclosed herein.

The implementations of the present disclosure may be used in a BS, a UE, or other equipment in a wireless communication system.

The invention claimed is:

1. A method performed by a user equipment (UE), the method comprising:
    performing a physical downlink shared channel (PDSCH) reception;
    determining a first slot and a first cell, in which the UE would perform a hybrid automatic repeat request-acknowledgement (HARQ-ACK) transmission for the PDSCH reception for a first time; and
    based on a resource for the HARQ-ACK transmission overlapping with a downlink symbol in the first slot on the first cell, determining a second slot and a second cell, to which the HARQ-ACK transmission is to be deferred,
    wherein the first cell and the second cell are determined, from a plurality of cells for physical uplink control channel (PUCCH) cell switching, based on a predetermined rule for the PUCCH cell switching, and
    wherein the UE determines an earliest slot and a corresponding cell, which are available for the HARQ-ACK transmission to be deferred based on the predetermined rule for the PUCCH cell switching, as the second slot and the second cell.

2. The method of claim 1, wherein determining the first slot and the first cell comprises:
    based on i) a slot n, to which the HARQ-ACK transmission for the PDSCH reception is scheduled, and ii) the predetermined rule for the PUCCH cell switching, determining the first cell for the slot n among the plurality of cells.

3. The method of claim 1, wherein determining the second slot and the second cell comprises:
    determining a PUCCH cell for a slot n+k among the plurality of cells based on the predetermined rule for the PUCCH cell switching, where k is a positive integer; and
    based on a resource for the HARQ-ACK transmission overlapping with no downlink symbol in a PUCCH cell slot related to the slot n+k among slots of the PUCCH cell for the slot n+k, determining the PUCCH cell slot and the PUCCH cell as the second slot and the second cell, respectively.

4. The method of claim 1, wherein the PDSCH reception is semi-persistently scheduled PDSCH reception.

5. The method of claim 1, wherein the predetermined rule for the PUCCH cell switching is a PUCCH cell switching pattern.

6. The method of claim 5, wherein the PUCCH cell switching pattern is configured by higher layer signaling, and wherein the PUCCH cell switching pattern informs the UE of a cell for PUCCH transmission for each of a plurality of slots for a reference subcarrier spacing used for the PUCCH cell switching pattern.

7. The method of claim 5, wherein a time difference, with reference to subcarrier spacing of a primary cell among the plurality of cells, between the second slot and a slot of the PDSCH reception is not larger than a maximum HARQ-ACK deferral range.

8. The method of claim 1, wherein the second slot is later in time than the first slot.

9. A user equipment (UE) comprising:
   at least one transceiver;
   at least one processor; and
   at least one computer memory operably connected to the at least one processor and configured to store instructions that, when executed, cause the at least one processor to perform operations comprising:
   performing a physical downlink shared channel (PDSCH) reception;
   determining a first slot and a first cell, in which the UE would perform a hybrid automatic repeat request-acknowledgement (HARQ-ACK) transmission for the PDSCH reception for a first time; and
   based on a resource for the HARQ-ACK transmission overlapping with a downlink symbol in the first slot on the first cell, determining a second slot and a second cell, to which the HARQ-ACK transmission is to be deferred,
   wherein the first cell and the second cell are determined, from a plurality of cells for physical uplink control channel (PUCCH) cell switching, based on a predetermined rule for the PUCCH cell switching, and
   wherein the UE determines an earliest slot and a corresponding cell, which are available for the HARQ-ACK transmission to be deferred based on the predetermined rule for the PUCCH cell switching, as the second slot and the second cell.

10. The UE of claim 9, wherein the predetermined rule for the PUCCH cell switching is a PUCCH cell switching pattern.

11. The UE of claim 10, wherein the PUCCH cell switching pattern is configured by higher layer signaling, and
   wherein the PUCCH cell switching pattern informs the UE of a cell for PUCCH transmission for each of a plurality of slots for a reference subcarrier spacing used for the PUCCH cell switching pattern.

12. The UE of claim 10, wherein a time difference, with reference to subcarrier spacing of a primary cell among the plurality of cells, between the second slot and a slot of the PDSCH reception is not larger than a maximum HARQ-ACK deferral range.

13. A base station (BS) comprising:
   at least one transceiver;
   at least one processor; and
   at least one computer memory operably connected to the at least one processor and configured to store instructions that, when executed, cause the at least one processor to perform operations comprising:
   performing a physical downlink shared channel (PDSCH) transmission;
   determining a first slot and a first cell, in which the BS would perform a hybrid automatic repeat request-acknowledgement (HARQ-ACK) reception for the PDSCH transmission for a first time; and
   based on a resource for the HARQ-ACK reception overlapping with a downlink symbol in the first slot on the first cell, determining a second slot and a second cell, to which the HARQ-ACK reception is to be deferred,
   wherein the first cell and the second cell are determined, from a plurality of cells for physical uplink control channel (PUCCH) cell switching, based on a predetermined rule for the PUCCH cell switching, and
   wherein an earliest slot and a corresponding cell, which are available for the HARQ-ACK reception to be deferred based on the predetermined rule for the PUCCH cell switching, are determined as the second slot and the second cell.

14. The BS of claim 13, wherein determining the first slot and the first cell comprises:
   based on i) a slot n, to which the HARQ-ACK reception for the PDSCH transmission is scheduled, and ii) the predetermined rule for the PUCCH cell switching, determining the first cell for the slot n among the plurality of cells.

15. The BS of claim 13, wherein determining the second slot and the second cell comprises:
   determining a PUCCH cell for a slot n+k among the plurality of cells based on the predetermined rule for the PUCCH cell switching, where k is a positive integer; and
   based on a resource for the HARQ-ACK reception overlapping with no downlink symbol in a PUCCH cell slot related to the slot n+k among slots of the PUCCH cell for the slot n+k, determining the PUCCH cell slot and the PUCCH cell as the second slot and the second cell, respectively.

16. The BS of claim 13, wherein the PDSCH transmission is semi-persistently scheduled PDSCH transmission.

17. The BS of claim 13, wherein the predetermined rule for the PUCCH cell switching is a PUCCH cell switching pattern.

18. The BS of claim 17, wherein the PUCCH cell switching pattern is configured by higher layer signaling, and
   wherein the PUCCH cell switching pattern informs a user equipment of a cell for PUCCH transmission for each of a plurality of slots for a reference subcarrier spacing used for the PUCCH cell switching pattern.

19. The BS of claim 17, wherein a time difference, with reference to subcarrier spacing of a primary cell among the plurality of cells, between the second slot and a slot of the PDSCH transmission is not larger than a maximum HARQ-ACK deferral range.

20. The BS of claim 13, wherein the second slot is later in time than the first slot.

* * * * *